(12) United States Patent
Inoue et al.

(10) Patent No.: US 8,017,923 B2
(45) Date of Patent: Sep. 13, 2011

(54) INFRARED SOURCE AND METHOD OF MANUFACTURING THE SAME

(75) Inventors: Yasuaki Inoue, Osaka (JP); Katsumoto Ikeda, Osaka (JP); Hideki Miyazaki, Ibaraki (JP)

(73) Assignee: Nalux Co., Ltd, Osaka (JP)

( * ) Notice: Subject to any disclaimer, the term of this patent is extended or adjusted under 35 U.S.C. 154(b) by 406 days.

(21) Appl. No.: 12/084,571

(22) PCT Filed: May 25, 2007

(86) PCT No.: PCT/JP2007/060711
§ 371 (c)(1),
(2), (4) Date: Oct. 8, 2008

(87) PCT Pub. No.: WO2007/139022
PCT Pub. Date: Dec. 6, 2007

(65) Prior Publication Data
US 2009/0127478 A1    May 21, 2009

(30) Foreign Application Priority Data

May 26, 2006  (WO) .................. PCT/JP2006/310575
Nov. 30, 2006 (WO) .................. PCT/JP2006/324023

(51) Int. Cl.
*G01J 4/00* (2006.01)
*G21K 5/00* (2006.01)

(52) U.S. Cl. .................... 250/504 R; 250/493.1; 356/51; 359/483.01; 359/486.01

(58) Field of Classification Search ............... 250/493.1, 250/494.1, 495.1, 503.1, 504 R; 356/51; 219/678, 711, 130.21, 409, 411, 353, 553; 359/483, 486
See application file for complete search history.

(56) References Cited

U.S. PATENT DOCUMENTS

| | | | |
|---|---|---|---|
| 3,296,482 A | 1/1967 | Agdur | |
| 5,500,569 A | 3/1996 | Blomberg et al. | |
| 5,502,434 A | 3/1996 | Minowa et al. | |
| 5,827,438 A | 10/1998 | Blomberg et al. | |
| 2003/0071564 A1* | 4/2003 | Hirayama | 313/501 |
| 2004/0120041 A1* | 6/2004 | Silverstein et al. | 359/486 |
| 2005/0133926 A1 | 6/2005 | Lin et al. | |
| 2005/0221128 A1* | 10/2005 | Kochergin | 428/824 |

FOREIGN PATENT DOCUMENTS

| | | |
|---|---|---|
| JP | 40-28835 | 12/1965 |
| JP | 5-332930 | 12/1993 |
| JP | 7-6742 | 1/1995 |
| JP | 9-184757 | 7/1997 |
| JP | 2000-267585 | 9/2000 |
| JP | 2005-184018 | 7/2005 |

* cited by examiner

*Primary Examiner* — Robert Kim
*Assistant Examiner* — Nicole Ippolito Rausch
(74) *Attorney, Agent, or Firm* — Squire, Sanders & Dempsey (US) LLP

(57) ABSTRACT

There is provided an infrared light source that has a simple structure and radiates infrared rays polarized in a specific direction and having a specific wavelength. The infrared light source (100) comprises a heat generator (107) and a latticework (101) in which a dielectric part (105) and a metal part (103) are alternately formed at a constant pitch in a constant direction. The infrared rays are radiated in a direction perpendicular to the surface of the latticework and are polarized in the direction indicated by an arrow A. If the constant pitch is denoted by P, the width of the dielectric part in the constant direction by T, and the specific wavelength by $\lambda$, for arbitrary P and T that meet the inequalities $0 < P \leq 2.0\lambda$ and $T \leq 0.5P$, the depth D of the latticework is so selected that the intensity spectrum of the infrared rays radiated from the infrared light source has the peak at $\lambda$.

20 Claims, 56 Drawing Sheets

(a)

(b)

(c)

(a)

(b)

(c)

(d)

INFRARED SOURCE AND METHOD OF MANUFACTURING THE SAME

TECHNICAL FIELD

The present invention relates to an infrared source that generates infrared light with a specific wavelength and a method of manufacturing the same. In particular, the present invention relates to an analysis system and a monitor system that use the infrared source.

BACKGROUND ART

There are few infrared sources capable of obtaining strong intensity at a specific wavelength in an infrared wavelength range.

Although some of expensive lasers are oscillated at the specific wavelengths, the specific wavelengths cannot be set to arbitrary values.

There is considered a device in which light with arbitrary wavelengths is taken out from radiant light radiated from a heater, etc. using a filter, or the like. However, such a device has problems that the number of components is large, a method of manufacturing a wavelength filter is complicated, and output energy is extremely low.

Also, there has been proposed a high-temperature light emitting micro cavity light source (for example, see Japanese Patent Application National Publication No. 2001-519079). However, the high-temperature light emitting micro cavity light source has a complicated structure.

On the other hand, an application for light sources with an infrared wavelength range has been expanded to fields including medical care and biotechnology.

There is a non-dispersive infrared absorption method as a method of analyzing gas or liquid, utilizing absorption of infrared rays radiated from materials. The non-dispersive infrared absorption method is a method that uses infrared absorption lines inherent in materials to measure concentration of the corresponding materials or composition of the materials. As analysis systems using a non-dispersive infrared absorption method, there are systems in various forms such as a stationary type system built in production equipment or devices and a portable system driven by a battery.

FIG. 61 is a view showing a basic configuration of the analysis system using the non-dispersive infrared absorption method. The analysis system includes an infrared source 301, a measuring cell 207, a means 211 that periodically changes intensity, a wavelength selecting element 303, an infrared sensor 203, and a demodulation means 205. As the infrared source 301, a white infrared source (lamp) using black body radiation is exclusively used. As the means 211 that periodically changes intensity, there is used a chopper that periodically interrupts infrared rays by rotating a shutter covering the light source or a radial slit. As the wavelength selecting element 303, a narrow range filter transmitting a specific wavelength alone using a dielectric multi-layer film or the like is used. As the infrared sensor 203, various detectors such as a pyroelectric element, a bolometer, a thermopile, a heat flux sensor and the like are used. Infrared rays from the infrared source 301 pass through the measuring cell 207 including an object to be measured and arrive on the means 211 that periodically changes intensity, the wavelength selecting element 203, and the infrared sensor 203, in succession.

FIG. 62 is a view showing relations among absorbance of the object to be measured (for example, gas), intensity of lights, transmittance of the wavelength selecting element. FIG. 62(a) is a view showing absorbance of gas A to be measured with respect to wavelength. It shows that the absorbance of gas A to be measured is large at a wavelength $\lambda_S$. FIG. 62(b) shows intensity of infrared rays radiated from the infrared source 301 with respect to wavelength. The infrared source 301 radiates infrared rays with intensity distribution corresponding to temperature over a wide wavelength range according to a Planck's law. FIG. 62(c) shows transmittance of the wavelength selecting element 303 with respect to wavelength. The wavelength selecting element 303 is a narrow range filter transmitting lights with a narrow wavelength range around $\lambda_S$ alone.

Transmittance of infrared rays with wavelength $\lambda_S$ is changed according to a concentration of the gas to be measured in the measurement cell, and therefore an output of the infrared sensor 203 is also changed. The concentration of the gas is calculated from a comparison between a detected signal and a reference signal previously obtained, based on Lambert' law. $\lambda_S$ is not always set to the peak wavelength at which absorption becomes maximized, but is determined in consideration of various factors such as that of avoiding overlaps with absorption of other coexisting gases.

Actually, since this method is hard to obtain reliable results due to an influence of aging change, etc. of the elements or the optical system, in many cases some kind of reference signals are used.

FIG. 63 shows an analysis system using a reference sample. Gas B with previously known composition is sealed in a reference cell 207A, and a wavelength selecting element 3031A and an infrared sensor 203A are installed for measuring concentration of gas B. Gas A to be measured is sealed in a measurement cell 207B, and a wavelength selecting element 3031B and an infrared sensor 203B are installed for measuring a concentration of gas A. A concentration of gas A is obtained from a ratio between a signal of the infrared sensor 203A and that of the infrared sensor 203B and from absorbance at $\lambda_S$ of object gas A to be measured and that of object gas B to be measured. In many cases, the reference cell 207A is sealed with the same kind of gas as the gas to be measured.

FIG. 64 is a view showing the analysis system in a two-wavelength method. A wavelength selecting element 3033 and the infrared sensor 203A are installed for infrared rays at wavelength $\lambda_S$ at which absorbance of the gas to be measured is to be large, and a wavelength selecting element 3035 and an infrared sensor 203B are installed for infrared rays at wavelength $\lambda_R$ at which absorbance is to be small. Transmittance of the wavelength selecting element 3033 at wavelength $\lambda_S$ is the same as characteristics of the wavelength selecting element 303 shown in FIG. 62(c). Transmittance of the wavelength selecting element 3035 at wavelength $\lambda_R$ is shown in FIG. 62(d). A concentration of gas A is obtained from a ratio between a signal of the infrared sensor 203A and that of the infrared sensor 203B and from absorbance at wavelength $\lambda_S$ and that at wavelength $\lambda_R$ of object gas A to be measured.

The analysis system as described above uses infrared rays with the specific wavelengths determined according to materials to be measured. On the other hand, as shown in FIG. 62(b), infrared sources in conventional analysis systems radiate infrared rays with a wide wavelength range. Thus, in conventional analysis systems, only infrared rays with wavelengths selected by a wavelength selecting element, such as a filter, among the infrared rays radiated from the infrared source, are used and infrared rays with other wavelengths are discarded. Therefore, conventional analysis systems waste much energy and cannot reduce an output from the infrared source, and therefore it is difficult to make the infrared source compact. As a result, conventional analysis systems are low in energy efficiency and are relatively large in size.

In order to monitor an object to be measured, a monitor system (for example, see Japanese Patent Application Laid-Open No. 2005-106523) in which a light source radiates lights with a specific wavelength and a sensor receives the lights, is used.

In many cases, such systems use a silicon sensor as a light receiving element. Since silicon sensors have high sensitivity in a range from 400 nm to 1000 nm, the systems use lights with a wavelength within the range in many cases. However, sunlight and illumination light have much wavelength component in the range, which becomes noise component and causes the systems to malfunction. In order to avoid an influence of noise such as sunlight, it is advantageous to use lights with a infrared wavelength range.

As described above, an infrared source radiating lights with an infrared wavelength range is required for a system monitoring an object. However, there are few infrared sources radiating lights with strong intensity at specific wavelengths in an infrared wavelength range.

Lasers oscillated at specific wavelengths are expensive and the specific wavelengths cannot be set to arbitrary values.

A device in which lights with arbitrary wavelengths are taken out from lights radiated from a heater, etc. using a filter, or the like, is available. However, such a device has problems that the number of components is large, a method of manufacturing a wavelength filter is complicated, and output energy is extremely low.

Further, a high-temperature light emitting micro cavity light source (for example, see Japanese Patent Application National Publication No. 2001-519079) has been proposed. However, the structure is complicated.

DISCLOSURE OF THE INVENTION

Accordingly, there is a need for an infrared source radiating infrared rays with specific wavelengths, which has a simple structure and a wide range of applications.

An infrared source according to the present invention includes a heating element and a grating in which portions functioning as positive dielectric substance and portions functioning as negative dielectric substance are alternately formed at a predetermined period in a predetermined direction. Radiation energy from the heating element is concentrated on infrared rays having a specific wavelength determined by a shape of the grating and having a polarization plane orthogonal to the arrangement direction of the grating, for radiation.

According to the present invention, the infrared source having a simple structure and radiating the infrared rays with the specific wavelengths having predetermined polarization planes is obtained.

BEST NODE FOR CARRYING OUT THE INVENTION

Figure 1:
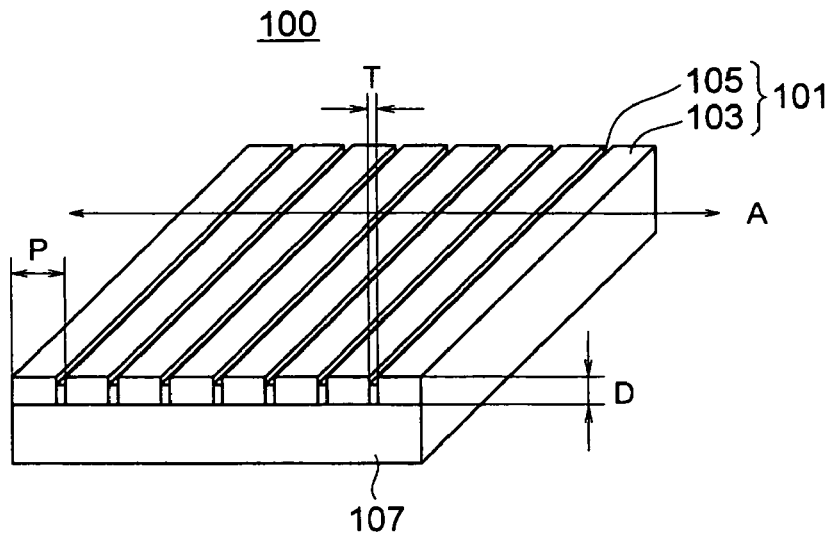
FIG. 1 is a view showing a configuration of an infrared source according to one embodiment of the present invention.

FIG. 1 shows a configuration of an infrared source 100 according to an embodiment of the invention. The infrared source 100 includes a grating 101 and a heating element 107. In the embodiment, the grating 101 is provided on a surface of the heating element 107. For example, the heating element 107 is formed by a ceramic heater. A SiC heater may be used as the heating element 107. The grating 101 includes portions functioning as negative dielectric substance (such as metals) 103 and portions functioning as positive dielectric substance (such as a dielectric substance) 105. For example, the portions functioning as negative dielectric substance (such as metals) 103 is made of aluminum, gold, or silver. In the portions functioning as negative dielectric substance (such as metals) 103, a metal film may be formed on a surface of any material. For example, the portions functioning as positive dielectric substance (such as a dielectric substance) 105 is formed as an empty space, or the portions functioning as positive dielectric substance 105 is made of a semiconductor material. In the grating 101, a period is indicated by P, and a depth is indicated by D. A width of the portions functioning as positive dielectric substance (such as a dielectric substance) 105 is indicated by T. An arrow A shown in FIG. 1 indicates a direction of a polarization plane of lights emitted from the infrared source 100, and the polarization plane is orthogonal to a direction of arrangement of the grating. The polarization plane is described later.

Figure 2:
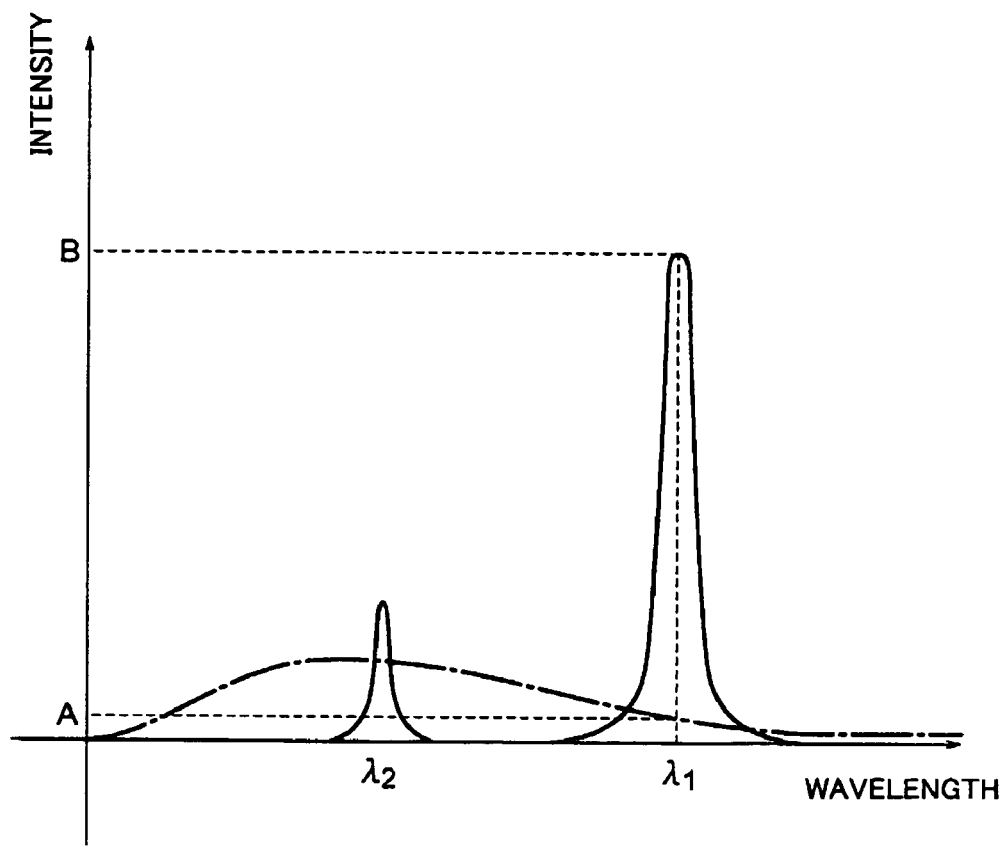
FIG. 2 is a view showing intensity distribution of infrared rays to wavelength.

FIG. 2 shows an infrared intensity distribution to a wavelength. The horizontal axis indicates a wavelength, and the vertical axis indicates a radiant energy density. The radiant energy density is referred to as intensity.

An alternate long and short dashed line indicates an infrared intensity distribution which is radiated by the heating element 107 without the grating 101. The infrared ray is gently distributed over a wide wavelength range. The infrared ray radiated by the heating element 107 has all polarization planes.

A solid line indicates an infrared intensity distribution radiated by the infrared source 100. The solid-line infrared intensity distribution radiated by the infrared source 100 has multiple peaks, and the intensity substantially becomes zero in wavelengths except for the peaks. The multiple peaks are specified into a first peak, a second peak, and the like. The second peak wavelength $\lambda_2$ approximately one-third of the first peak wavelength $\lambda_1$ in a structure of a mode shown in FIG. 8. Further, the second peak wavelength is approximately a half of the first peak wavelength in a structure of a mode shown in FIG. 9. The peaks except for the first and second peak are not shown in FIG. 2 and the other drawings.

Only the light (see FIG. 1) having a polarization plane orthogonal to a direction of arrangement of the grating 101 is radiated in the peak wavelengths.

In FIG. 2, an area of a portion surrounded by the horizontal axis and the alternate long and short dashed line is equal to an area of a portion surrounded by the horizontal axis and the solid line. Thus, the infrared source 100 has a function of concentrating radiant energy of the heating element on the infrared ray having the specific wavelength. Additionally, the infrared ray having the specific wavelength has the polarization plane orthogonal to the direction of arrangement of the grating 101 (see FIG. 1).

In FIG. 2, in the first peak wavelength, a ratio of infrared intensity (B) radiated by the infrared source 100 to infrared intensity (A) radiated by the heating element is referred to as infrared intensity ratio.

Therefore, the infrared source which emits the infrared ray having the specific wavelength is obtained if the specific wavelength can be matched with the first peak wavelength. A method of producing the infrared source in which the specific wavelength is matched with the first peak wavelength will be described below.

Figure 3:
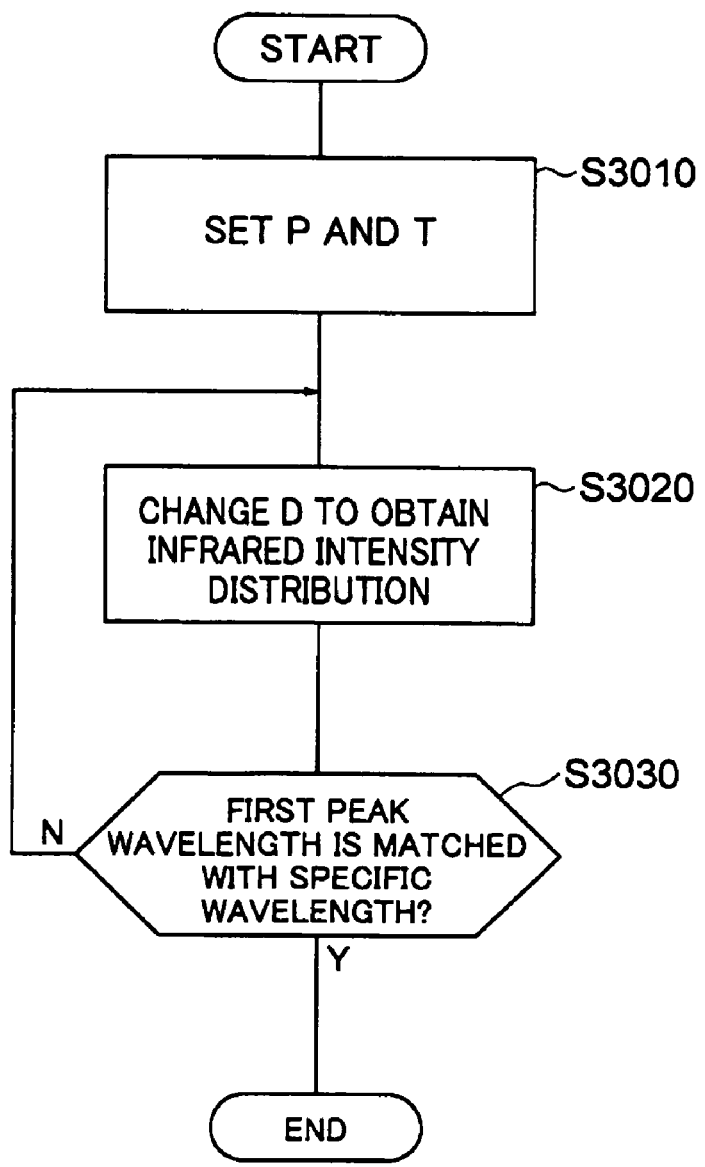
FIG. 3 is a flow chart showing a method of obtaining a grating depth D when a grating period P and a width T of a portion functioning as positive dielectric substance (such as dielectric substance) are set in the infrared source.

FIG. 3 is a flowchart showing a method of obtaining the grating depth D when the grating period P and the width T of the portions functioning as positive dielectric substance (such as a dielectric substance) are set in the infrared source.

In Step S3010, the grating period P and the width T of the portions functioning as positive dielectric substance (such as a dielectric substance) are set. When the specific wavelength is $\lambda$, any grating period P and any width T of the portions functioning as positive dielectric substance which are expressed by Formula 1 are set.

$$0 < P \leq 2.0\lambda$$

$$T \leq 0.5P \qquad \text{[Formula 1]}$$

At this point, the grating period P is set in a range expressed by Formula 2 such that diffraction is not generated in the infrared source.

$$0 < P \leq 0.5\lambda \qquad \text{[Formula 2]}$$

The infrared intensity radiated by the infrared source 100 can be obtained by computation such as a FDTD method. The FDTD method is one in which an electromagnetic field is simulated by difference expressions of Maxwell equations.

In Step S3020, the infrared intensity distribution radiated by the infrared source 100 is obtained by changing the grating depth D.

Figure 4:
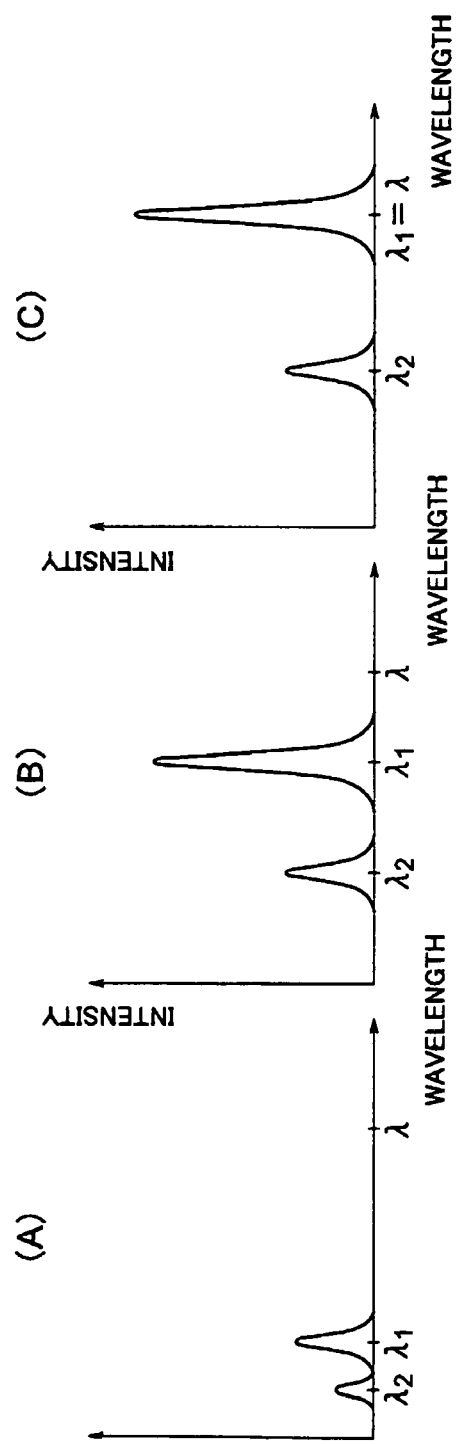
FIG. 4 is a view showing a change in intensity distribution of infrared rays radiated from the infrared source when changing a grating depth D of the infrared source.

FIG. 4 shows a change in infrared intensity distribution radiated by the infrared source when the grating depth D of the infrared source is changed. The grating depth shown in FIG. 4(B) is larger than the grating depth shown in FIG. 4(A), and the grating depth shown in FIG. 4(C) is larger than the grating depth shown in FIG. 4(B). As shown in FIG. 4, as the grating depth D is increased, the first peak wavelength $\lambda_1$ is increased. Accordingly, the first peak wavelength $\lambda_1$ can be matched with a specific wavelength $\lambda$ by adjusting the grating depth D. In FIG. 4C, the first peak wavelength $\lambda_1$ is matched with the specific wavelength $\lambda$.

In Step S3030, it is determined whether or not the first peak wavelength $\lambda_1$ expressed is matched with the specific wavelength $\lambda$. When the first peak wavelength is not matched with the specific wavelength, the flow returns to Step S3020, and the grating depth D is further changed. When the first peak wavelength is matched with the specific wavelength, the current grating depth D is set to the grating depth of the infrared source 100, and the flow is ended.

Figure 5:
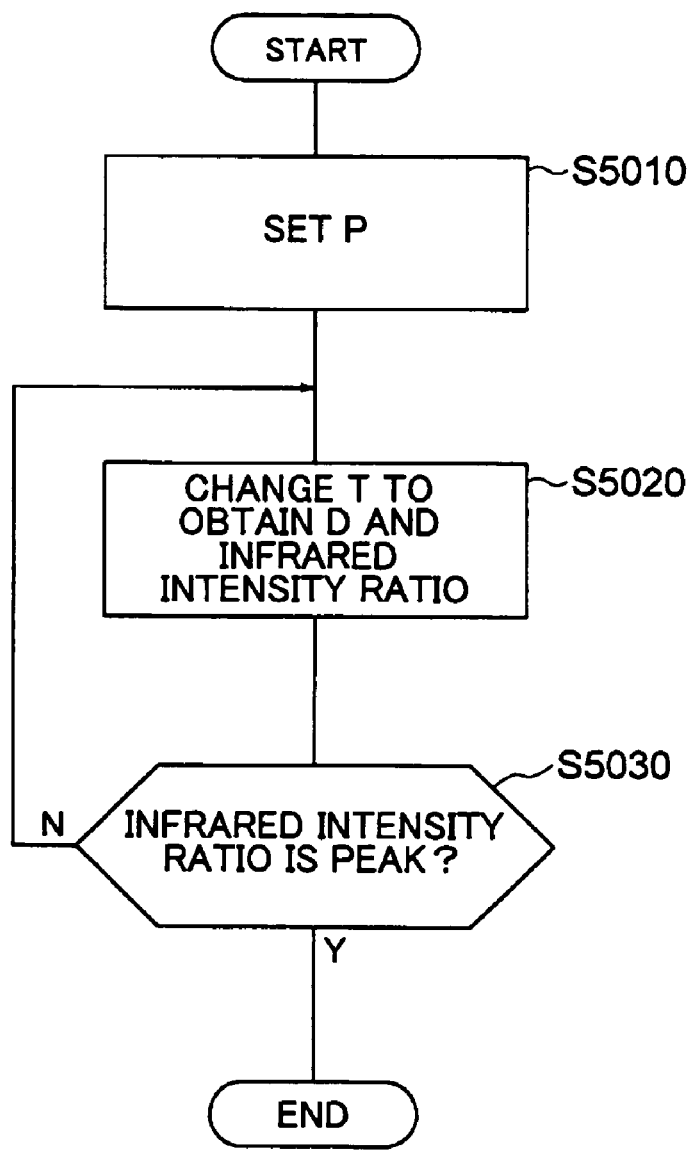
FIG. 5 is a flow chart showing a method of obtaining the grating depth D and the width T of the positive dielectric substance portion (such as dielectric) when the grating period P is set in the infrared source.

FIG. 5 is a flowchart showing a method of obtaining the grating depth D and the width T of the portions functioning as positive dielectric substance when the grating period P is set in the infrared source.

In Step S5010, when the specific wavelength $\lambda$ is set to a value, any grating period P expressed by Formula 3 is set.

$$0 < P \leq 2.0\lambda \qquad \text{[Formula 3]}$$

At this point, the grating period P is set in a range expressed by Formula 4 such that the diffraction is not generated in the infrared source.

$$0 < P \leq 0.5\lambda \qquad \text{[Formula 4]}$$

In Step S5020, the grating depth D in which the first peak wavelength is matched with the specific wavelength and the infrared intensity ratio at the grating depth are obtained by changing the width T of the portions functioning as positive dielectric substance (such as a dielectric substance). Specifically, after the width T of the portions functioning as positive dielectric substance (such as a dielectric substance) is set to a certain value, the grating depth D in which the first peak wavelength is matched with the specific wavelength and the infrared intensity ratio at the grating depth are obtained according to the flowchart shown in FIG. 3. Then, after the width T of the portions functioning as positive dielectric substance (such as a dielectric substance) is set to another value, the grating depth D in which the first peak wavelength is matched with the specific wavelength and the infrared intensity ratio at the grating depth are obtained according to the flowchart shown in. 3. While the width T of the portions functioning as positive dielectric substance (such as a dielectric substance) is changed by repeating the above steps, the grating depth D in which the first peak wavelength is matched with the specific wavelength and the infrared intensity ratio at the grating depth are obtained with respect to the width T of the portions functioning as positive dielectric substance (such as a dielectric substance).

Figure 6:
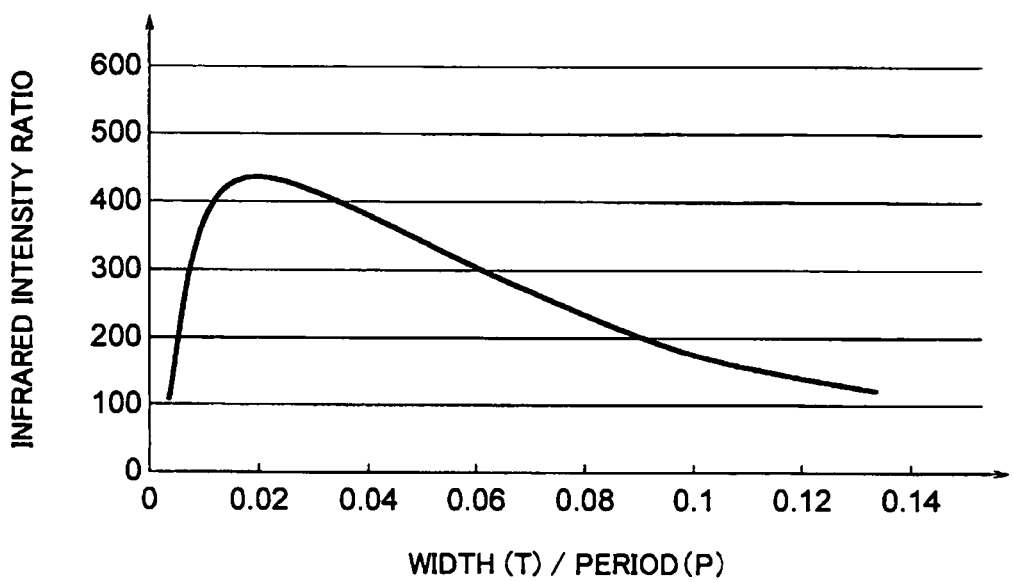
FIG. 6 is a view showing a change in intensity ratio of infrared rays in a specific wavelength when changing the width T of the positive dielectric substance portion (such as dielectric) of the infrared source.

FIG. 6 shows a change in infrared intensity ratio in a specific wavelength when the width T of the portions functioning as positive dielectric substance (such as a dielectric substance) of the infrared source is changed. The portions functioning as negative dielectric substance (such as metals) 103 of the grating 101 is made of gold and the portions functioning as positive dielectric substance portion (such as a dielectric substance) 105 is air. In FIG. 6, the horizontal axis indicates a ratio of width T of portions functioning as positive dielectric substance (such as a dielectric substance) to a predetermined grating period P, and the vertical axis indicates the infrared intensity ratio at the specific wavelength matched with the first peak. As shown in FIG. 6, the infrared intensity ratio at the specific wavelength exhibits a peak with respect to a specific value of width T of the portions functioning as positive dielectric substance (such as a dielectric substance). Specifically, the specific wavelength is 9.6 μm and the predetermined grating period P is 3 μm.

$$T/P = 0.02 \quad \text{[Formula 5]}$$

That is, the infrared intensity ratio exhibits the peak for width T of the portions functioning as positive dielectric substance (such as a dielectric substance) of 0.06 μm (60 nm).

As can be seen from FIG. 6, in the specific wavelength, the infrared intensity ratio has sufficient magnitude only in the range expressed by Formula 6.

$$T \leq 0.5P \quad \text{[Formula 6]}$$

In Step S5030 shown in FIG. 5, it is determined whether or not width T of the portions functioning as positive dielectric substance (such as a dielectric substance), corresponds to the peak of the curve of the infrared intensity ratio in FIG. 6. When the width T does not correspond to the peak of the curve, the flow returns to Step S5020, the width T is further changed. When the width T corresponds to the peak of the curve, the width T is set to the current width of the portions functioning as positive dielectric substance (such as a dielectric substance) of the infrared source 100.

Figure 7:
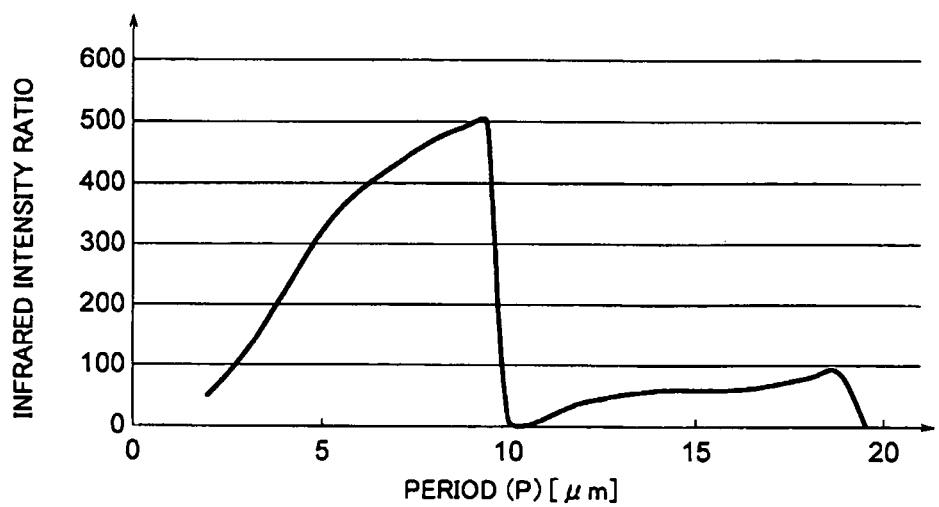
FIG. 7 is a view showing a change in the intensity ratio of infrared rays in the specific wavelength when changing the grating period P of the infrared source.

FIG. 7 shows a change in infrared intensity ratio in a specific wavelength when the grating period P of the infrared source is changed while the width T of the portions functioning as positive dielectric substance (such as a dielectric substance) is kept constant. The portions functioning as negative dielectric substance (such as metals) 103 of the grating 101 is made of gold and the portions functioning as positive dielectric substance (such as a dielectric substance) 105 is air. In FIG. 7, the horizontal axis indicates a predetermined grating period P, and the vertical axis indicates the infrared intensity ratio at the specific wavelength matched with the first peak. As shown in FIG. 7, the infrared intensity ratio at the specific wavelength exhibits a peak with respect to a specific value of the grating period P. Specifically, the specific wavelength is 9.6 μm and the width T is 400 nm.

$$P = 9.4 \, \mu m \quad \text{[Formula 7]}$$

That is, the infrared intensity ratio exhibits the peak for the value in which the grating period P is close to the specific wavelength.

As can be seen from FIG. 7, in the specific wavelength, the infrared intensity ratio has sufficient magnitude only in the range expressed by Formula 8.

$$0 < P \leq 2.0\lambda \quad \text{[Formula 8]}$$

The method in which the grating period P is set and then the grating depth D and the width T of the portions functioning as positive dielectric substance (such as a dielectric substance) are set such that the infrared intensity ratio is maximized in the desired specific wavelength are described above. Instead of the above method, the grating depth D is set and then the grating period P and the width T are set such that the infrared intensity ratio is maximized in the desired specific wavelength. Alternatively, the width T is set and the grating period P and the grating depth D are set such that the infrared intensity ratio is maximized in the desired specific wavelength.

In each case, the grating period P and the width T are set so as to satisfy the following relationship expressed by formulas 9 and 10.

$$0 < P \leq 0.5\lambda \quad \text{[Formula 9]}$$

$$T \leq 0.5P \quad \text{[Formula 10]}$$

Figure 52:
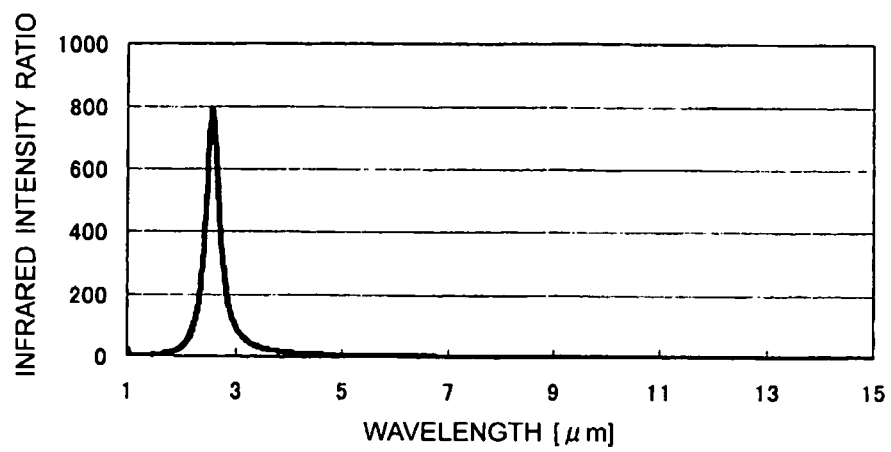
FIG. 52 is a view showing the infrared intensity ratio of the infrared source obtained according to methods shown in FIGS. 3 and 5, when the specific wavelength is 2.5 µm.
Figure 53:
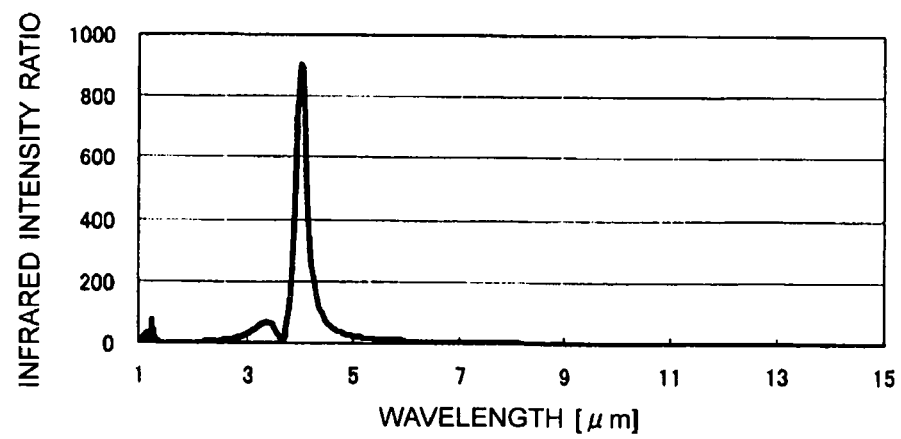
FIG. 53 is a view showing the infrared intensity ratio of the infrared source obtained according to the methods shown in FIGS. 3 and 5, when the specific wavelength is 4.0 µm.
Figure 54:
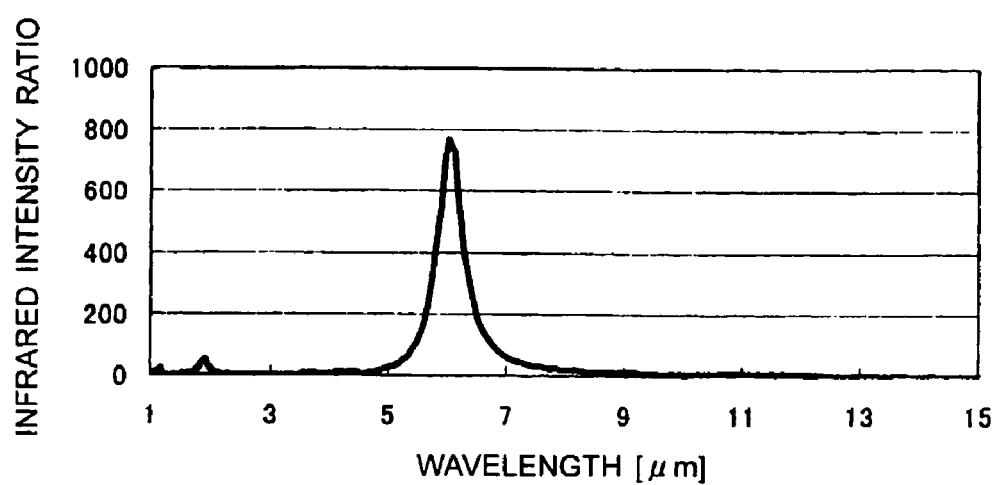
FIG. 54 is a view showing the infrared intensity ratio of the infrared source obtained according to the methods shown in FIGS. 3 and 5, when the specific wavelength is 6 µm.

FIGS. 52 to 54 show infrared intensity ratio of the infrared source, obtained according to methods shown in FIGS. 3 and 5, when specific wavelengths are 2.5 μm, 4.0 μm, and 6 μm, respectively.

Tables 1 to 3 represent specifications of the infrared source obtained according to the methods shown in FIGS. 3 and 5, when the specific wavelengths are 2.5 μm, 4.0 μm, and 6 μm, respectively.

TABLE 1

| Grating period P [μm] | Grating depth D [μm] | Positive dielectric substance portion width T [μm] | Peak wavelength λ [μm] | Infrared intensity ratio |
|---|---|---|---|---|
| 1 | 0.378 | 0.041 | 2.52 | approx. 781 |

TABLE 2

| Grating period P [μm] | Grating depth D [μm] | Positive dielectric substance portion width T [μm] | Peak wavelength λ [μm] | Infrared intensity ratio |
|---|---|---|---|---|
| 3.64 | 0.66 | 0.1 | 4.0 | approx. 900 |

TABLE 3

| Grating period P [μm] | Grating depth D [μm] | Positive dielectric substance portion width T [μm] | Peak wavelength λ [μm] | Infrared intensity ratio |
|---|---|---|---|---|
| 4.53 | 1.13 | 0.155 | 6.0 | approx. 770 |

Hereinafter, a principle of an infrared source of the present invention will be explained. A predetermined grating period is P, a width of a portion functioning as positive dielectric substance in a predetermined direction is T, and a grating depth is D. In the infrared source of the present invention, the following Formula 11 is obtained.

$$T \leq 0.5P \quad \text{[Formula 11]}$$

Since the width of the portion functioning as positive dielectric substance is generally smaller than that functioning as negative dielectric substance, the grating can be regarded as a form in which slab waveguides with a core of a positive dielectric substance inserted into a clad of a negative dielectric substance and having a finite length D are periodically arranged. A physical phenomenon, which is a basis of the infrared source of the present invention, is a resonance phenomenon caused by a reflection of a surface wave mode of the slab waveguides on both edges across the finite length.

Herein, the positive dielectric means that a real part of dielectric constant is a positive value and the negative dielectric means that a real part of dielectric constant is a negative value. The positive dielectric is general nonmetal materials, specifically, glass, metal oxide, metal fluoride, ceramics, semiconductor, polymer, liquid, or the like. Also, air or other gases, and a vacuum space are also included in the positive dielectric. Meanwhile, the negative dielectric is metal materials in a frequency lower than a plasma frequency, that is, in a visible light region or an infrared light region, mixed materials of the positive dielectric substances and metals, or the like. In addition, silicon carbide in a far infrared light region, materials indicating resonance of large lattice vibration such as various ionic crystals, semiconductor material such as silicon in a state where carriers are excited, and the like are also included in the negative dielectric.

A surface wave mode propagated along the surface exists at an interface of the negative dielectric and the positive dielectric, wherein electric field is vertical to the interface, electromagnetic field has a peak value at the interface, and electromagnetic field is distributed to be exponentially attenuated in proportion to a distance from the interface. In particular, for materials with a small imaginary component value of dielectric constant, such a surface wave may be propagated over a long distance. The surface wave in the case of using metal materials as the negative dielectric is referred to as surface plasmon.

When the grating period P is sufficiently small as compared to the specific wavelength λ, most of optical characteristics of the overall grating are determined by optical characteristics of one unit structure configuring the grating, that is, each of the slab waveguides having the finite length.

Figure 47:
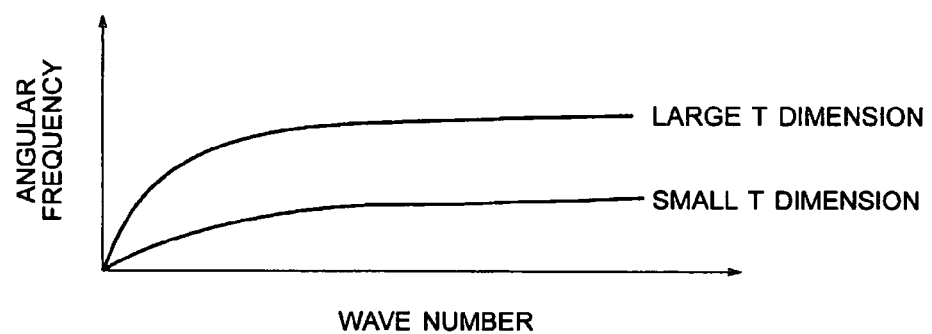
FIG. 47 is a view showing a relation between a wave number of a surface wave and an angular frequency in a unit structure of the grating.

FIG. 47 shows a relation between wave number of the surface wave expressed by the following Formula 12 and angular frequency expressed by the following Formula 13.

$$k_p = 2\pi/\lambda_p$$ [Formula 12]

$$\omega = 2\pi c/\lambda$$ [Formula 13]

where, $$\lambda_p$$ [Formula 14]

$\lambda_p$ represents a wavelength of the surface wave, and c represents the light velocity.

$$\lambda_p$$ [Formula 15]

$\lambda_p$, the wavelength of the surface wave, becomes small as a thickness T of a core becomes small at a predetermined angular frequency. In other words, if two of the thickness T of the core, the angular frequency ω, and the wavelength of the surface wave of the following Formula 16 are determined, the remaining one is determined.

$$\lambda_p$$ [Formula 16]

Figure 48:
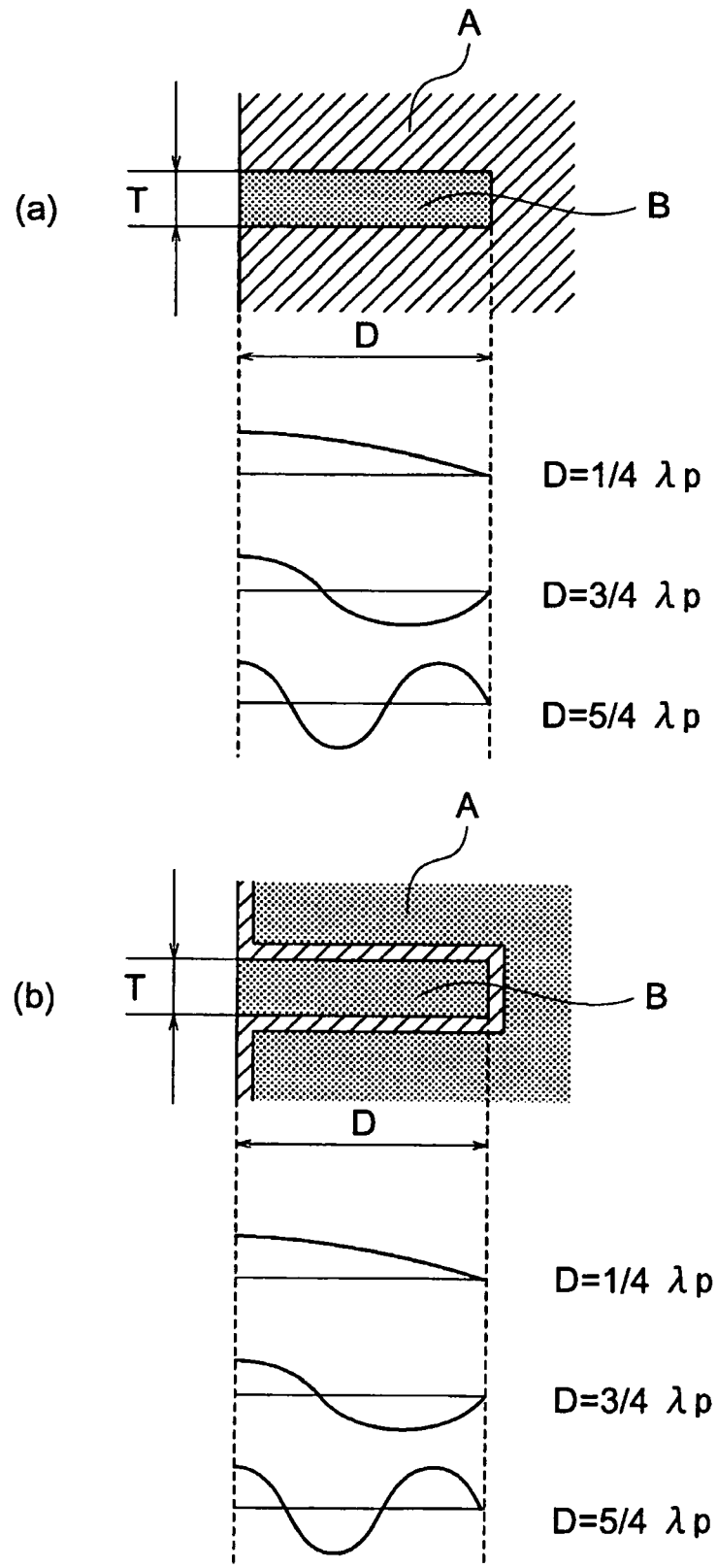
FIG. 48 is a view showing a relation between the unit structure of the grating and the surface wave.

FIG. 48 shows a relation between the unit structure of the grating and the surface wave. In FIG. 48, a portion functioning as negative dielectric substance and a portion functioning as positive dielectric substance are represented by A and B, respectively, and negative dielectric substance is represented by a diagonally shaded area.

In FIG. 48(*a*), a portion functioning as negative dielectric substance A is made of negative dielectric substance (for example, metal). In FIG. 48(*b*), a portion functioning as negative dielectric substance A is formed by coating negative dielectric substance (for example, metal) on positive dielectric substance (for example, plastic).

As shown in FIG. 48, one side is an opening end and the other side is a closed end. In this case, when length D of the waveguide comes to be matched with plurality of values given in the following Formula 17, $$(1/4)\lambda_p, (3/4)\lambda_p, (5/4)\lambda_p \ldots,$$ [Formula 17]

the surface wave with the wavelength of the following Formula 18 is resonated.

$$\lambda_p$$ [Formula 18]

The plurality of resonance modes of the waveguide are designated by numbers such as a first resonance mode (first peak wavelength) and a second resonance mode (second peak wavelength) in decreasing order of wavelength of the following Formula 19.

$$\lambda_p$$ [Formula 19]

From the forgoing, in the slab waveguide having the finite length, if two of the angular frequency ω, the thickness T of the core, and the length D of the waveguide are determined in each resonance mode, the remaining one is determined.

Until now, although the extreme case where the period P does not have an effect on the resonance has been considered, the conditions generating resonance modes are actually affected by the period P. When the period P is close to the wavelength λ in a vacuum state corresponding to the angular frequency ω, the effect of the period P on the condition generating resonance modes is significantly large. Therefore, in the grating where the slab waveguides having the finite length are periodically arranged, if three of the angular frequency ω, the thickness T of the core, the length D of the waveguide, and the period P are determined, the remaining one is determined.

Actually, the grating period P, the width T of the portion functioning as positive dielectric substance, and the grating depth D are determined by repeated calculation as explained in FIGS. 3 to 7 so that the emissivity is maximized in the specific wavelength λ.

Since the resonance modes in the grating have an electric field component vertical to the interface of the positive dielectric and the negative dielectric, a plane wave having the polarization plane orthogonal to the arrangement direction of the grating is symmetrical with the electromagnetic field. Therefore, when the resonance modes are generated in the grating, the plane wave with the specific wavelength λ having the polarization plane can be radiated from the grating to the space in a normal direction to the grating plane.

Meanwhile, in the resonance mode the plane wave having the polarization plane parallel to the arrangement direction of the grating, cannot be radiated.

Figure 49:
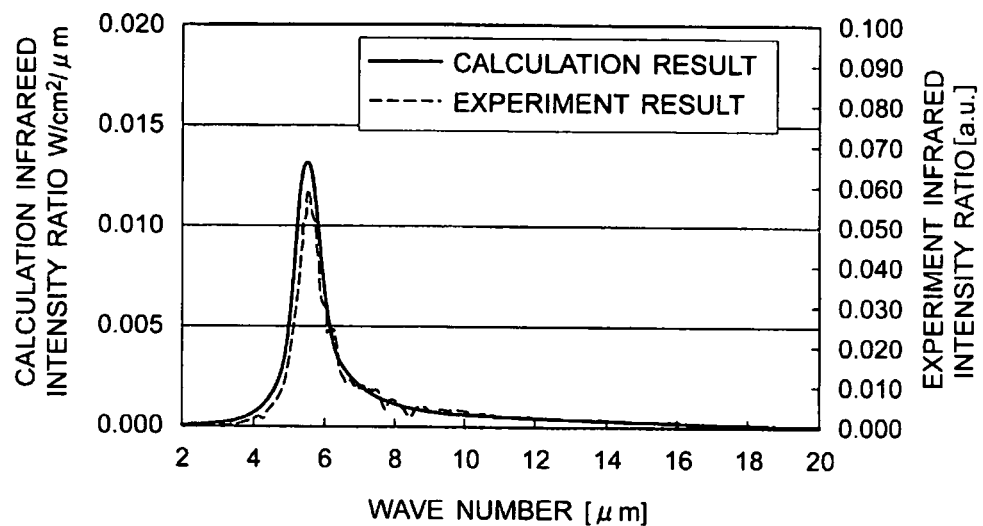
FIG. 49 is a view showing a relation between the wavelength and the infrared intensity of the infrared source according to one embodiment of the present invention.

FIG. 49 is a view showing a relation between wavelength and infrared intensity of the infrared source according to one embodiment of the present invention. It shows calculation results (scale on the left side) and experiment results (scale on the right side).

The dimensions of the grating portion are as follows:

| Size | 8 mm × 8 mm |
|------|-------------|
| P    | 3.0 μm      |
| D    | 1.0 μm      |
| T    | 0.35 μm     |

The temperature of the heating element is 250° C. and radiation intensity per unit area in the infrared source with the area of the grating portion of 8 mm×8 mm is about 0.01 to 0.1 W/cm²/μm.

A distance at which radiation can be uniformly detected depends on an area of the grating portion of the infrared source, a surface temperature, and a sensitivity of the light receiving sensor. The detectable distance is at least several meters when the area of the grating portion of the infrared source is several millimeters square and the surface temperature is 250° C. When the area of the grating portion of the infrared source is 8 millimeters square and the surface temperature is 250° C., radiation can be detected even by the use of a general triglycine sulfate detector at a distance several meters away from the infrared source. The triglycine sulfate detector is an infrared detector using an effect called a pyroelectric effect that charge is changed by heat generated by irradiation of light. Among various infrared detectors, the triglycine sulfate detector is featured by a remarkably wide detectable wavelength range. Its sensitivity is low compared to those of other detectors. The infrared intensity is so large that even such a low sensitivity detector can detect it at a distance of several meters.

Figure 50:
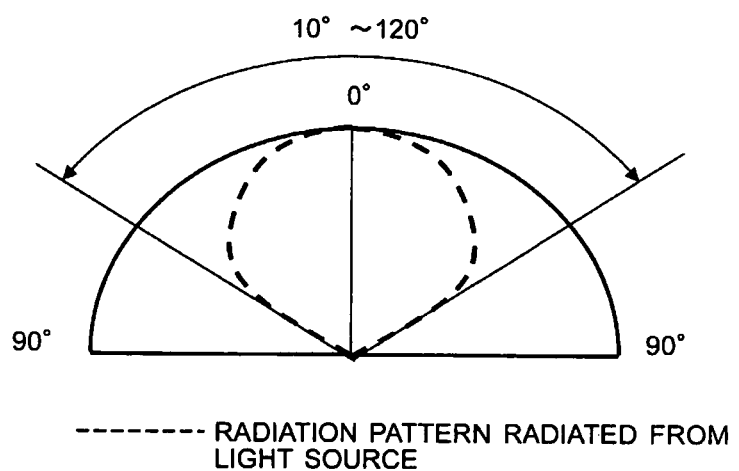
FIG. 50 is a view showing radiation directivity of the infrared source according to one embodiment of the present invention.

FIG. 50 is a view showing radiation directivity of the infrared source according to one embodiment of the present invention. By forming a metal film for suppressing unnecessary radiation, infrared light is radiated only from the grating and is directed only into a half-space in such a way that the radiation is maximized in the normal direction. The radiation pattern is similar to that of a general plane-type light source.

Figure 8:
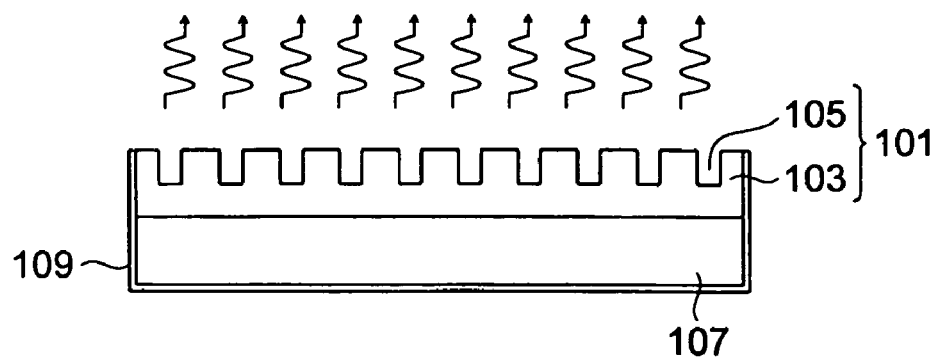
FIG. 8 is a view showing a configuration of an infrared source according to one embodiment of the present invention.

FIG. 8 shows a configuration of an infrared source according to an embodiment of the invention. A grating 101 including portions functioning as negative dielectric substance (such as metals) 103 is provided on a heating element 107. In the embodiment, portions functioning as positive dielectric substance (such as a dielectric substance) 105 is formed as an empty space. The portions functioning as negative dielectric substance (such as metals) 103 of the grating 101 and the heating element 107 are accommodated in a metal case 109. The metal case 109 suppresses infrared radiation from portions other than the grating 101. The metal of the case 109 may be the same metal as that of the portions functioning as negative dielectric substance (such as metals) 103 of the grating 101 or the metal of the case 109 may be different from that of the portions functioning as negative dielectric substance (such as metals) 103.

The infrared source of the embodiment can be produced by the following procedure. A metal film is deposited on the heating element 107, and a resist is applied onto the metal film. A grating pattern is formed by electron beam drawing or mask exposure, and etching is performed. Alternatively, a metal film is deposited on the heating element 107, and imprinting is performed to form the grating pattern in the metal film using a high-temperature metal mold in which a grating is formed. For example, vacuum evaporation and sputtering can be used to deposit the metal film.

Figure 9:
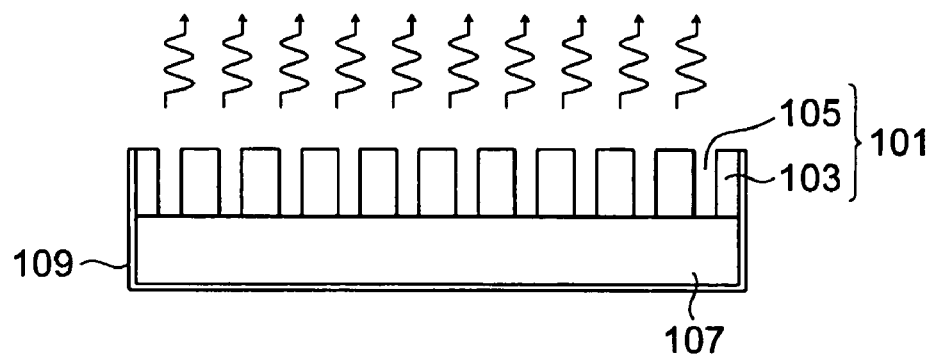
FIG. 9 is a view showing a configuration of an infrared source according to another embodiment of the present invention.

FIG. 9 shows a configuration of an infrared source according to another embodiment of the invention. Metal grating projections are provided on a heating element 107. The grating projections correspond to the portions functioning as negative dielectric substance (such as metals) 103. In the embodiment, portions functioning as positive dielectric substance (such as a dielectric substance) 105 are formed as an empty space. The metal grating projections 103 and the heating element 107 are accommodated in the metal case 109. The metal case 109 suppresses the infrared radiation from portions other than the grating 101. The metal of the case 109 may be the same metal as that of the portions functioning as negative dielectric substance (such as metals) 103 of the grating 101 or the metal of the case 109 may be different from that of the portions functioning as negative dielectric substance (such as metals) 103.

The infrared source of the embodiment can be produced by the following procedure. A metal film is deposited on the heating element 107, and a resist is applied onto the metal film. Then, a grating pattern is formed by the electron beam drawing or mask exposure, and the etching is performed. For example, vacuum evaporation and sputtering can be used to deposit the metal film.

Figure 10:
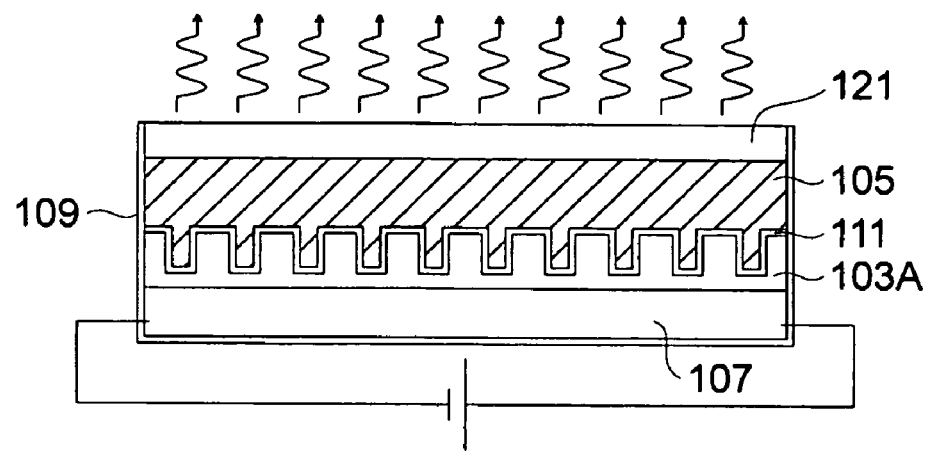
FIG. 10 is a view showing a configuration of an infrared source according to another embodiment of the present invention.

FIG. 10 shows a configuration of an infrared source according to another embodiment of the invention. In the embodiment, a shape of a grating is formed in a positive dielectric substance (such as a dielectric substance) 105 and a metal film 111 is deposited thereon, and a material 103A is placed. The material 103A is a bonding material such as ceramic adhesive and epoxy adhesive or metal. The positive dielectric substance (such as a dielectric substance) 105 is made of a semiconductor material such as silicon. The material 103A and the heating element 107 are connected to each other. An antireflection coating 121 is provided on an infrared radiant surface of the infrared source to improve radiant efficiency of the infrared source. The heating element 107, the metal film 111, the material 103A, the positive dielectric substance (such as a dielectric substance) 105, and the antireflection coating 121 are accommodated in a metal case 109. The metal case 109 suppresses the infrared radiation from portions other than the grating 101. The metal of the case 109 may be the same metal as that of the metal film 111 or the metal of the case 109 may be different from that of the metal film 111.

Figure 11:
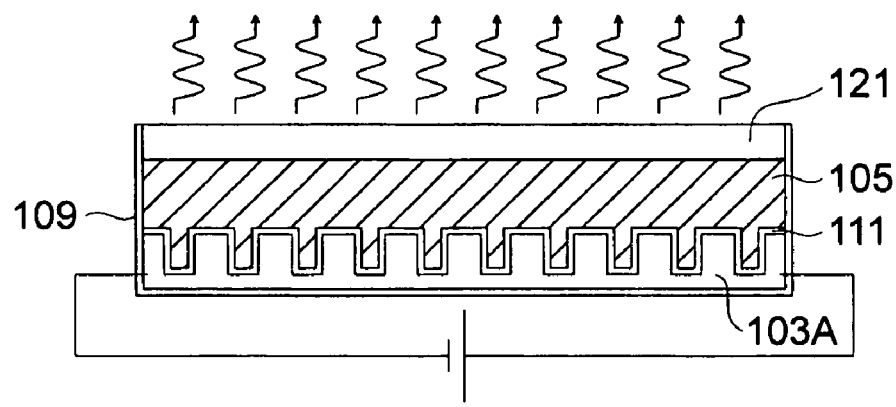
FIG. 11 is a view showing a configuration of an infrared source according to another embodiment of the present invention.

FIG. 11 shows a configuration of an infrared source according to another embodiment of the invention. In the embodiment, a material 103A functions also as the heating element. In the embodiment, a shape of a grating is formed in a positive dielectric substance (such as a dielectric substance) 105, a metal film 111 is deposited thereon, and the material 103A is placed. The positive dielectric substance (such as a dielectric substance) 105 may be made of a semiconductor material such as silicon. An antireflection coating 121 is provided on the infrared radiant surface of the infrared source to improve radiant efficiency of the infrared source. The metal film 111, the material 103A, the positive dielectric substance (such as a dielectric substance) 105, and the antireflection coating 121 are accommodated in a metal case 109. The metal case 109 suppresses infrared radiation from portions other than the grating 101. The metal of the case 109 may be the same metal as that of the metal film 111 or the metal of the case 109 may be different from that of the metal film 111.

Figure 12:
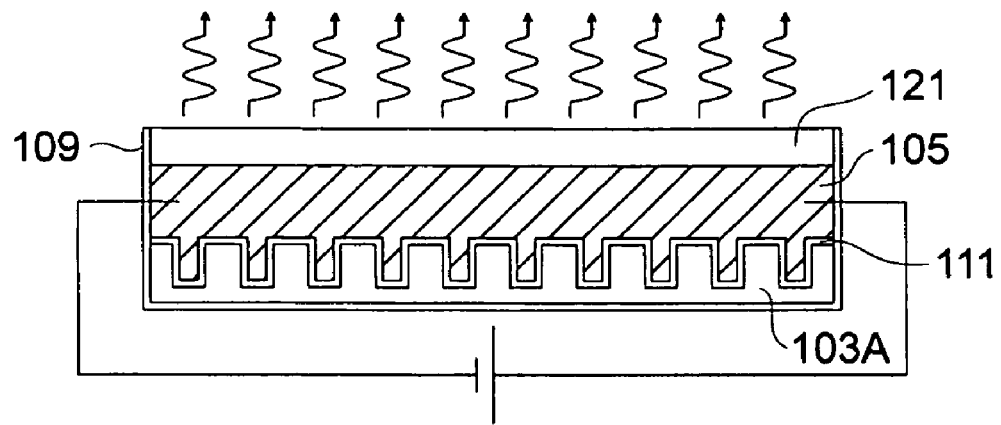
FIG. 12 is a view showing a configuration of an infrared source according to another embodiment of the present invention.

FIG. 12 shows a configuration of an infrared source according to another embodiment of the invention. In the embodiment, a positive dielectric substance (such as a dielectric substance) 105 functions also as a heating element. The positive dielectric substance (such as a dielectric substance) 105 may be made of a semiconductor material such as silicon. In the embodiment, a shape of a grating is formed in the positive dielectric substance (such as a dielectric substance) 105, a metal film 111 is deposited thereon, and a material 103A is placed. An antireflection coating 121 is provided on the infrared radiant surface of the infrared source to improve radiant efficiency of the infrared source. The metal film 111, the material 103A, the positive dielectric substance portion (such as a dielectric substance) 105, and the antireflection coating 121 are accommodated in a metal case 109. The metal case 109 suppresses the infrared radiation from portions other than the grating 101. The metal of the case 109 may be the same metal as that of the metal film 111 or the metal of the case 109 may be different from that of the metal film 111.

The infrared sources of the embodiments shown in FIGS. 10 to 12 can be produced by the following procedure. The metal film is deposited on the positive dielectric substance (such as a dielectric substance) 105, and a resist is applied onto the metal film. A grating pattern is formed by the electron beam drawing or mask exposure, and the metal film 111 and the material 103A are formed. Polishing is performed to the deposited surface. In the case where a heating element 107 is used, the material 103A is connected to the heating element 107 with a bonding material. Then, the metal film is formed in the periphery to form the case 109. For example, vacuum evaporation and sputtering can be used to form the metal film.

If the latest semiconductor manufacturing technology is utilized, the grating period P and the width T of the portions functioning as positive dielectric substance (such as a dielectric substance) can be decreased up to 30 nm. The grating depth D can be increased up to approximately 50 times the width T.

Figure 13:
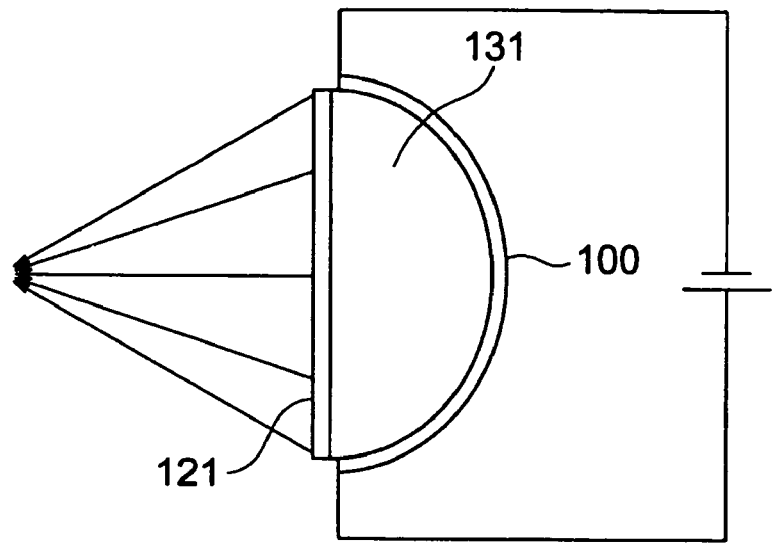
FIG. 13 is a view showing a configuration of an infrared source according to another embodiment of the present invention.

FIG. 13 shows a configuration of an infrared source according to another embodiment of the invention. A lens 131 has a flat surface on one side and a convex surface on the other side, and the infrared source 100 is provided on the convex surface so as to emit infrared rays toward the lens 131. The infrared rays radiated from the infrared source 100 are focused by the lens 131. An antireflection coating 121 is provided in the flat surface of the lens 131 to improve radiant efficiency of the infrared source.

Figure 14:
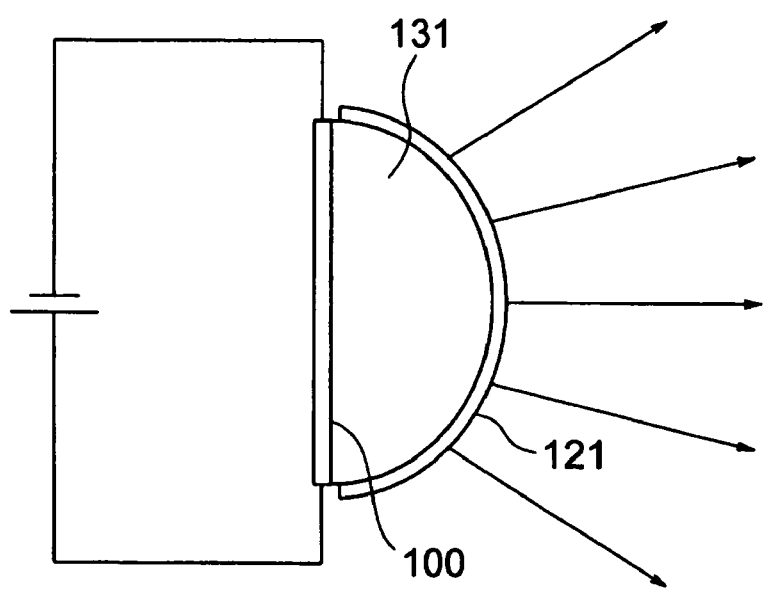
FIG. 14 is a view showing a configuration of an infrared source according to another embodiment of the present invention.

FIG. 14 shows a configuration of an infrared source according to another embodiment of the invention. A lens 131 has a flat surface on one side and a convex surface on the other side, and the infrared source 100 is provided the flat surface so as to emit infrared rays toward the lens 131. The infrared rays radiated from the infrared source 100 are diverged by the lens 131. An antireflection coating 121 is provided in the convex surface of the lens 131 to improve radiant efficiency of the infrared source.

Figure 15:
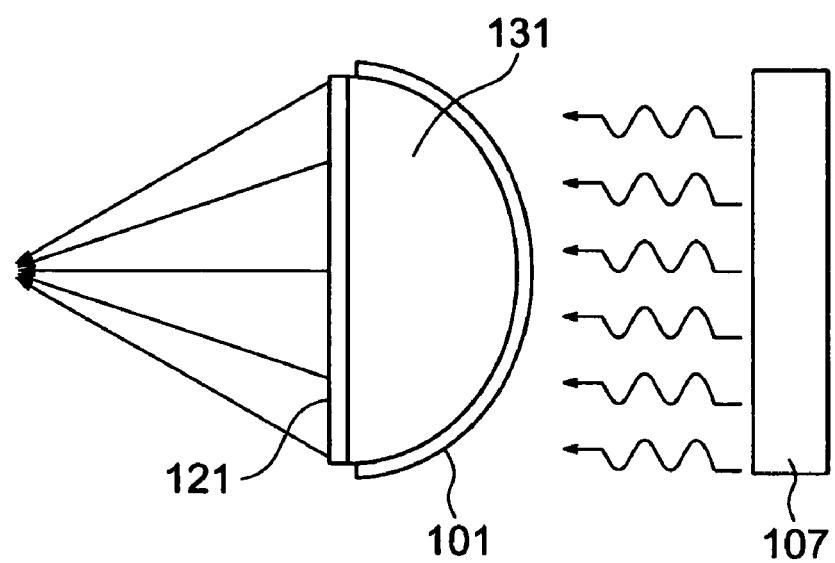
FIG. 15 is a view showing a configuration of an infrared source according to another embodiment of the present invention.

FIG. 15 shows a configuration of an infrared source according to another embodiment of the invention. A lens 131 has a flat surface on one side and a convex surface on the other side, and a grating 101 is provided on the convex surface of the lens 131. A heating element 107 is arranged at a position where the heating element 107 faces the convex surface of the lens 131. Infrared rays radiated having the specific wavelength, are taken from the infrared source 100, and the infrared rays having the specific wavelength are focused by the lens 131. An antireflection coating 121 is provided on the flat surface of the lens 131 to improve radiant efficiency of the infrared source.

Figure 16:
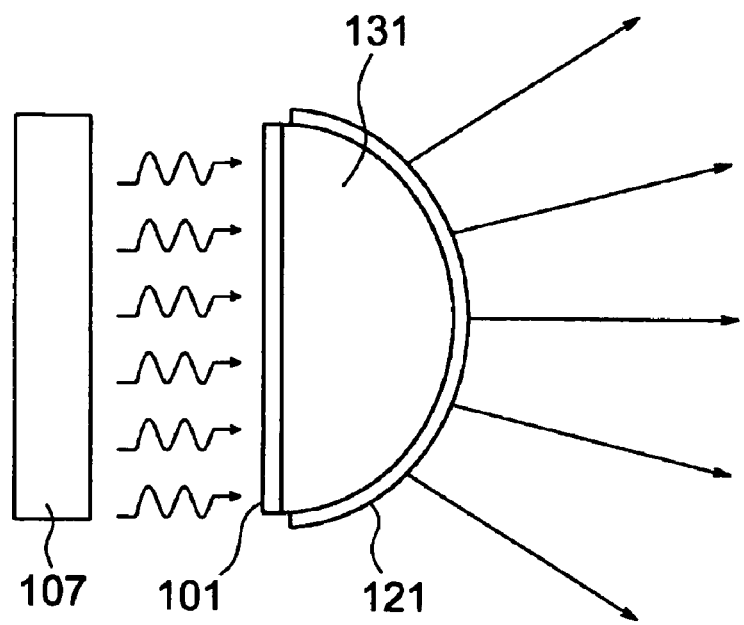
FIG. 16 is a view showing a configuration of an infrared source according to another embodiment of the present invention.

FIG. 16 shows a configuration of an infrared source according to another embodiment of the invention. A lens 131 has a flat surface on one side and a convex surface on the other side, and a grating 101 is provided on the flat surface of the lens 131. Infrared rays having the specific wavelength, are radiated from the infrared source 100 by the grating 101, and the infrared rays having the specific wavelength are diverged by the lens 131. An antireflection coating 121 is provided on the convex surface of the lens 131 to improve radiant efficiency of the infrared source.

The lenses of the embodiments shown in FIGS. 13 to 16 are formed in a flat-convex shape. Alternatively, the grating 101 may be provided on one of the surfaces of a flat-concave lens or a concave-convex lens.

Figure 17A:
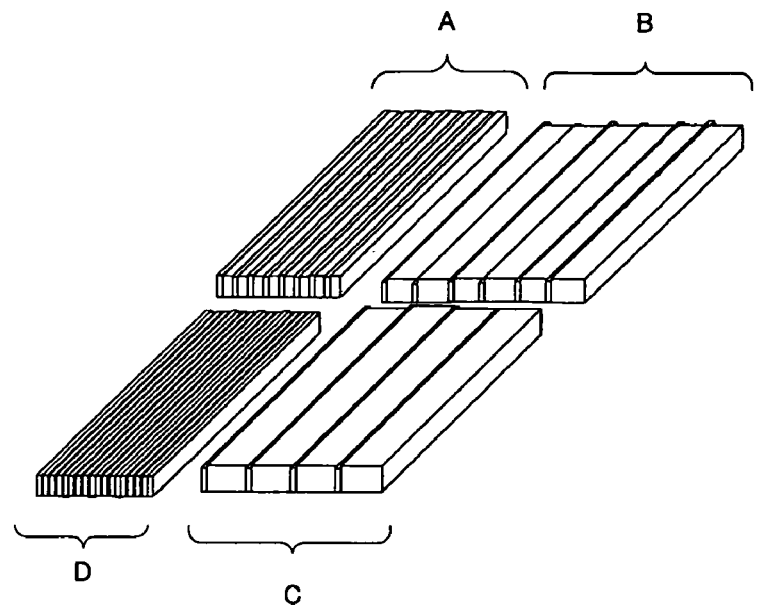
FIG. 17A is a view showing a configuration of a grating of an infrared source according to another embodiment of the present invention.

FIG. 17A shows a configuration of a grating of an infrared source according to another embodiment of the invention. In the embodiment, multiple gratings having different specific wavelengths are provided on a one-chip heating element. Specifically, in regions A to D, the grating depth D is kept constant, and the grating period P and the width T of the portions functioning as positive dielectric substance (such as a dielectric substance) are changed, so that the peak wavelength varies from region A to region D while electric field intensity can be increased. The grating period P may be kept constant in each region. According to the embodiment, an infrared source having the multiple specific wavelengths is obtained on the one chip.

Figure 17B:
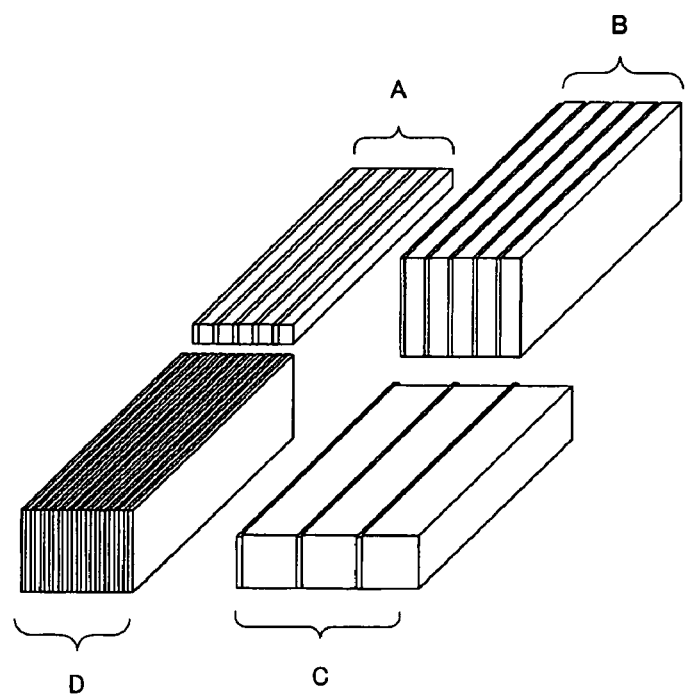
FIG. 17B is a view showing a configuration of a grating of an infrared source according to another embodiment of the present invention.

FIG. 17B shows a configuration of a grating of an infrared source according to another embodiment of the invention. In the embodiment, multiple gratings having different specific wavelengths are provided on the one-chip heating element. Specifically, in regions A to D, the width T of the portions functioning as positive dielectric substance (such as a dielectric substance) is kept constant, and the grating period P and the grating depth D are changed, so that the peak wavelength varies from region A to region D while electric field intensity can be increased. The grating period P may be kept constant in each region. According to the embodiment, an infrared source having multiple specific wavelengths is obtained on one chip.

Figure 18:
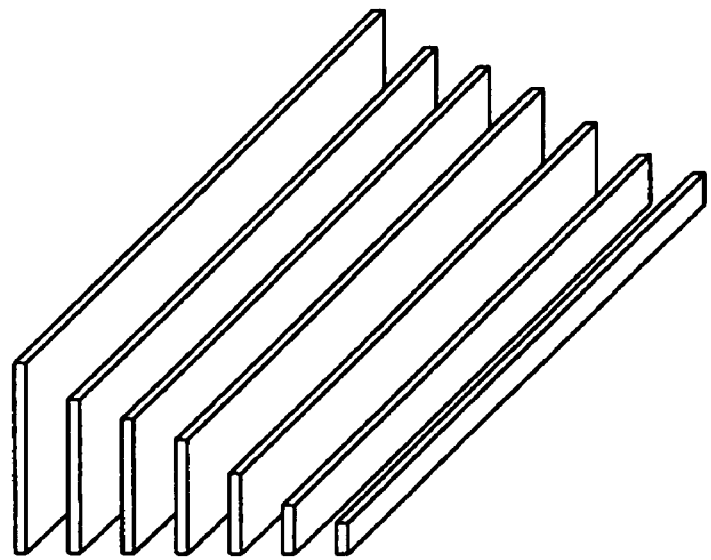
FIG. 18 is a view showing a configuration of a grating of an infrared source according to another embodiment of the present invention.

FIG. 18 shows a configuration of a grating of an infrared source according to another embodiment of the invention. In the embodiment, the grating period P and the width T of the positive dielectric substance portion (such as a dielectric substance) are kept constant, and the grating depth D is changed.

Figure 20:
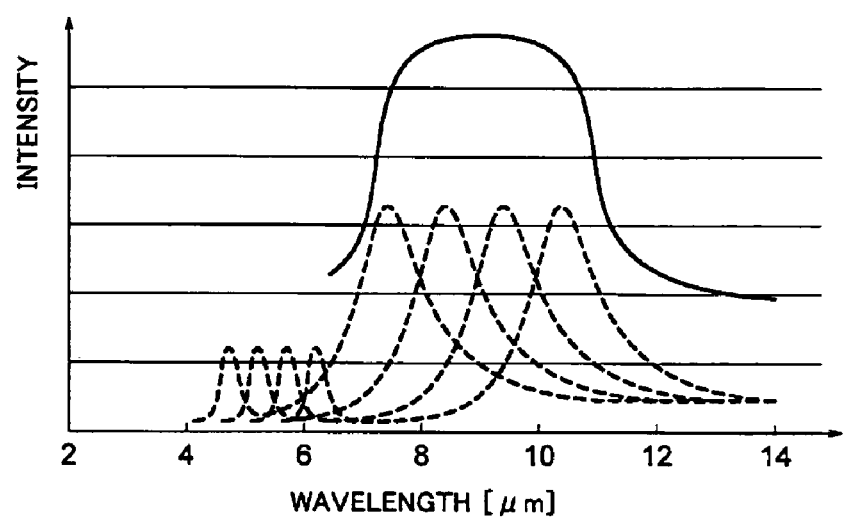
FIG. 20 is a view conceptually showing the intensity distribution of infrared rays radiated according to the embodiment of FIG. 18.
Figure 21:
FIG. 21 is a view for explaining a first embodiment.
Figure 21:
Figure 21:
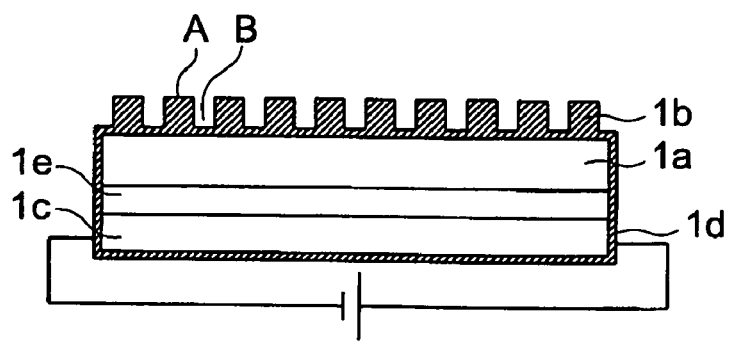

FIG. 20 conceptually shows infrared intensity distribution radiated by the embodiment of FIG. 18. According to the embodiment, the infrared source which emits infrared rays having a predetermined wavelength range is obtained.

Figure 19:
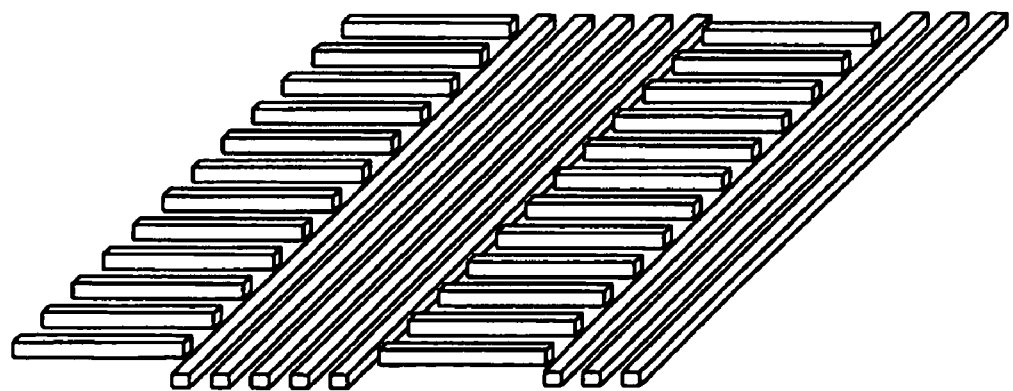
FIG. 19 is a view showing a configuration of a grating of an infrared source according to another embodiment of the present invention.

FIG. 19 shows a configuration of a grating of an infrared source according to another embodiment of the invention. In the embodiment, multiple gratings having different directions are provided on a one-chip heating element. According to the embodiment, an infrared source having the plural specific wavelengths whose polarized directions are different from one another is obtained.

According to the present invention, an infrared source for a specific wavelength, which has a simple structure and can be applied in various fields.

Hereinafter, first to twenty-first embodiments of the infrared source according to the present invention will be described with reference to FIGS. 21 to 45. In FIGS. 21 to 30, a portion functioning as negative dielectric substance and a portion functioning as positive dielectric substance are represented by A and B, respectively. Further, negative dielectric substance is represented by a diagonally shaded area.

First Embodiment

FIG. 21

In the present embodiment, a grating portion is directly formed on a flat surface formed on a substrate. Gold, or the like (1b) is formed as a film on a surface of a substrate (1a), a resist is applied thereon, and a grating pattern is formed thereon by electron beam lithography, interference exposure, and mask exposure, etc. The grating is manufactured on a surface by dry etching, or the like. Alternatively, there is a method in which the grating is manufactured on the surface by a direct imprinting of a master grating. A structure that resin (plastic) or glass, etc. is sandwiched between the substrate and the gold can also be employed.

Next, a heating element (1c) and the substrate (1a) are adhered to each other. Epoxy-based adhesives or ceramic-based adhesives (1e) may be placed between the heating element and the substrate. If portions other than that corresponding to the grating in the substrate and the heating element are coated with metal (1d), or the like with high reflectance of infrared light, radiation of unnecessary infrared light is suppressed, thereby improving energy efficiency.

Figure 51:
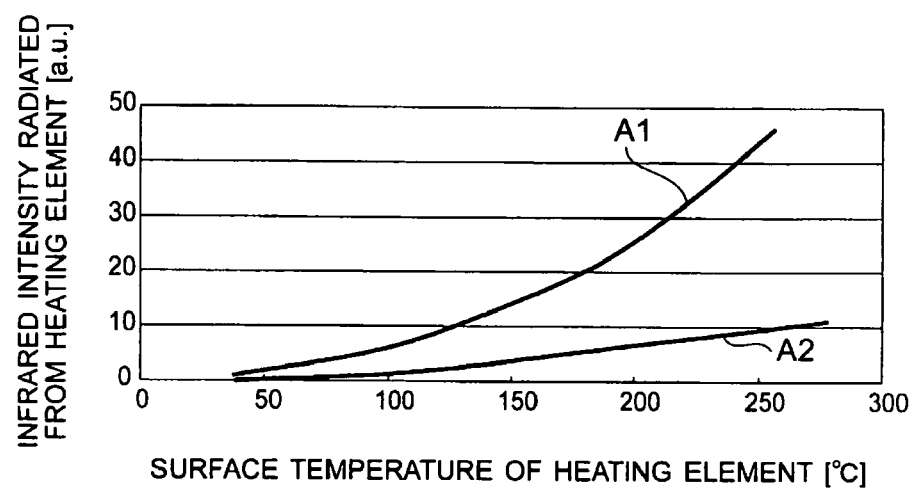
FIG. 51 is a view showing a relation between a surface temperature of a heating element and the infrared intensity radiated from the heating element.

FIG. 51 is a view showing a relation between a surface temperature of the heating element and intensity of infrared light radiated from the heating element. In FIG. 51, A2 shows a case where the surfaces of the heating element are coated with gold and A1 shows a case where they are not coated with gold. It can be appreciated from FIG. 51 that the infrared intensity radiated from the heating element is suppressed by forming a film of gold on the surfaces of the heating element. The infrared intensity is about 0.01 to 0.1 W/cm$^2$/μm when a temperature of the heating element is 250° C. and an area of the grating portion is several millimeters square.

The present embodiment is featured by a small number of manufacturing processes and resultant low manufacturing costs.

Second Embodiment

FIG. 22

A resist (2b) is applied on a substrate (2a) (resin, metal, semiconductor, or the like; in the present embodiment, Si substrate) on which the grating portion is formed (FIG. 22(a)). Next, a grating pattern is formed by electron beam lithography, interference exposure, or mask exposure (FIG. 22(b)) and a projection array is manufactured by dry etching or the like (FIG. 22(c)). As a process of manufacturing the projection array, a nano imprinting technology may be used.

Subsequently, a film of Au (2c), or the like is formed on the projection array after removing the resist (FIG. 22(d)). At this time, a film thickness is preferably several times as large as a skin depth (20 to 30 nm in the case of Au) over all surfaces. As a film forming method, a vacuum deposition method or a sputtering method may be used. Especially, an atomic layer deposition (ALD) method by which extremely uniform film thickness can be obtained is effective. As methods by which a relatively thick film can be easily obtained, there are a method of applying dispersion of ultrafine Au particles by a spin-coating or the like and then sintering it, and an electrochemical method such as electrolytic plating and electroless plating. Further, in order to secure adhesion with an adhesive to be applied on the Au film, an adhesive layer such as Cr may be formed on the Au film.

A heating element (2d) (heating element in which a resistance wire pattern of a heater is formed or the like) is adhered to the grating manufactured according to the foregoing (FIG. 22(e)). As an adhesive, epoxy-based or ceramic-based adhesives with heat resistance (2e), or the like are used. When the adhesives have significant viscosity, the filling of adhesives in the grating portion is not sufficient. Accordingly, it is preferable to use adhesives with good filling ability in the grating portion. Further, when the thickness of the adhesives is large, a peeling problem or the like may be caused by a difference in linear thermal expansion coefficient. Therefore, a thickness of the adhesives to be filled should be as thin as possible. Further, in the present embodiment, the adhesives play a role of maintaining an electrical insulation between the heater pattern of the heating element and Au.

In the process of applying the adhesives, since a portion to be filled with the adhesives has a micro structure, it is preferable to perform a vacuum defoaming prior to the adhesion to prevent mixing of bubbles into the adhesives.

Next, the Si substrate (2a) is removed from the Au surface by mechanical peeling, etching or the like (FIG. 22(f)). Herein, when the Si substrate is removed using wet etching, it is preferable to use a mixed solution of HF:HNO$_3$: CH$_3$COOH (or H$_2$O) or an aqueous solution of KOH. In the case of HF:HNO$_3$ group, it is possible to largely change etching speed depending on a concentration of CH$_3$COOH (or H$_2$O). The etching speed is about 0.3 μm/min, for example, when HF:HNO$_3$:CH$_3$COOH=1:3:5. In the case of the aqueous solution of KOH, the etching speed varies depending on crystal plane orientation due to anisotropy. In the case of silicon, it is possible to obtain the etching speed of several μm/min in Si (100) surface and Si (110) surface.

Further, when the Si substrate is mechanically peeled in FIG. 22(f), the Si substrate can be used multiple times by returning to a state of FIG. 22(d). Herein, the shape of the Au surface accurately transferred may be changed by a diffusion of Au atoms during long-term use or foreign materials precipitated in cavities so that the radiation characteristics of the light source may be changed. Therefore, in order to improve stability, it is effective to fill the cavities with positive dielectric substances (2f) such as SiO$_2$ and resin (FIG. 22(g)).

As a method of charging dielectric, there are a gas phase crystal growth of SiO$_2$, Si$_3$N$_4$, Al$_2$O$_3$, parylene, or the like by CVD method and ALD method, a vacuum deposition method, a sputtering method, a spin coat and heat hardening method such as spin on glass (SOG) and polyimide, and the like.

Further, if a film of Au (2h) or the like is formed on outer peripheral surfaces other than the grating surface, it is possible to suppress unnecessary infrared radiation (FIG. 22(h)). Further, in order to confirm the effect of Au on the outer peripheral surfaces, an experiment was carried out in which the surface temperature of the heating element and the infrared intensity was measured with and without a gold film formed on the surfaces of the heating element. As a result, it was confirmed that the infrared intensity radiated from the heating element is suppressed by a gold film.

Finally, the infrared source is completed by formation of electric wirings. If electric current is applied to the heating element, the infrared light is radiated from the Au surface in the direction represented by arrows in the drawing.

In the embodiment the heating element is installed on the surface opposite the surface radiating infrared rays as one example. The heating element may be installed on the surface radiating infrared rays by the use of other manufacturing processes or the grating itself (2c) may be used as the heating element. When current is made to flow directly through the Au layer to have the grating itself function as the heating element, infrared light is radiated from the Au surface in the direction represented by arrows in the drawing.

An important advantage of the method in which a Au film is formed on the projection array and then the array is removed, is that a smooth Au film can be obtained independently of how the Au film has been formed because the Au surface finally coming out is the surface which has adhered to the smooth projection array of Si. Further, an outside shape of the Au surface is that exactly transferred from the outside shape of the projection array. Therefore, it is possible to exactly realize infrared radiation characteristics as designed.

The Au surface exposed to the outside when the film is formed, is generally rough due to growth of crystal particles, or the like. Further, since generally thicknesses of the Au films on the top surface, the side surfaces, and the bottom surface are different from one another, it is not easy to profile the outside shape of the Au films as designed. However, the surfaces are finally adhered to the heating element and they are not exposed to the outside.

Third Embodiment

FIG. 23

In the present embodiment, a projection array is formed by transferring a mold (3b) having a surface on which a groove array is machined, on a surface of a substrate (3a) of thermoplastic resin or rubber (FIG. 23(a)). The mold can be manufactured by a method of applying the resist on the Si substrate and forming the grating pattern by electron beam lithography, interference exposure, mask exposure, or the like, a method of directly applying resist on the surface of the mold, forming the grating pattern by electron beam lithography, interference exposure, mask exposure, and forming a micro pattern by dry etching, or the like, a method of using a mechanical processing, or the like. A resin with heat resistance or the like may be used as the thermoplastic resin. Further, as the transfer method, an injection molding, a nano imprinting or the like can be used.

Next, a film of Au or the like (3c) is formed on a surface of the thermoplastic resin, or the like (FIG. 23(b)). Thickness of the formed Au film should be several times as large as a skin depth (20 to 30 nm in the case of Au) over the overall surface. As a film forming method, a vacuum deposition method and a sputtering method may be used. Especially, an atomic layer deposition (ALD) method by which extremely uniform film thickness can be obtained is effective. As methods by which a relatively thick film can be easily obtained, there are a method of applying dispersion of ultrafine Au particles by a spin-coating or the like and then sintering it, and an electrochemical method such as electrolytic plating and electroless plating. Further, in order to secure adhesion with an adhesive to be applied on the Au film, an adhesive layer such as Cr may be formed on the Au film.

Next, a fixing substrate (3e) is adhered to the grating side of the resin substrate (FIG. 23(c)). As adhesives, epoxy-based or ceramic-based adhesives with heat resistance (2e), or the like are used. Herein, when the adhesives have significant viscosity, the filling of adhesives in the grating portion is not sufficient. Accordingly, it is preferable to use adhesives with good filling ability in the grating portion. Further, when the thickness of the adhesives is large, a peeling problem or the like may be caused by a difference in linear thermal expansion coefficient. Therefore, a thickness of the adhesives to be filled should be as thin as possible. Further, as in the second embodiment, in the process of applying adhesives, it is preferable to perform vacuum defoaming prior to the adhesion.

Materials of the fixing substrate to be adhered may include metal, semiconductor, ceramic, glass, or any other materials capable of finally maintaining the shape of the grating. In order to suppress unnecessary infrared radiation, it is preferable to coat the outer peripheral surfaces other than the adhered surface with metal (3f) with high reflectance of infrared light such as Au. When the fixing substrate is made of metal, it is not important to coat the circumference thereof. However, if it is coated with metal with higher reflectance of infrared light, it can be expected that unnecessary infrared light can further be suppressed.

Next, the infrared source is obtained by removing the thermoplastic resin substrate (3a) using melting by organic solvent such as toluene or melting by high-temperature heating, ashing by oxygen plasma, mechanical peeling, or the like (FIG. 23(d)). Finally, infrared light is radiated from the Au surface in the direction represented by arrows in the drawing by directly forming electric wirings on the Au film (3c) of the grating surface and making electric current to flow therein. Alternatively, the heating element may be adhered to the fixing substrate (3e).

In the present embodiment, the Au layer (3c) itself formed on the grating portion acts as the heating element.

Further, in the present embodiment, a projection array of resin or rubber may be used, instead of the projection array of Si. Such a projection array can be manufactured by transfer from another master-mold. Although mechanical peeling is available in any cases, resin may be melted by proper organic solvent such as toluene, quinone, butanone or the like.

When a mold is used as a master, resist is applied on the surface of the mold, a grating pattern is formed by electron beam lithography, interference exposure, mask exposure or the like, and a micro pattern is formed by dry etching, etc. Alternatively, there is a method of manufacturing a master-mold by Si substrate or the like and modeling it with electro-forming of nickel, or the like.

The important characteristic of the present embodiment is that rectangular gratings having accurate size and shape can be mass-produced inexpensively and with good reproducibility, through plastic molding technology that has already been established, after one master-mold has been manufactured.

If the cavities are filled with positive dielectric substance as shown in FIG. 22(g) as needed, it is possible to improve stability of the shape of the Au surface.

Fourth Embodiment

FIG. 24

In the present embodiment, a SOI substrate having a $SiO_2$ layer (4b) formed on a Si substrate (4a) and a Si layer (4g) formed further thereon is used. A plane orientation of the Si layer (4g of FIG. 24) on the outermost surface is a 110 direction and its thickness is set to a depth of a grating to be manufactured. A resist (4c) is applied on the SOI substrate (FIG. 24(a)) and a grating pattern is formed thereon by electron beam lithography, interference exposure, mask exposure or the like (FIG. 24(b)). If it is etched with aqueous solution of KOH, the Si layer is etched in the direction perpendicular to its surface because etching speed varies depending on direction with respect to the crystal plane. Thereafter, when the etching reaches the $SiO_2$ layer, the etching is terminated, so that the rectangular grating of Si is manufactured (FIG. 24(c)). Next, the resist is removed and a film of Au, etc. (4d) is then formed on the grating of Si (FIG. 24(d)). At this time, the film thickness should be several times as large as a skin depth (20 to 30 nm in the case of Au) over the overall surface. As a film forming method, a vacuum deposition method or a sputtering method may be used. Especially, an atomic layer deposition (ALD) method by which extremely uniform film thickness can be obtained is effective. As methods by which a relatively thick film can be easily obtained, there are a method of applying dispersion of ultrafine Au particles by a spin-coating or the like and then sintering it, and an electrochemical method such as electrolytic plating and electroless plating.

Figure 24:
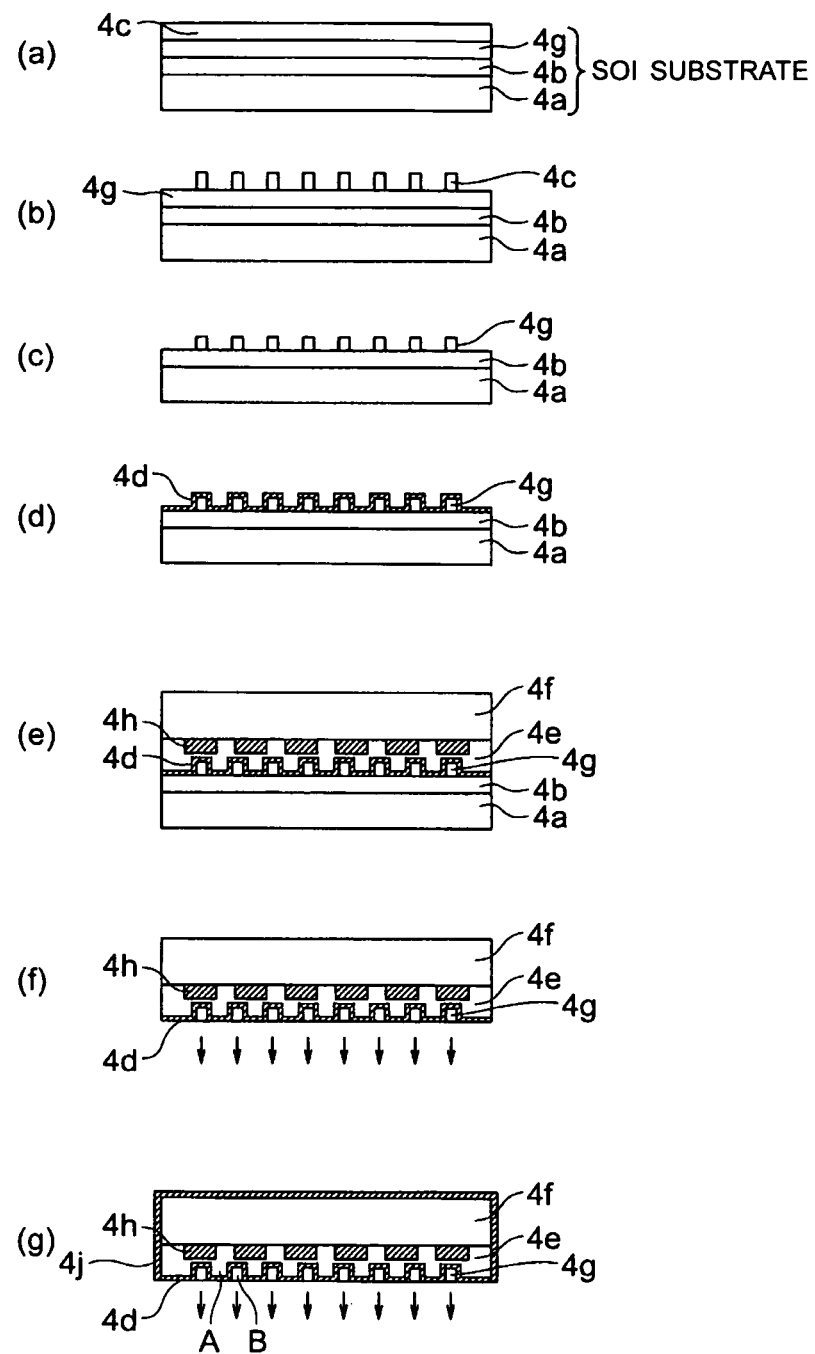
FIG. 24 is a view for explaining a fourth embodiment.
Figure 25:
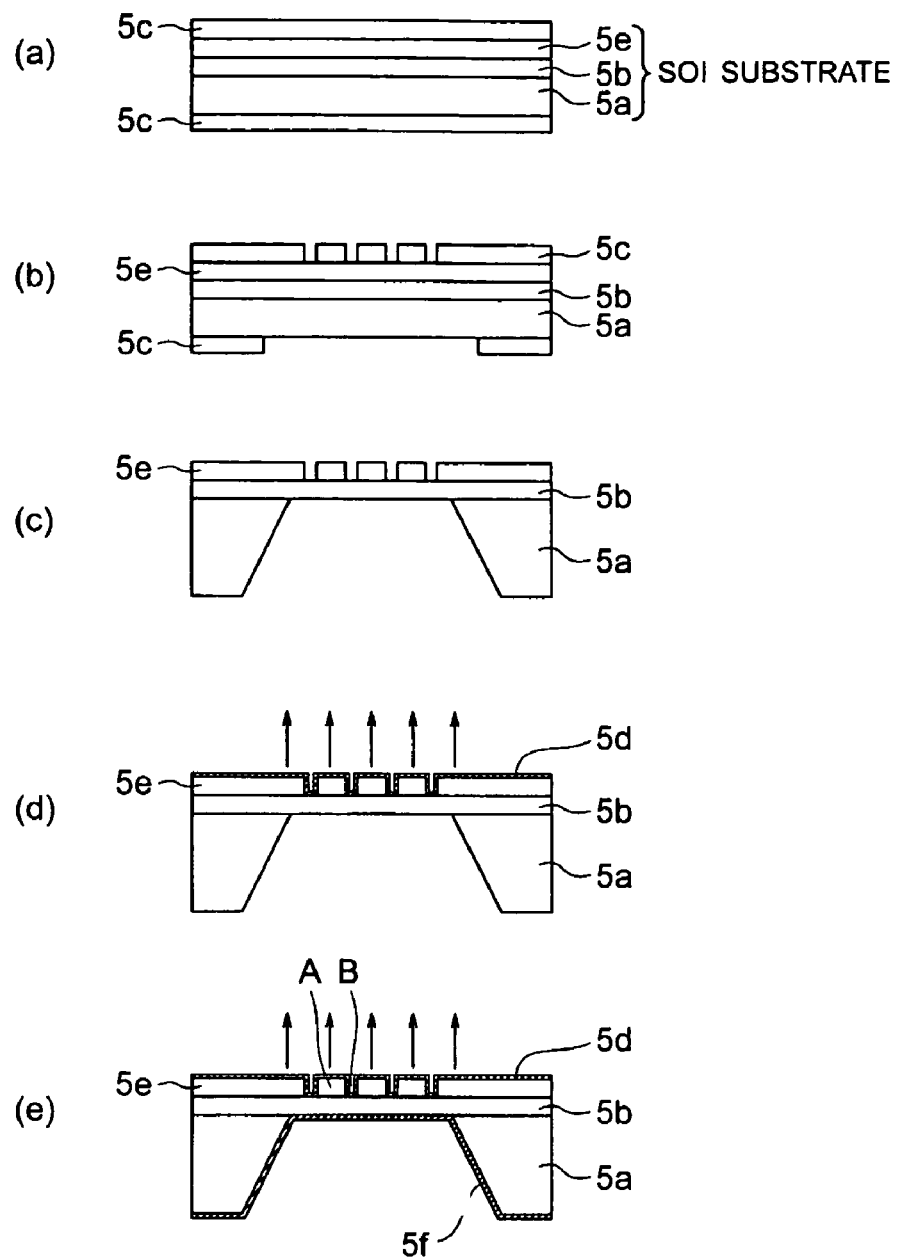
FIG. 25 is a view for explaining a fifth embodiment.
Figure 26:
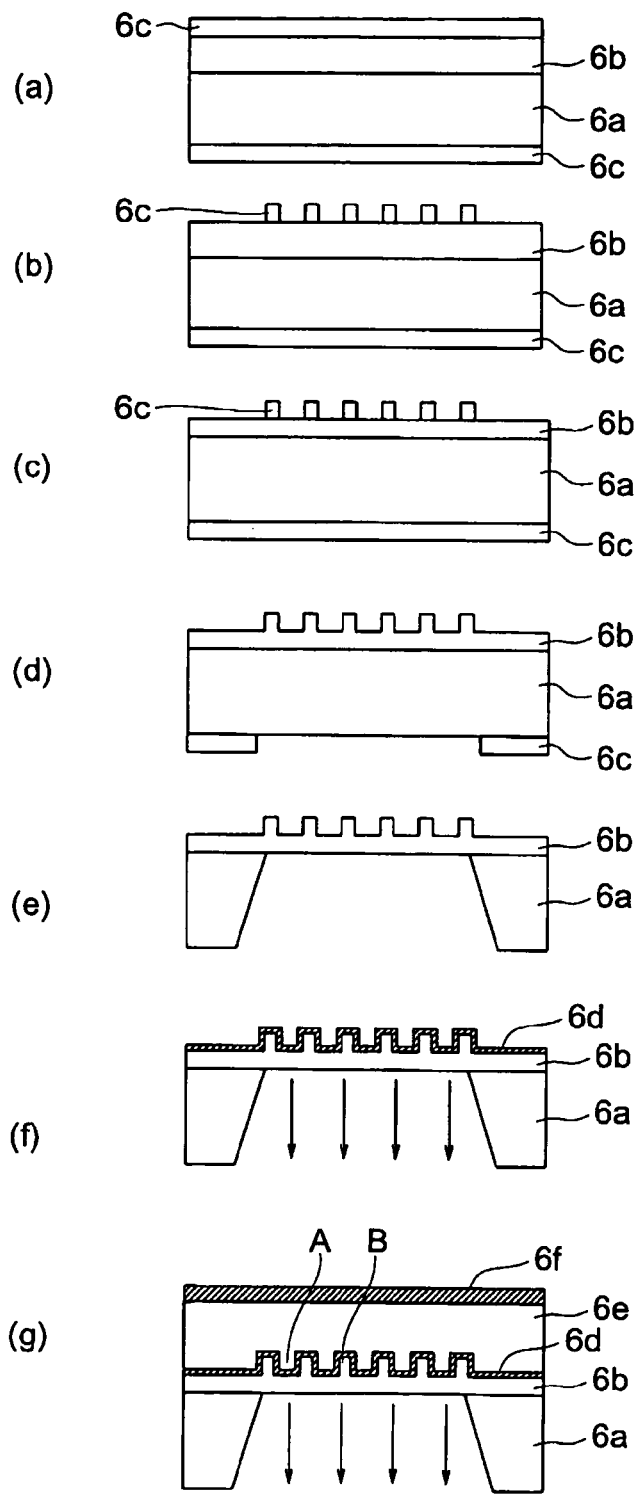
FIG. 26 is a view for explaining a sixth embodiment.
Figure 27:
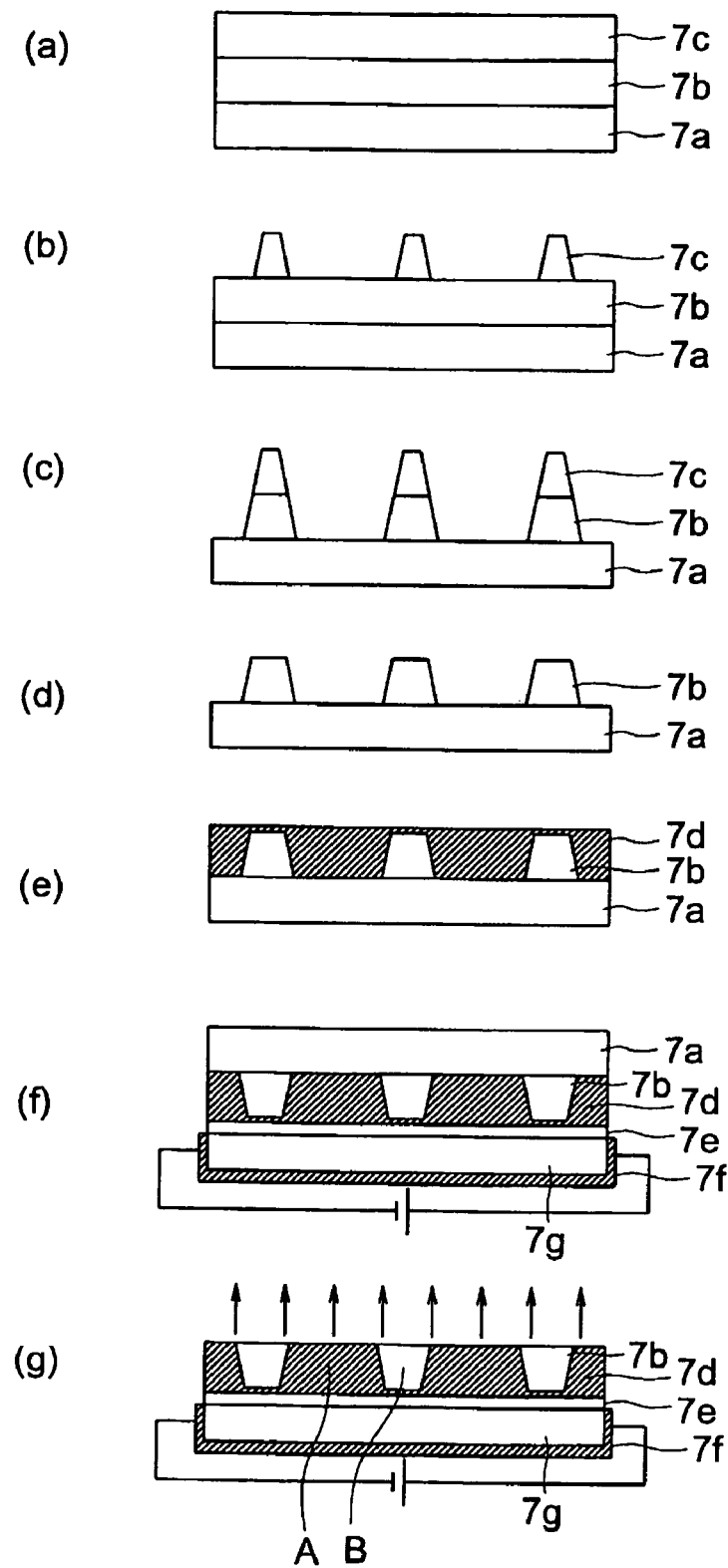
FIG. 27 is a view for explaining a seventh embodiment.
Figure 28:
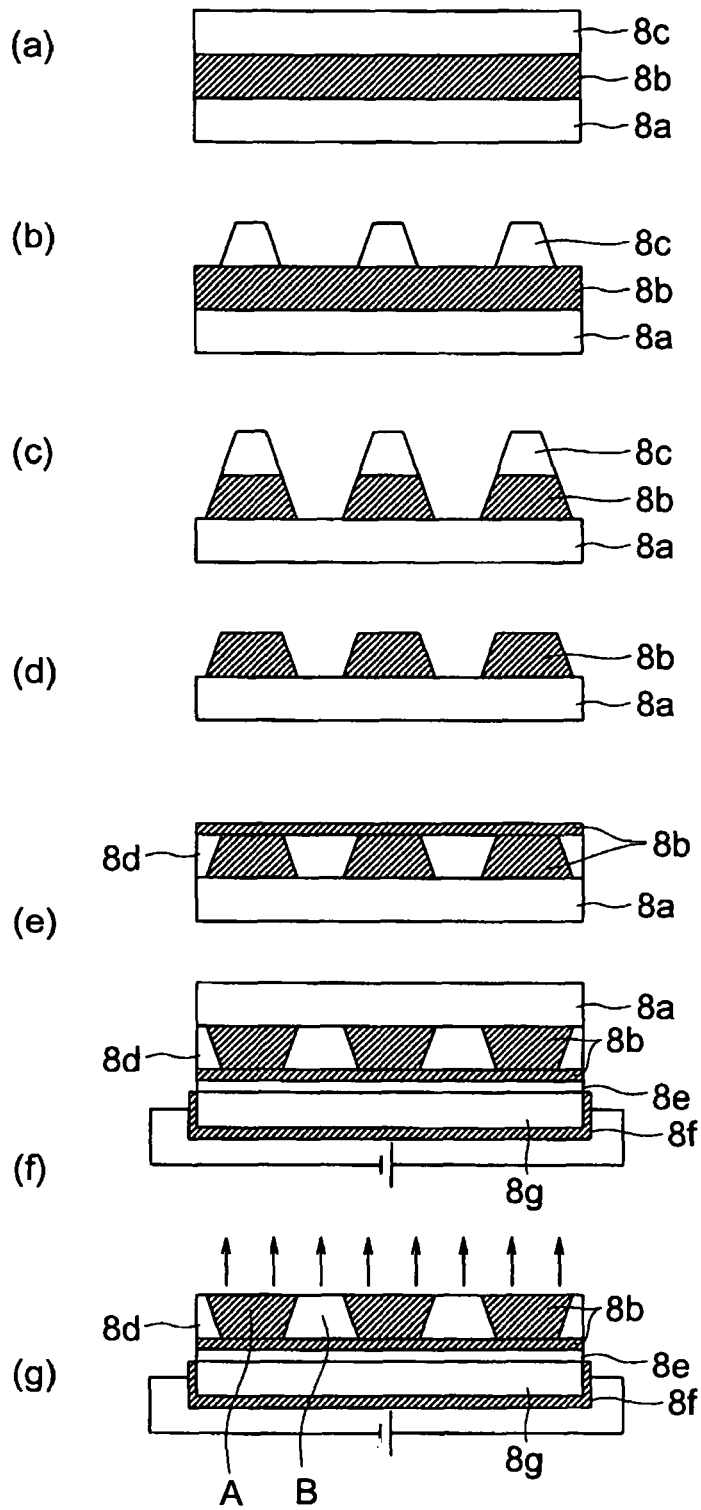
FIG. 28 is a view for explaining an eighth embodiment.
Figure 29:
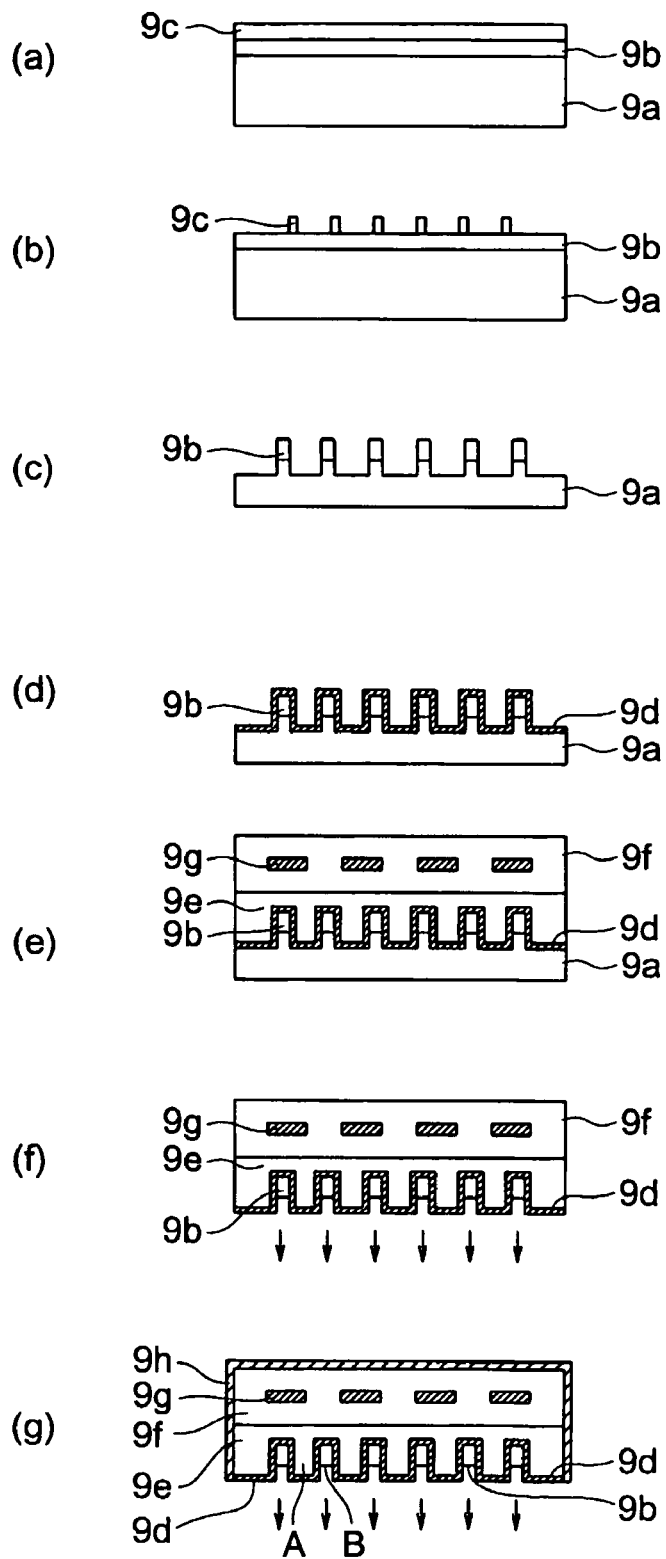
FIG. 29 is a view for explaining a ninth embodiment.
Figure 30:
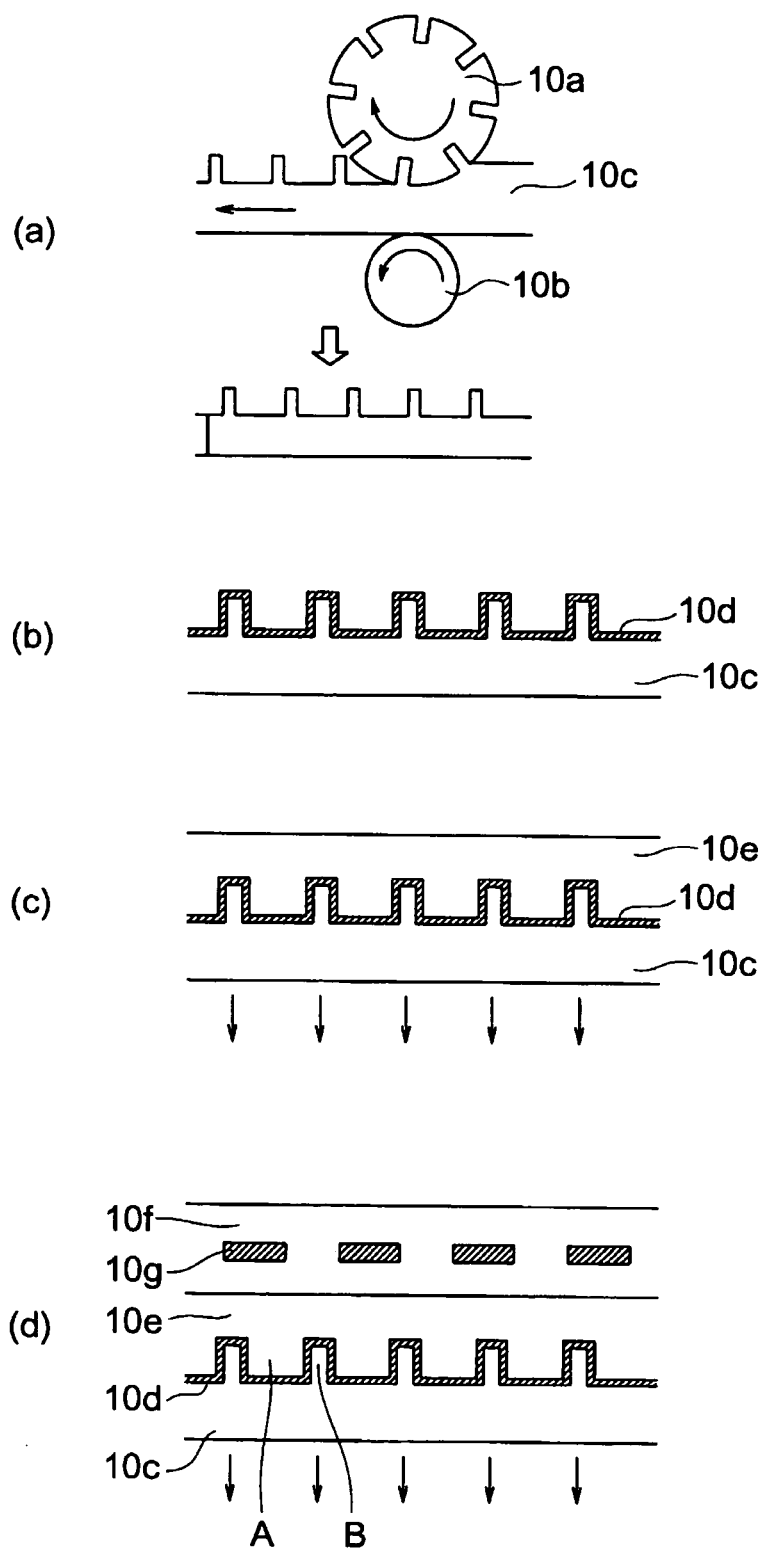
FIG. 30 is a view for explaining a tenth embodiment.

Next, A heating element (4f) (ceramic heater in the present embodiment) is adhered by charging adhesives (4e) such as an epoxy resin group into the grating portion (FIG. 24(e)). In the ceramic heater shown in FIG. 24 as one example, a resistance wire pattern of metal is formed on a ceramic substrate by a screen printing, or the like.

When the adhesives have significant viscosity, the filling of adhesives in the grating portion is not sufficient. Accordingly, it is preferable to use adhesives with good filling ability in the grating portion. Further, when the thickness of the adhesives is large, a peeling problem or the like may be caused by a difference in linear thermal expansion coefficient. Therefore, a thickness of the adhesives to be filled should be as thin as possible.

In the process of applying the adhesives, since a portion to be filled with the adhesives has a micro structure, it is preferable to perform a vacuum defoaming prior to the adhesion to prevent mixing of bubbles into the adhesives.

Next, the SiO$_2$ layer (4b) is etched with an aqueous solution of HF or a buffered HF solution and the surface of Au which has been covered with SiO$_2$ is exposed (FIG. 24(f)).

If electric current is supplied to the ceramic heater in which the electric wirings are formed, infrared light is radiated from the Au surface in the direction represented by arrows in the drawing. If a film of Au (4j) is formed on the outer peripheral surfaces other than the grating surface, unnecessary infrared radiation can be suppressed (FIG. 24(g)).

In the embodiment the heating element is installed on the surface opposite the surface radiating infrared rays as one example. The heating element may be installed on the surface radiating infrared rays by the use of other manufacturing processes or the grating itself may be used as the heating element with a c portion made of conductive material.

An important advantage of the method of using the SOI substrate is that it is possible to manufacture the rectangular grating with accurate size and shape, without using technologies of controlling depth of dry etching or etching at high precision. Since finally exposed Au surface is made smooth and the cavities are filled with Si, the shape is stable for a long time so that the radiation characteristics of the light source are not changed. In this case, since Au and Si may form eutectic alloy, a special attention should be paid to the operating temperature.

Fifth Embodiment

FIG. 25

In the present embodiment, a SOI substrate having a SiO$_2$ layer (5b) formed on a Si substrate (5a) and a Si layer (5e) formed further thereon is used. As in the embodiment of FIG. 24, a plane orientation of the Si layer (5e) on the outermost surface is a 110 direction and its thickness is set to a depth of a grating to be manufactured. Further, the plane orientation of the Si substrate (5a) is a 100 direction.

A resist (5c) is applied on the SOI substrate (FIG. 25(a)) and a grating pattern is formed thereon by electron beam lithography, interference exposure, mask exposure or the like (FIG. 25(b)). The present embodiment shows an example of manufacturing such a pattern that a groove array is left behind, not the projections. Herein, the resist (5c) is also applied on the bottom surface of the Si substrate and an opening pattern is formed thereon.

When it is etched with the aqueous solution of KOH or the like, a rectangular grating of Si is formed on the surface. At the same time, etching is performed in a pyramid form from the bottom surface up to the SiO$_2$ layer, so that a film of a thin SiO$_2$ layer and a Si layer remains in a state where its circumference is held in a rectangular frame (FIG. 25(c)).

Next, the resist is removed and a film of Au, etc. (5d) is then formed on the surface of the Si layer covering side and bottom surfaces of the grooves (FIG. 25(d)). At this time, the film thickness should be several times as large as a skin depth (20 to 30 nm in the case of Au) over the overall surface. As a film forming method, a vacuum deposition method or a sputtering method may be used. Especially, an atomic layer deposition (ALD) method by which extremely uniform film thickness can be obtained is effective. As methods by which a relatively thick film can be easily obtained, there are a method of applying dispersion of ultrafine Au particles by a spin-coating or the like and then sintering it, and an electrochemical method such as electrolytic plating and electroless plating.

Thereafter, a film of Au (5f) is formed on the bottom surface to suppress unnecessary infrared radiation. Finally, when electric current is supplied to the Au layer of the grating portion on which the electric wirings are formed, infrared rays are radiated in the direction represented by arrows in the drawing (FIG. 25(e)).

In the present embodiment, the Au layer (5d) itself acts as the heating element.

Figure 22:
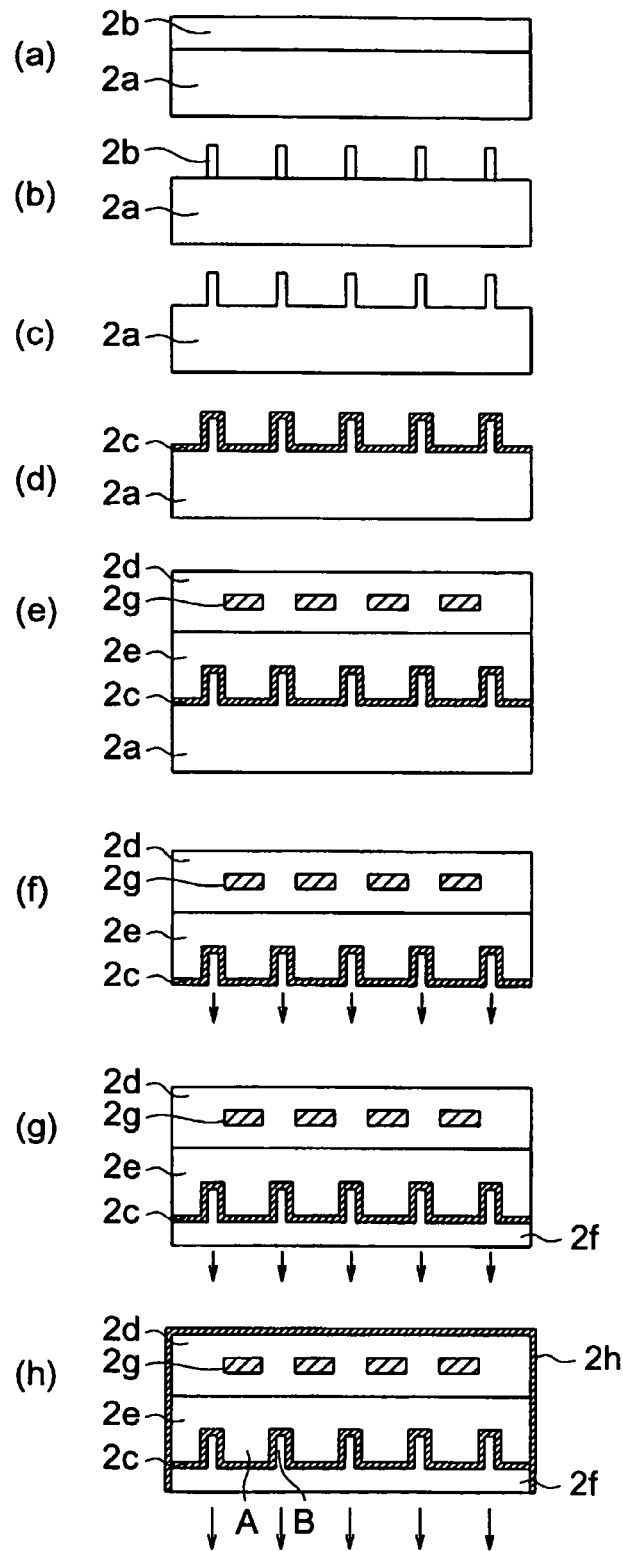
FIG. 22 is a view for explaining a second embodiment.
Figure 23:
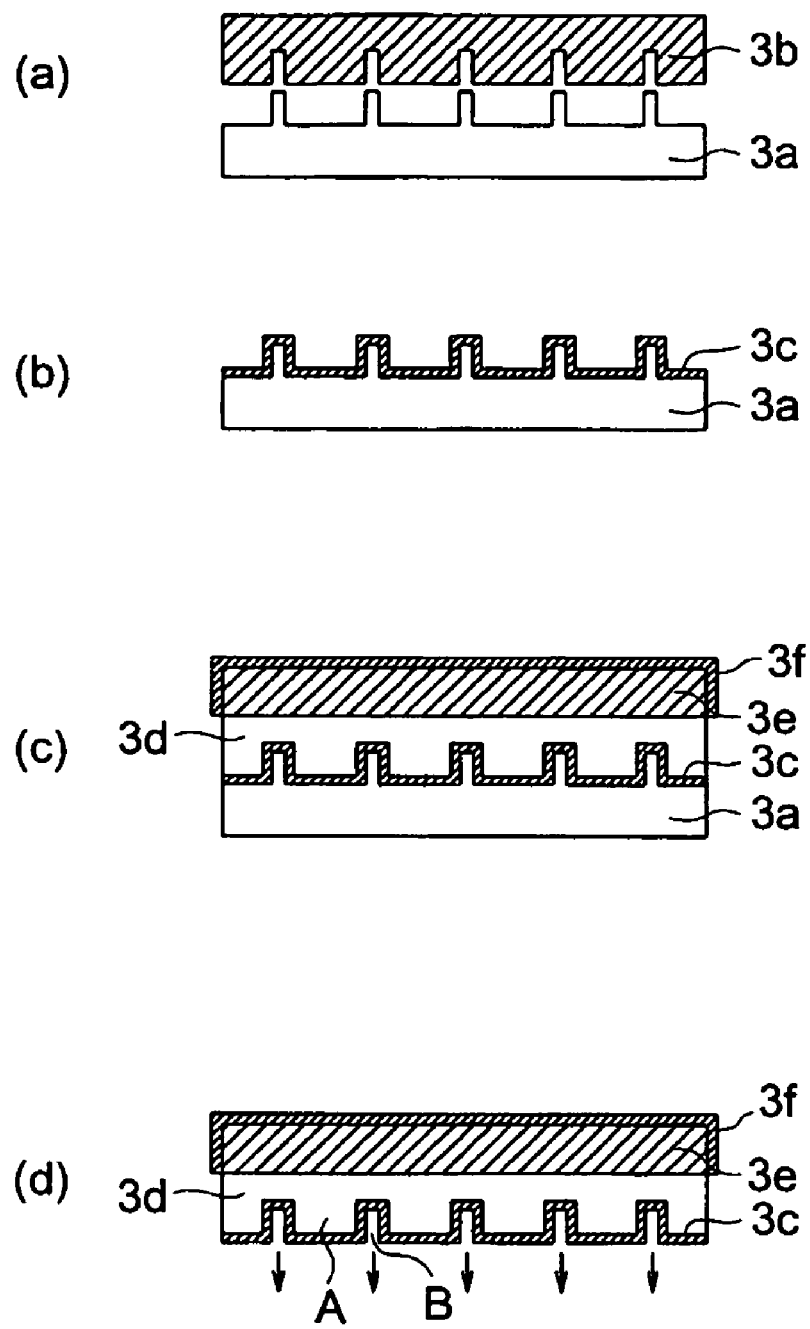
FIG. 23 is a view for explaining a third embodiment.

In the present embodiment the number of the processes is small and the structure is simple, as compared to the second embodiment shown in FIG. 22 and the fourth embodiment shown in FIG. 24.

The stability of the Au surface shape can be improved by charging positive dielectric substance into the cavities as shown in FIG. 22(g).

Sixth Embodiment

FIG. 26

In the present embodiment, a Si substrate (6a) having a thermal oxide film (SiO$_2$ film) (6b) thicker than the depth of the grating is used on the surface. A plane orientation of the Si substrate is a 100 direction.

A resist (6c) is applied on the substrate (FIG. 26(a)) and a grating pattern is formed thereon by electron beam lithography, interference exposure, mask exposure or the like (FIG. 26(b)). A projection array is manufactured on the surface of the SiO$_2$ by dry etching (FIG. 26(c)). Herein, as in the present embodiment of FIG. 25, the resist (6c) is also applied on the bottom surface of the Si substrate and an opening pattern is formed thereon (FIG. 26(d)).

When it is etched with aqueous solution of KOH, etching is performed in a pyramid form from the bottom surface up to the SiO$_2$ layer, so that a thin film of SiO$_2$ remains in a state where its circumference is held in a rectangular frame (FIG. 26(e)).

Next, the resist is removed and a film of Au, etc. (6d) is then formed on the surface (grating portion) on the top side of the SiO$_2$ layer (FIG. 26(f)). At this time, the film thickness should be several times as large as a skin depth (20 to 30 nm in the case of Au) over the overall surface. As a film forming method, a vacuum deposition method or a sputtering method may be used. Especially, an atomic layer deposition (ALD) method by which extremely uniform film thickness can be obtained is effective. As methods by which a relatively thick film can be easily obtained, there are a method of applying dispersion of ultrafine Au particles by a spin-coating or the like and then sintering it, and an electrochemical method such as electrolytic plating and electroless plating.

When electric current is directly supplied to electric wirings formed on the Au layer of the obtained, infrared light is radiated from the Au surface in the direction represented by arrows in the drawing.

In the structure of FIG. 26(f), since a rectangular grating is formed on the opposite side of the Au layer, infrared light at a different wavelength may be radiated therefrom. In this case, the depression portions are filled with a filler (6e) (such as epoxy-based adhesives, ceramic-based adhesives, metal or the like) over the Au film to completely cover them and another film of Au (6f) is formed thereon, thereby suppressing unnecessary infrared radiation (FIG. 26(g)).

In the present embodiment, the Au layer (6d) itself formed on the grating portion acts as the heating element.

The characteristic of the present embodiment is that since the surface on which SiO$_2$ and Au is adhered is used as the radiation surface, a smooth and accurately shaped surface can be used as the radiation surface. Also, since the cavities are filled with SiO$_2$, such infrared radiation characteristics accurately as designed are stably maintained for a long time, irrespective of a situation where electromigration easily occurs.

Seventh Embodiment

FIG. 27

In the present embodiment, a Si substrate (7a) having a thermal oxide film (SiO$_2$) (7b) with a thickness equal to a depth of the grating on the surface is used. A plane orientation of the Si substrate is a 100 direction. A resist (7c) is applied on the substrate (FIG. 27(a)) and a grating pattern is formed thereon by electron beam lithography, interference exposure, mask exposure or the like (FIG. 27(b)). The angled pattern can be controlled by control of lithography speed or temperature processing before and after the processing, etc. When manufacturing the grating using dry etching, etc., the grating with tapered portions is manufactured by control of an etching angle during the etching (FIG. 27(c)). After the resist is removed, Au film or the like (7d) is formed in a groove portion of the grating by a forming method (FIG. 27(e)). As a film forming method, a vacuum deposition method or a sputtering method may be used. Especially, an atomic layer deposition (ALD) method by which extremely uniform film thickness can be obtained is effective. As methods by which a relatively thick film can be easily obtained, there are a method of applying dispersion of ultrafine Au particles by a spin-coating or the like and then sintering it, and an electrochemical method such as electrolytic plating and electroless plating. Further, in order to secure adhesion with an adhesive to be applied on the Au film, an adhesive layer such as Cr may be formed on the Au film.

Next, a heating element (7g) with a gold film (7f) formed on the surfaces other than the surface to be adhered is adhered to the surface formed by charging Au or the like by adhesives (7e) (FIG. 27(f)). As adhesives, epoxy-based or ceramic-based adhesives with heat resistance or the like are used. When the adhesives have significant viscosity, the filling of adhesives in the grating portion is not sufficient. Accordingly, it is preferable to use adhesives with good filling ability in the grating portion. Further, when the thickness of the adhesives is large, a peeling problem or the like may be caused by a difference in linear thermal expansion coefficient. Therefore, a thickness of the adhesives to be filled should be as thin as possible.

Next, the infrared source is completed by removing the Si substrate (7a) from the grating surface of Au and SiO$_2$ by mechanical peeling, etching, laser-lift off, or the like and forming electric wirings (FIG. 27(g)).

In the embodiment the heating element is installed on the surface opposite the surface radiating infrared rays as one example. The heating element may be installed on the surface radiating infrared rays by the use of other manufacturing processes or the grating itself (7d) may be used as the heating element.

Eighth Embodiment

FIG. 28

In the present embodiment, a Si substrate (8a) having a Au (8b) layer with a thickness equal to a depth of the grating on the surface is used. A plane orientation of the Si substrate is a 100 direction. A resist (8c) is applied on the substrate (FIG. 28(a)) and a grating pattern is formed thereon by electron beam lithography, interference exposure, mask exposure (FIG. 28(b)), or the like. The grating with tapered portions is manufactured on the surface by dry etching, etc (FIG. 28(c)). After the resist is removed, an oxide film (SiO$_2$) or the like is formed in a groove portion of the grating by a film forming method and the surface is flattened until the Au surface is exposed by fluid polishing or mechanochemical polishing (MCP), etc. and a Au film (8b) is formed on the surface (FIG. 28(e)). As a film forming method, a vacuum deposition method or a sputtering method may be used. Especially, an atomic layer deposition (ALD) method by which extremely uniform film thickness can be obtained is effective. Further, in order to secure adhesion with an adhesive to be applied on the Au film, an adhesive layer such as Cr may be formed on the Au film.

Next, a heating element (8g) with a gold film (8f) formed on the surfaces other than the surface to be adhered is adhered to the surface by an adhesive (8e) (FIG. 27(f)). As adhesives, epoxy-based or ceramic-based adhesives with heat resistance or the like are used. When the adhesives have significant viscosity, the filling of adhesives in the grating portion is not sufficient. Accordingly, it is preferable to use adhesives with good filling ability in the grating portion. Further, when the thickness of the adhesives is large, a peeling problem or the like may be caused by a difference in linear thermal expansion coefficient. Therefore, a thickness of the adhesives to be filled should be as thin as possible.

Next, the infrared source is completed by removing the Si substrate (8a) from the grating surface consisting of Au and SiO$_2$ by mechanical peeling, etching, laser-lift off, or the like and forming electric wirings (FIG. 28(g)).

In the embodiment the heating element is installed on the surface opposite the surface radiating infrared rays as one example. The heating element may be installed on the surface radiating infrared rays by the use of other manufacturing processes or the grating itself (8b) may be used as the heating element.

Ninth Embodiment

FIG. 29

In the present embodiment, a Si substrate (9a) having a thin thermal oxide film (SiO$_2$) (9b) with a thickness equal to a depth of the grating on the surface is used. A plane orientation of the Si substrate is a 100 direction. A resist (9c) is applied on the substrate (FIG. 29(a)) and a grating pattern is formed thereon by electron beam lithography, interference exposure, and the ask exposure (FIG. 29(b)), etc. A projection array is manufactured on the surface by processing SiO$_2$ using dry etching, or the like (FIG. 29(c)). A film of Au (9d) or the like is formed on the surface of the grating (FIG. 29(d)). The thickness of the formed Au film should be several times as large as a skin depth (20 to 30 nm in the case of Au) over the overall surface. As a film forming method, a vacuum deposition method and a sputtering method may be used. Especially, an atomic layer deposition (ALD) method by which extremely uniform film thickness can be obtained is effective. As methods by which a relatively thick film can be easily obtained, there are a method of applying dispersion of ultrafine Au particles by a spin-coating or the like and then sintering it, and an electrochemical method such as electrolytic plating and electroless plating. Further, in order to secure adhesion with an adhesive to be applied on the Au film, an adhesive layer such as Cr may be formed on the Au film.

Next, a heating element (9f) is adhered to the surface on which a film of Au or the like is formed (FIG. 29(e)). As an adhesive, epoxy-based or ceramic-based adhesives (9e) with heat resistance are used. As an adhesive, epoxy-based or ceramic-based adhesives with heat resistance (2e), or the like are used. When the adhesives have significant viscosity, the filling of adhesives in the grating portion is not sufficient. Accordingly, it is preferable to use adhesives with good filling ability in the grating portion. Further, when the thickness of the adhesives is large, a peeling problem or the like may be caused by a difference in linear thermal expansion coefficient. Therefore, a thickness of the adhesives to be filled should be as thin as possible. Further, as in the second embodiment, in the process of applying adhesives, it is preferable to perform vacuum defoaming prior to the adhesion.

Next, the Si substrate (9a) alone is dissolved by etching with aqueous solution of KOH, leaving $SiO_2$ (9b) in the grooves of the grating (FIG. 9(f)).

Finally, a film of Au (9h) is formed on the outer peripheral surfaces other than the grating surface in order to suppress unnecessary infrared radiation (FIG. 9(g)).

The characteristic of the present embodiment is that the infrared source where the grooves of the grating are filled with $SiO_2$ up to a desired depth can be realized by adjusting the initial thickness of the thermal oxide film and the processing depth of dry etching, etc.

A structure where the grooves are filled with $SiO_2$ accurately up to the surface is a special example. In order to realize such a structure, it is preferable to stop the etching (endpoint method) by detecting a moment when the etching reaches the Si layer after having proceeded through the $SiO_2$ layer by analysis of emission spectrum of plasma or gas analysis within a reaction container using a mass spectrometer or the like, when performing dry etching. With the method, a grating can be manufactured with good reproducibility and accuracy without relying on conditions of dry etching and without use of such a special substrate as the SOI substrate, using a Si substrate having a thermal oxide film with a thickness identical with a desired depth of the grating.

Tenth Embodiment

FIG. 30

The present embodiment shows an example of realizing a flexible and large area infrared source.

For example, a projection array is embossed on a surface of a plastic sheet by heating and pressing process using a pair of rollers in which a groove array is machined on a surface of one roller (10a, 10b) (FIG. 30(a)). A technology of transferring a micro structure, such as a hologram, to polyester, polyvinyl chloride, polypropylene, or the like with a thickness of about 10 to 100 μm has already been established.

A film of Al or Ag (10d) or the like is formed on the grating by vacuum deposition or sputtering (FIG. 30(b)).

Next, a protective layer (10e) such as polyester, polypropylene or the like is formed on the formed surface (FIG. 30(c)). The layer as an adhesive layer may be adhered to a surface of other objects like a seal. An infrared source is realized by adhering the sheet to any heating element (10f) and forming electric wiring (FIG. 30(d)).

As a special utilization, if electric current is made to flow through the metal layer of the sheet, the flexible sheet itself can be used as an infrared source.

Alternatively, a flexible infrared source can be manufactured by adhering the sheet to a rubber heater in which a resistance wire pattern is buried within a silicon rubber sheet.

Eleventh Embodiment

FIG. 31

Figure 31:
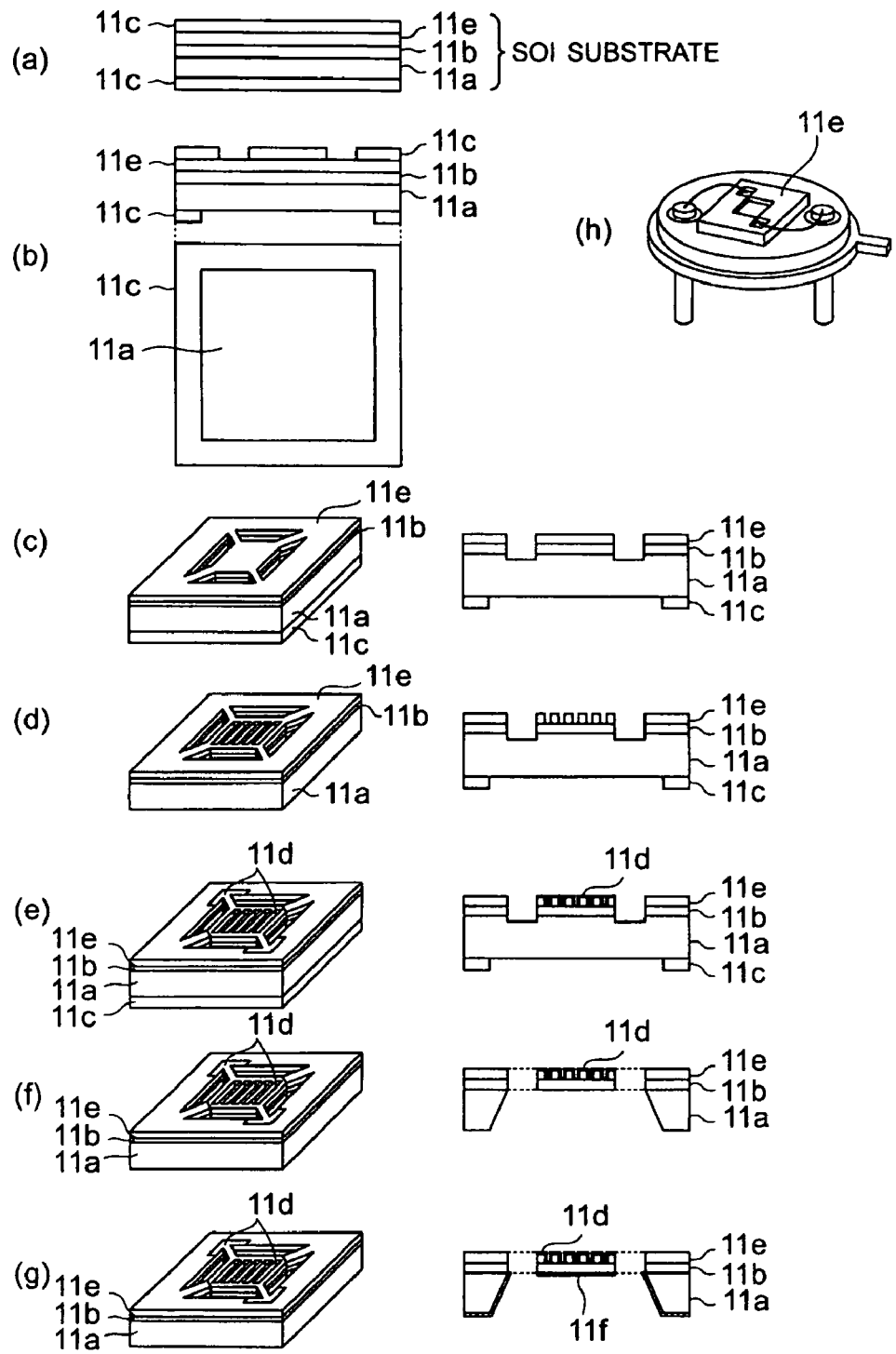
FIG. 31 is a view for explaining an eleventh embodiment.

FIG. 31 is a view showing a specific embodiment of an infrared source thermally insulated. The infrared source is manufactured by the method shown in FIG. 25.

A resist (11c) is applied on both sides of SOI substrates (11a, 11b, 11e) (FIG. 31(a)) and an opening pattern is formed thereon by electron beam lithography, mask exposure, or the like (FIG. 31(b)). Next, opening portions that separate the grating portion and an outer peripheral portion, are formed by dry etching, or the like up to a depth reaching the Si substrate (11a).

Next, a resist is applied again and a grating pattern is formed on the central portion by electron beam lithography, interference exposure, mask exposure, or the like and the portion is processed by wet etching or the like to have a grating manufactured in a infrared radiating portion (FIG. 31(d)).

A resist is applied once again and a pattern is formed by electron beam lithography, interference exposure, mask exposure, or the like and a film of Au (11d) or the like is formed to provide a main body of the infrared source and an electrode (FIG. 31(e)). There are two electrode pads on the outer peripheral portion and the two electrode pads are connected to the grating through two beams. A thickness of the formed Au film should be several times as large as a skin depth (20 to 30 nm in the case of Au) over the overall surface. As a film forming method, a vacuum deposition method or a sputtering method may be used. Especially, an atomic layer deposition (ALD) method by which extremely uniform film thickness can be obtained is effective. As methods by which a relatively thick film can be easily obtained, there are a method of applying dispersion of ultrafine Au particles by a spin-coating or the like and then sintering it, and an electrochemical method such as electrolytic plating and electroless plating.

Next, if the bottom side of the SOI substrate is etched with aqueous solution of KOH, etching in a pyramid shape is performed from the opening on the bottom side and the opening on the top side, leaving the thin $SiO_2$ and Si layers held at the periphery by four beams.

In order to suppress unnecessary infrared radiation, a film of Au (11f) or the like is formed on the bottom side (FIG. 31(g)).

In the present embodiment, the Au layer (11d) itself formed on the grating portion acts as an heating element.

The maximum advantage of manufacturing a grating on such a film structure as in FIG. 31 is that a heat capacity of the grating is significantly small as compared to bulk structures shown in FIG. 22 or 24. If the heat capacity becomes small, electric current required for reaching the same temperature can be reduced and a changing speed of temperature, that is, infrared intensity in the case that electric current is changed at a high speed, is increased. In other words, an infrared source capable of operating at a higher speed can be realized.

Also, if the grating is restricted to the central region of the film and other regions are removed remaining several beams minimally required to support the central region from the peripheral region, the grating portion is thermally insulated from the peripheral region. Such a structure is generally used in a field of micro machines.

If thermal insulation is improved, the grating portion alone can be set to a high temperature while the peripheral substrate is maintained at room temperature. This feature makes mounting of the infrared source remarkably easy.

An infrared source chip obtains a simply usable form by a die bonding with a metal package, a wired bonding between an electrode terminal of the package and an electrode pad of the chip, and a vacuum sealing. FIG. 31(h) shows a state prior to covering a cap.

Although the central grating is at a high temperature by electric current supplied from the electrode, the chip itself is not significantly affected by heat because the peripheral portion is thermally insulated. Therefore, a special consideration for the packaging is not needed.

Even when a plurality of infrared sources thermally insulated as in FIG. 31 are arranged on the same chip, they separately operate without having an effect on others. Therefore, infrared sources radiating infrared lights at different wavelengths or with different polarization can be integrated on one chip.

Further, a variable wavelength infrared source, which can electrically scan wavelength without a moving portion, can be realized by a one-dimensional arrangement or a two-dimensional arrangement of infrared sources with slightly different radiation wavelengths on the same chip. The infrared source is a small, portable and low-power consuming apparatus useful in measuring infrared spectral of any materials to determine materials. See sixteenth and seventeenth embodiments.

Further, various electrical and electronic circuits can be integrated on the Si chip according to conventional methods. Accordingly, in addition to the infrared source, peripheral circuits required for operation such as a modulation circuit, a power distribution circuit, and a temperature feedback circuit can be mounted on the chip. See the eighteenth embodiment.

With development of micro machining technology, an infrared detecting element such as a bolometer or a thermopile can also be mounted on the Si chip so that an infrared source, an infrared detecting element and required signal processing circuits can be integrated on one Si chip. See the nineteenth embodiment.

Twelfth Embodiment

FIG. 32

Figure 32:
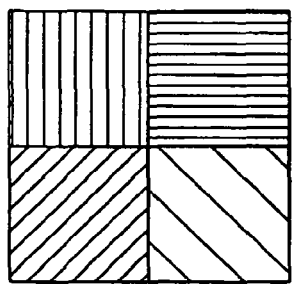
FIG. 32 is a view for explaining a twelfth embodiment.
Figure 32:
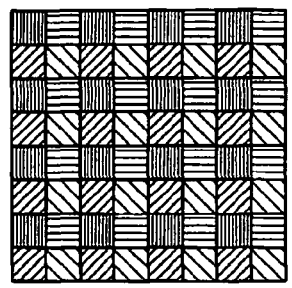
Figure 32:
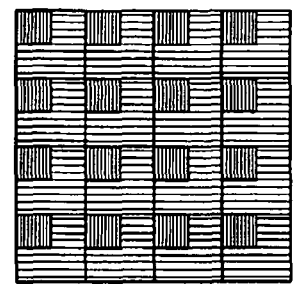
Figure 32:
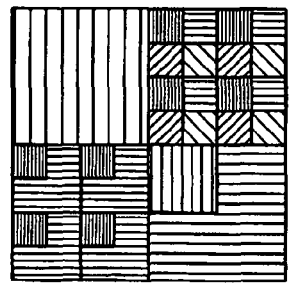

FIG. 32 is a view showing infrared sources in which plural kinds of gratings are provided on one heating element. One kind of grating refers to a grating radiating infrared light polarized in one direction and having one specific wavelength. Plural kinds of gratings refer to gratings radiating infrared lights with different polarization directions or having different specific wavelengths.

FIG. 32(a) shows an arrangement of plural kinds of gratings on one heating element where one kind of grating occupies one region on the heating element.

FIG. 32(b) shows an arrangement of plural kinds of gratings on one heating element where one kind of grating is divided into a plurality of smaller gratings, which are widely distributed on the heating element. The plural kinds of gratings are periodically arranged on a checkered pattern so that each kind occupies an equal size area.

FIG. 32(c) shows an arrangement of gratings where a ratio of an area of respective kinds of gratings is adjusted. Gratings with different specific wavelengths are generally different in radiation intensity per unit area because of strong wavelength dependency according to Planck's law. Further, since transmittance and reflectance of an optical system guiding radiated infrared light generally have wavelength dependency or polarization dependency, ratio of radiation intensities of infrared lights radiated from the different kinds of gratings is changed when the infrared lights reach the place of use. Therefore, a ratio of areas of respective kinds of gratings is properly adjusted so that the radiation intensities from the respective kinds of gratings are in a desired ratio. Alternatively, a ratio of emissivities of the respective kinds of gratings is properly adjusted while maintaining the area ratio in a predetermined state.

FIG. 32(d) shows one example of an arrangement including at least two arrangements of FIGS. 32(a), (b), and (c).

Thirteenth Embodiment

FIG. 33

Figure 33:
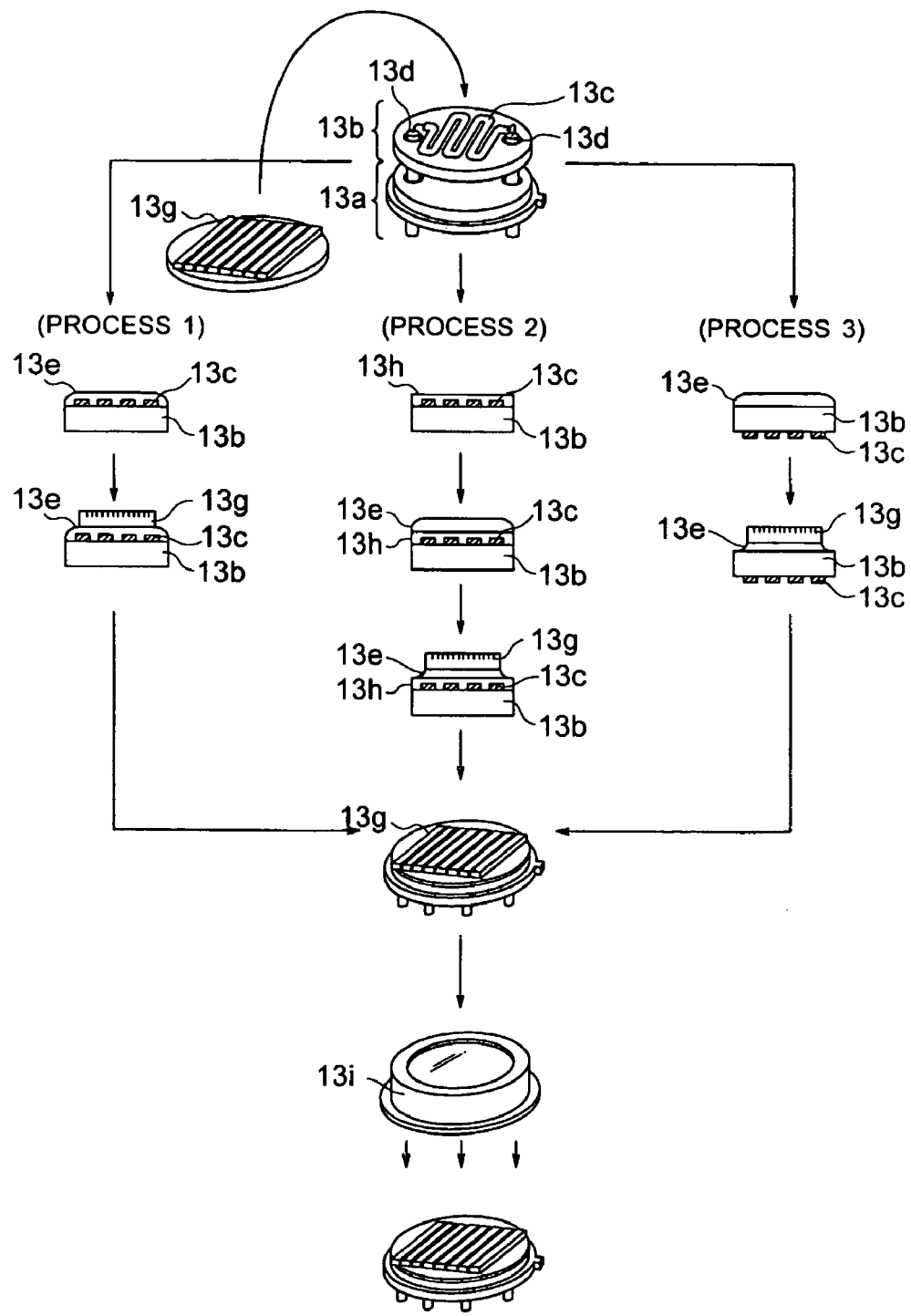
FIG. 33 is a view for explaining a thirteenth embodiment.

FIG. 33 is a view showing a method of manufacturing an infrared source package. The infrared source package includes one or a plurality of infrared sources and includes terminals supplied with power from the outside. Each of the plurality of infrared sources includes heating elements, and power can be supplied to each of the heating elements separately. One form of the infrared source package is as follows. The package is sealed in a case of metal, ceramic, glass, or the like and the inside thereof is in a vacuum state or is filled with inert gases of $N_2$, Ar, Kr, Xe, or the like or other gases, and further, if necessary, provided with a getter material adsorbing unnecessary gases. Window materials may be materials transmitting infrared rays, such as Si, Ge, sapphire, ZnS, $BaF_2$, $CaF_2$, $PbF_2$. Another form of the infrared source package is as follows. The infrared source is exposed to the outside, without window materials and without being sealed.

A ceramic substrate (13b), on which the heater pattern (13c) is printed, is installed on a hermetic seal (13a). An electrode (13d) is coupled with a heater pattern (13c) by wire bonding. A grating (13g) is adhered to the ceramic substrate (13b). The detailed manufacturing method thereof will be described below.

At a process 1, an adhesive (13e) is applied on the ceramic substrate (13b). Further, a metal grating (13g) is adhered to the ceramic substrate.

At a process 2, an insulating layer (13h) is coated on the ceramic substrate (13b). Further, the adhesive (13e) is applied on the ceramic substrate. Further, the metal grating (13g) is adhered to the ceramic substrate.

At a process 3, the adhesive (13e) is applied on a surface of the ceramic substrate (13b) opposite the surface on which the heater pattern (13c) is arranged. Further, the metal grating (13g) is adhered thereto.

When incorporating independent plurality of infrared sources, the processes are repeated several times. Infrared radiation of each heater can be controlled by independently turning-on and turning-off power of each of plurality of heaters.

A cap (13i) is covered. In order to achieve long lifetime, it is preferable to seal inert gases (such as Ar, Kr), halogen gases ($I_2$, $Br_2$), or the like inside the cap (13i).

Fourteenth Embodiment

FIG. 34

Figure 34:
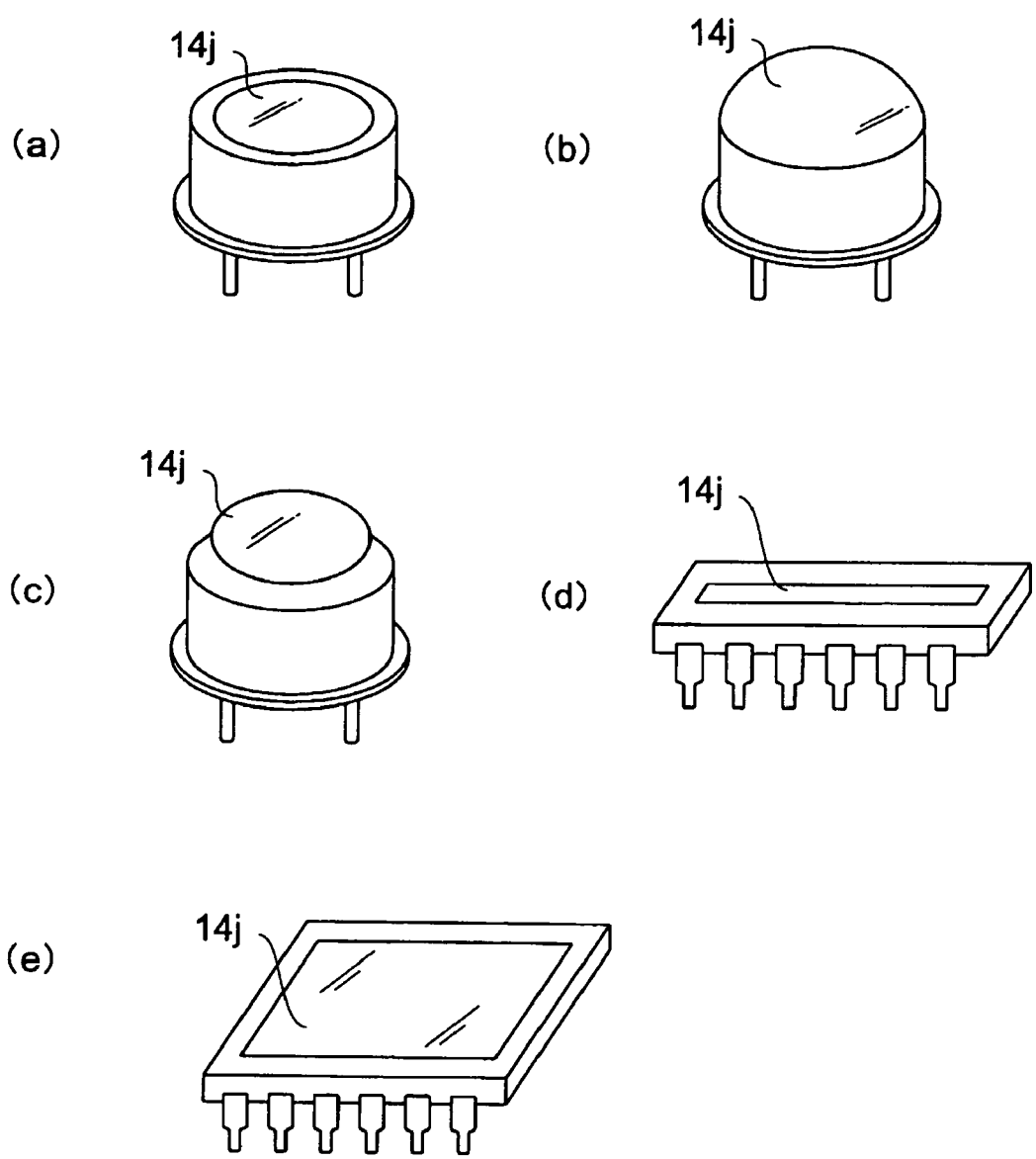
FIG. 34 is a view for explaining a fourteenth embodiment.

FIG. 34 is a view showing the infrared source packages in various forms. A window (14j) may have a lens function. Materials of the windows (14j) are Si, Ge, sapphire, ZnSe, $BaF_2$, $CaF_2$, $PbF_2$, etc.

Fifteenth Embodiment

FIG. 35

Figure 35:
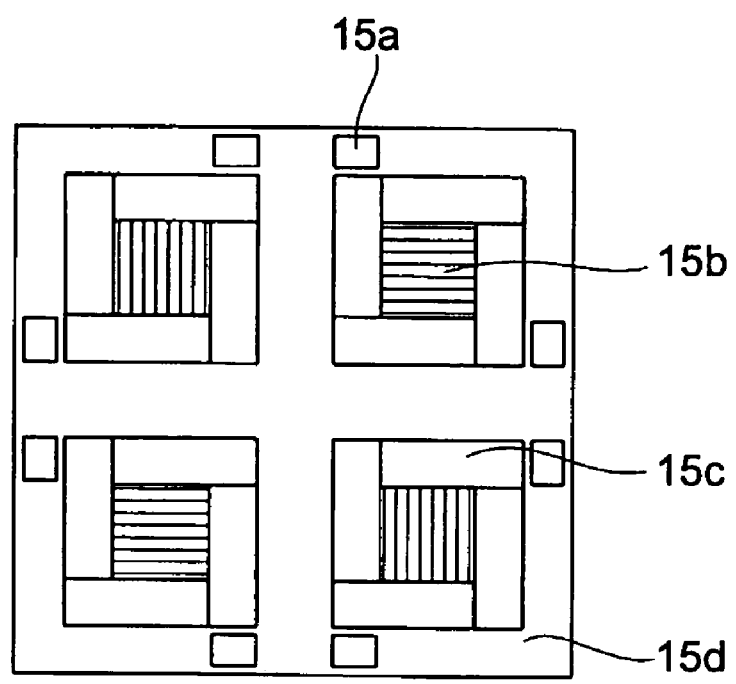
FIG. 35 is a view for explaining a fifteenth embodiment.

FIG. 35 is a view showing a configuration of the infrared source manufactured using a semiconductor chip (15d).

Respective integrated infrared sources have different polarization directions, different wavelengths, and different areas, making various combinations of infrared sources on the semiconductor chip (15d). Electrode pads (15a), grating portions (15b), and thermally insulated regions (15c) are installed on the semiconductor chip (15d). Openings (15c) for thermal insulation are empty or filled with thermal insulating materials.

The characteristics of the present embodiments are as follows.

1. They can be easily manufactured by a micro electro mechanical systems (MEMS) technology, etc.
2. Defect rate due to heat during operation can be reduced because of the insulated structure.
3. High speed modulation can be realized with a smaller thermal time constant that is achieved by the thermally insulated structure other than the grating portion of the infrared source.
4. Independent infrared sources can be integrated on one chip by the MEMS technology, etc.

Sixteenth Embodiment

FIG. 36

Figure 36:
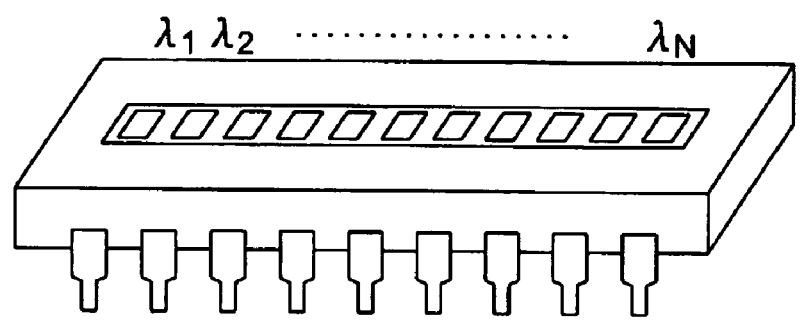
FIG. 36 is a view for explaining a sixteenth embodiment.

FIG. 36 is a view showing a one-dimensional array of the infrared sources. Wavelengths of infrared rays radiated from the infrared sources on the one chip, are represented by the following Formula 20.

$$\lambda_N \quad \text{[Formula 20]}$$

The characteristics of the present embodiments are as follows.

1. A wavelength scan emission element is achieved by electrically switching each infrared source, without a moving portion.
2. Compact multi-wavelength infrared sources, infrared wavelength scan elements, and infrared spectroscopes, etc. can be realized by integration of and making array of infrared sources.

Seventeenth Embodiment

FIG. 37

Figure 37:
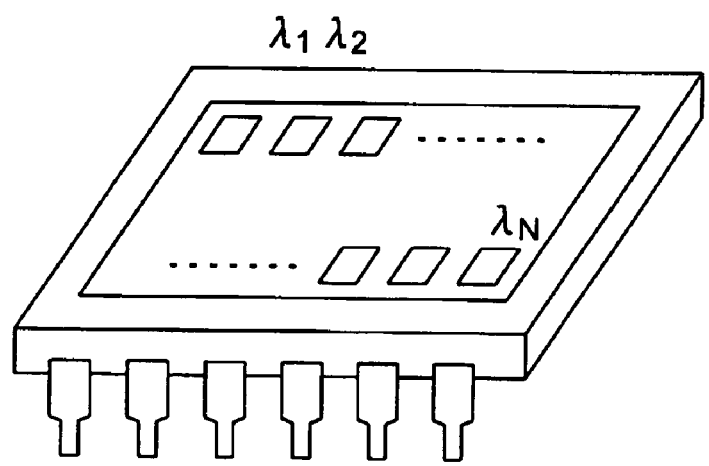
FIG. 37 is a view for explaining a seventeenth embodiment.

FIG. 37 is a view showing a two-dimensional array of the infrared sources. Wavelengths of infrared rays radiated from the infrared sources on the one chip, are represented by the following Formula 21.

$$\lambda_N \quad \text{[Formula 21]}$$

The characteristics of the present embodiments are as follows.

1. A wavelength scan emission element is achieved by electrically switching each infrared source, without a moving portion.
2. Compact multi-wavelength infrared sources, infrared wavelength scan elements, and infrared spectroscopes, etc. can be realized by integration of and making array of infrared sources.

Eighteenth Embodiment

FIG. 38

Figure 38:
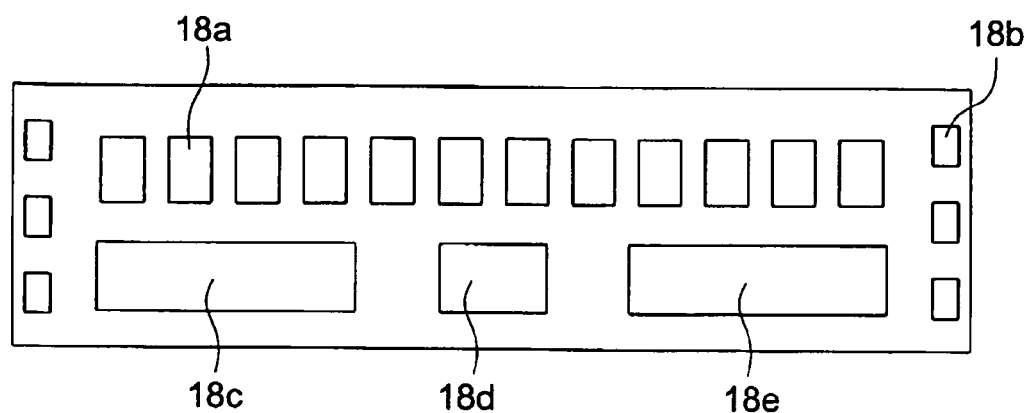
FIG. 38 is a view for explaining an eighteenth embodiment.

FIG. 38 is a view showing a configuration of an apparatus in which an array of infrared sources (18a), electrode pads (18b), a modulation circuit (18c), a temperature control circuit (18d), a noise cut circuit (18e), etc. are integrated. If electronic circuits are integrated in the chip, the number of the electrode pads can be reduced to save space.

Nineteenth Embodiment

FIG. 39

Figure 39:
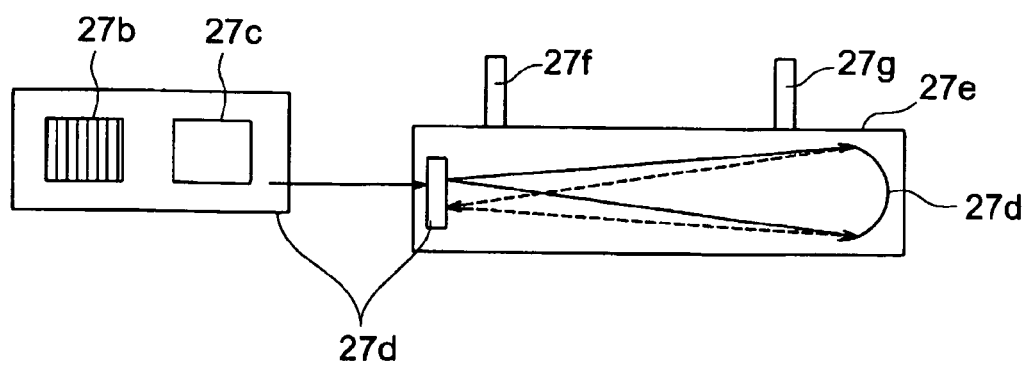
FIG. 39 is a view for explaining a nineteenth embodiment.

FIG. 39 is a view showing a configuration of a light projecting and receiving element having an infrared source (27b) and an infrared detecting element (27c) mounted on one chip (27d). Gas is introduced into a measuring cell (27e) from a gas introducing unit (27f) and is discharged from a gas discharging unit (27g). A gas concentration can be measured by detecting a light reflected from a reflector (27d) which has a wavelength equal to an absorption wavelength of a gas to be analyzed and has been radiated by the infrared source. A compact analysis system can be obtained by installing the infrared source (27b) and the infrared detecting element (27c) on one chip.

Twentieth Embodiment

Figure 40:
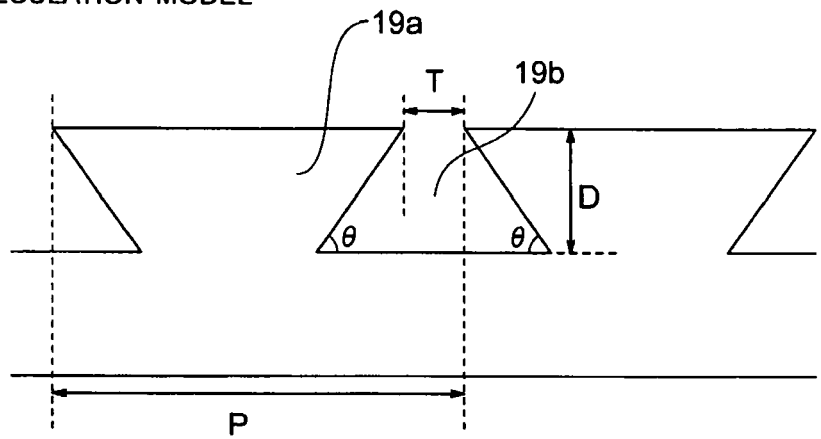
FIG. 40 is a view showing a cross section of a grating where an interface of a negative dielectric substance portion and a positive dielectric substance portion forms a predetermined angle to a grating surface in a twentieth embodiment.
Figure 41:
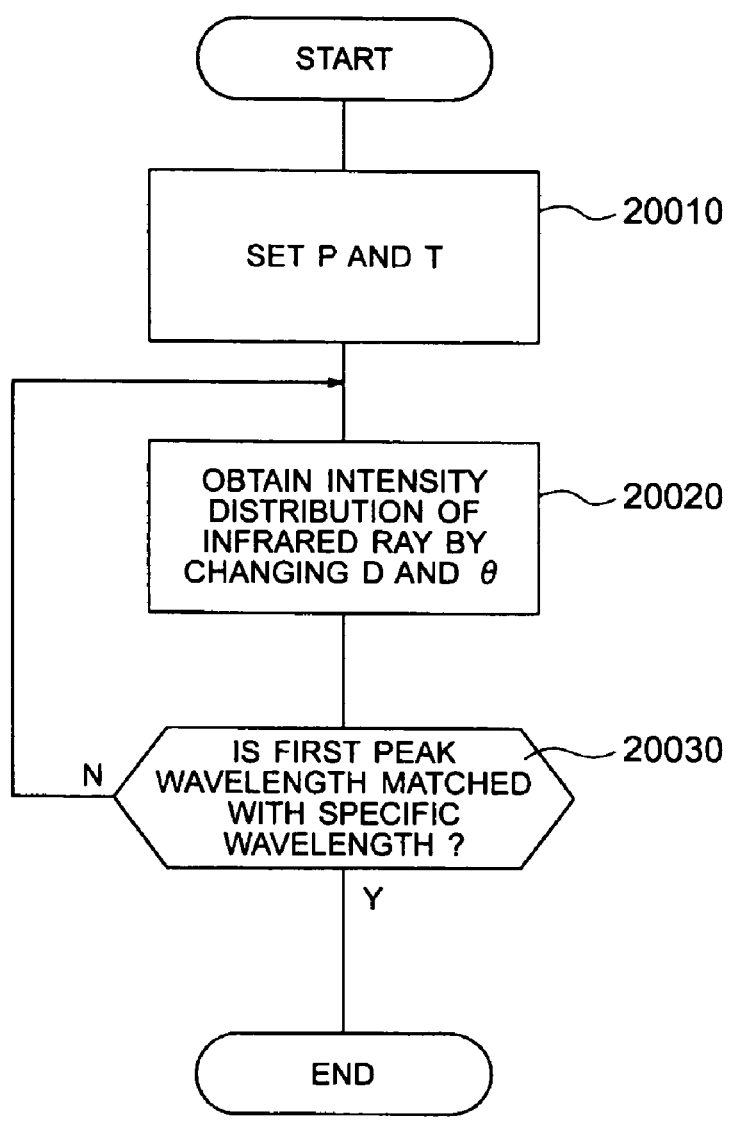
FIG. 41 is a flow chart showing a method of obtaining a grating depth D and a predetermined angle θ, when a grating period P and a width T of the positive dielectric substance portion are defined in the infrared source of the twentieth embodiment.
Figure 42:
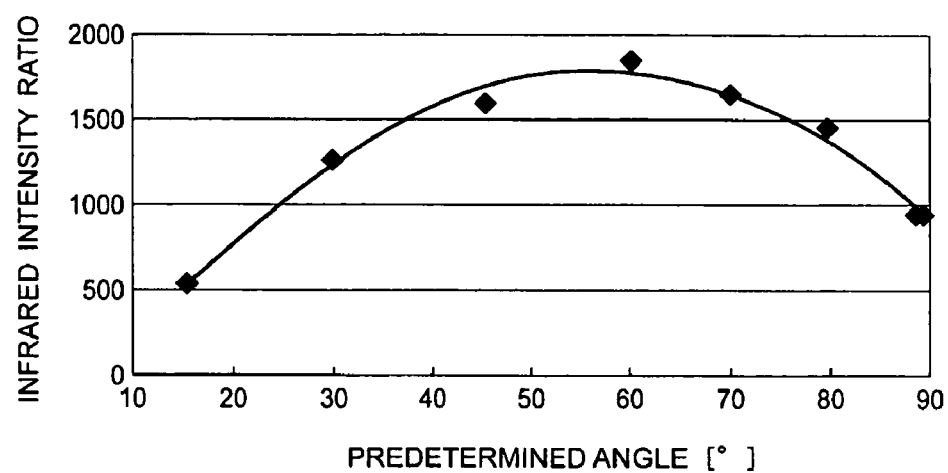
FIG. 42 is a view showing a relation between the predetermined angle and infrared intensity ratio in the infrared source of the twentieth embodiment.

FIGS. 40 to 42

A twentieth embodiment is identical with the eighth embodiment. In the section of the eighth embodiment a manufacturing method has been mainly described. In this section a designing method and a function will be described.

FIG. 40 is a view showing a cross section of the grating where a boundary surface between a portion functioning as negative dielectric substance (19a) and a portion functioning as positive dielectric substance (19b) is at a predetermined angle θ with respect to the grating surface.

FIG. 41 is a flow chart showing a method of obtaining a grating depth D and a predetermined angle θ, when a grating period P and a width T of the portion functioning as positive dielectric substance (such as dielectric) are defined in the infrared source.

At step S20010, a grating period P and a width T of the portion functioning as positive dielectric substance (such as dielectric) are set. When the specific wavelength is λ, any grating period P and any width T of the portion functioning as positive dielectric substance (such as dielectric) in such a way that the Formula 22 are satisfied.

$$0 < P \leq 2.0\lambda$$

$$T \leq 0.5P \quad \text{[Formula 22]}$$

At this point, the grating period P should be set in such a way that the Formula 23 is satisfied in order that diffraction is not generated in the infrared source.

$$0 < P \leq 0.5\lambda \quad \text{[Formula 23]}$$

At a step S20020, intensity distribution of infrared radiated from the infrared source is obtained by changing grating depth D and angle θ.

At step S20030, it is determined whether a first peak wavelength $\lambda_1$ matches the specific wavelength λ. If it is not affirmative, the process returns to step S20020 to further change grating depth D. If it is affirmative, grating depth D and angle θ at that time are considered as the grating depth and the predetermined angle for the infrared source, and the process is terminated.

FIG. 42 is a view showing a relation between predetermined angle and infrared intensity ratio. Data of the grating are below.

P 3.64 μm

D is optimized in the range of 0.01 to 0.8 μm

T 0.1 μm

λ 4.0 μm

As shown in FIG. 42, the infrared intensity ratio higher than that of the grating with the predetermined angle of 90° is obtained by adjusting grating depth D and angle θ. Although FIG. 42 shows the case where the predetermined angle is equal to or less than 90°, infrared intensity ratio higher than that of the grating with the predetermined angle of 90° is obtained, also in the case where the predetermined angle is larger than 90°.

Twenty-First Embodiment

Figure 43:
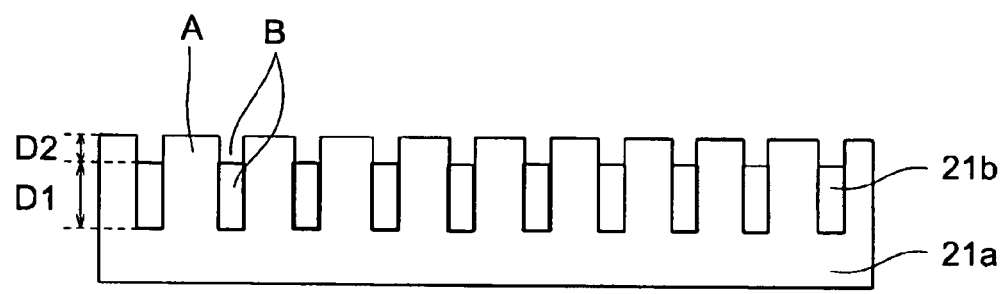
FIG. 43 is a view showing a grating where the positive dielectric substance portion is made of a positive dielectric substance and air (midair) and the negative dielectric substance portion is made of gold in a twenty-first embodiment.
Figure 44:
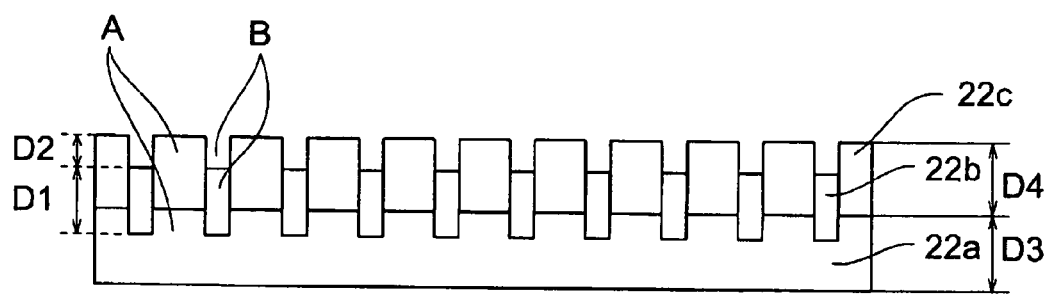
FIG. 44 is a view showing a grating where the positive dielectric substance portion is made of the positive dielectric substance and air (midair) and the negative dielectric substance portion is made of gold and silver in the infrared source of the twenty-first embodiment.
Figure 45:
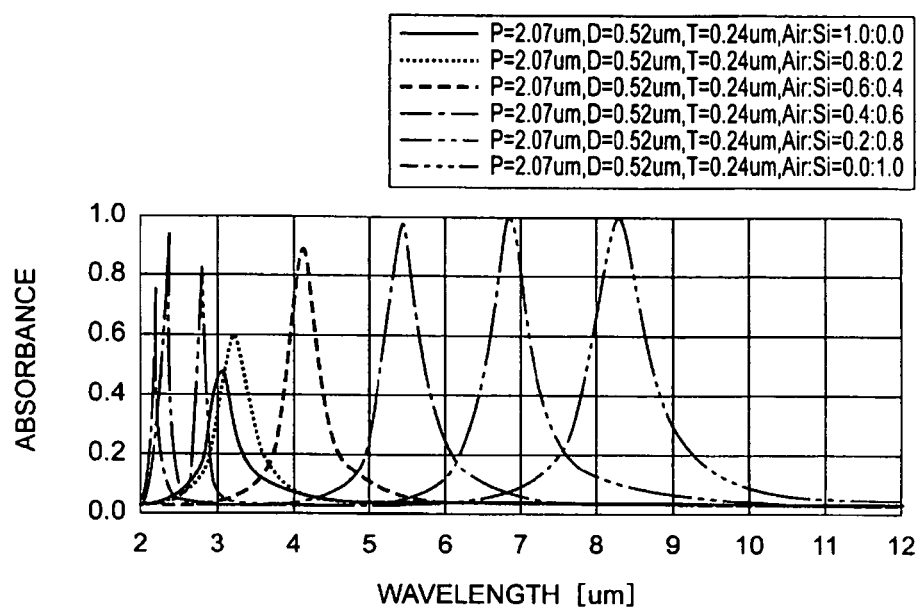
FIG. 45 is a view showing a relation between wavelength and absorbance when changing a ratio of D1 to D2 of the grating of the twenty-first embodiment.

FIGS. 43 to 45

The twenty-first embodiment shows a grating where one or both of a portion functioning as negative dielectric substance A and a portion functioning as positive dielectric substance B are made of a plurality of materials.

FIG. 43 is a view showing a grating where a portion functioning as positive dielectric substance B is made of a positive dielectric substance (21b) such as Si and air (midair) and a portion functioning as negative dielectric substance A is made of gold (22a).

FIG. 44 is a view showing a grating where a portion functioning as positive dielectric substance B is made of a positive dielectric substance (22b) such as Si and air (midair) and a portion functioning as negative dielectric substance A is made of gold (22a) and silver (22c).

FIG. 45 is a view showing a relation between wavelength and absorbance when changing a ratio of D1 to D2 of the grating shown in FIG. 43. If depth D1 of Si of the portion functioning as positive dielectric substance B is increased, the first peak wavelength is shifted to a long wavelength side. Therefore, when determining a grating depth D required for obtaining any specific wavelength, if positive dielectric substance with refractive index larger than that of air is used, grating depth D can be reduced as compared to the case where the overall grating portion is air, thereby facilitating processing of the grating portion. Further, by adjusting depth ratio (D1:D2) of at least two kinds of materials with different refractive indexes for the grating portion, wavelength peak of the first peak wavelength can be adjusted.

As described above, by the use of two kinds of positive dielectric substances (including air) or two kinds of negative dielectric substances, the number of parameters for controlling the specific wavelength is increased, thereby facilitating designing and manufacturing.

Applications of the infrared source according to the invention described above will be described below.

Carbon Dioxide Detector

A specific infrared ray is absorbed by carbon dioxide, and the absorption of the specific infrared ray is used to detect a carbon dioxide concentration by detecting an infrared attenuation factor of the wavelength of the absorption.

In conventional detectors which perform measurement by a light absorption method, a laser and a ceramic heater are used as the light source. In the use of a laser, because a laser corresponding wavelength for large absorption of carbon dioxide does not exist, a laser having a wavelength close to the absorption peak of carbon dioxide is frequently used. In the use of a ceramic heater, light intensity at the wavelength in which carbon dioxide exhibits large absorption is small for the total energy. The use of the infrared source according to the invention concentrates energy on the wavelength in which carbon dioxide exhibits large absorption, which improves detection sensitivity and accuracy.

Infrared Spectrometer

In conventional infrared spectrometers, usually a silicon carbide light source, a halogen light source, and a ceramic light source are used as the light source, and spectral analysis is performed on light emitted from the light source using a filter and a diffraction grating. The use of the infrared source according to the invention reduces loads on the filter and diffraction grating to improve efficiency.

Analyzer with Infrared Ray

In analyzers in which infrared ray is used, light emitted from a silicon carbide light source, a halogen light source, or a ceramic light source is divided into specific wavelength components by an infrared spectrometer. A specimen is irradiated with infrared ray having a specific wavelength component to analyze a state of the specimen, by measuring reflection or transmission of the specimen. The use of the infrared source according to the invention reduces load of the infrared spectrometer, and sometimes the infrared spectrometer can be eliminated.

Road Surface Condition Obtaining Device

A road surface is irradiated with infrared ray having the wavelength ranging from 2 to 7 μm which is of the absorption wavelength of water, and reflection is observed with a sensor to obtain information on the road surface condition. Similarly, a road surface is irradiated with infrared ray having the wavelength which is of the absorption wavelength of soil, and reflection is observed with a sensor to obtain information on the road surface condition.

Conventionally, a light emitting diode and a laser diode are used as the light source. These light sources emit light beams having the specific wavelengths alone. The use of the infrared source according to the invention provides a light source having any wavelength, so that more information on road surface condition can be obtained.

Medical Tool for Infrared Therapy

Medical tool which irradiate a human body with a far infrared rays having wavelengths ranging from 8 to 14 μm are used. Conventionally, a lamp, a light emitting diode, and a laser diode are used as the light source. The light emitting diode and the laser diode emit light beams having the specific wavelengths alone. In the use of the lamp, because light has a wide wavelength range, most input power is converted into unnecessary radiation light. The use of the infrared source according to the invention provides a light source having a desired wavelength, so that infrared therapy can efficiently be performed.

Brix Meter

In a Brix meter, an object is irradiated with infrared ray, and a transmission or an absorption is measured to measure a sugar content or an acid degree. Conventionally, a halogen lamp, a light emitting diode, and a laser diode are used as the light source. When the halogen lamp is used, because a cooling device is required, the Brix meter is upsized. The light emitting diode and the laser diode emit light beams having the specific wavelengths alone. The use of the infrared source according to the invention provides a light source having the desired wavelength, so that more information on sugar content can be obtained.

Moisture Meter

In a moisture meter, an object is irradiated with infrared ray, and absorption by a water molecule is measured to measure moisture. Conventionally, a halogen lamp is used as the light source. In the use of the halogen lamp, because the light has a wide wavelength range, most input power is converted into unnecessary radiation light. The use of the infrared source according to the invention provides a light source having the desired wavelength, so that moisture can efficiently be measured.

Infrared Object Detecting System

The infrared object detecting system includes a projector and a light acceptance device. The projector includes an infrared light source, and the light acceptance device includes an infrared sensor. When infrared ray emitted from the light source is blocked by an object in an optical path, and the sensor does not detect the infrared ray, which allows the sensor to detect the presence of the object. Sometimes a reflecting plate is provided in the optical path to integrally form the projector and the light acceptance device. If the infrared source according to the invention is employed, the wavelength which has a small spectral component of the sunlight or illumination lights can be selected to use, and noises caused by the sunlight or illumination lights can be decreased.

On-Vehicle Radar

An on-vehicle radar is used to detect a position of a leading vehicle or an obstacle by emitting a millimeter wave or a infrared ray to measure the reflection. A radar device with a light emitting diode or a laser diode has increasingly been used in place of an expensive radar with a millimeter wave. The light emitting diode and the laser diode emit light beams having the specific wavelengths alone. The use of the infrared source according to the invention provides a light source having the desired wavelength, so that more information can be obtained.

Figure 46:
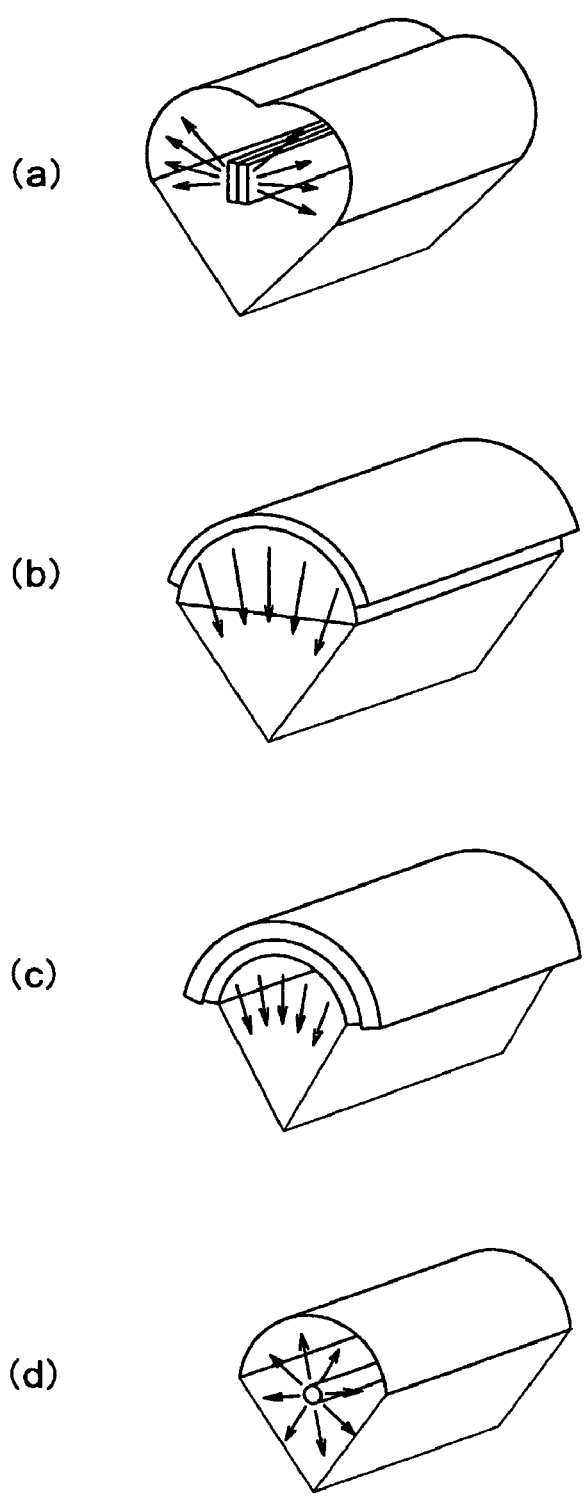
FIG. 46 is a view showing configuration examples of infrared heaters using the infrared source of the present invention and the related art.

Infrared Heater (FIG. 46)

An infrared heater where an infrared lamp is combined with a reflector coated with gold is used to heat objects in a non-contact manner. Conventional infrared lamps irradiate infrared lights with a wide wavelength range to objects based on the Planck's law. Infrared lights with wavelengths that the objects can hardly absorb are not effectively used for heating and are uselessly scattered so that the efficiency is degraded.

On the other hand, the infrared source according to the present invention can be manufactured to radiate lights at absorption wavelengths of objects to be heated, alone, so that the objects can be heated with higher efficiency. Further, it is possible to selectively heat the objects to be heated alone without uselessly heating surrounding objects. Objects to be heated may be solids, liquids, or gases. The infrared heater of the present invention is especially effective for objects that show a clear absorption peak. Most of gases and liquids and solids such as polymer have such absorption spectra. The infrared source of the present invention may use a single grating. In the case where an absorption spectrum of the object has a plurality of peaks or a wide peak range or a plurality of materials are heated at the same time, a plurality of gratings may be combined so as to treat the radiation spectra mentioned above.

FIG. 46($a$) is a view showing one example of a configuration of the infrared heater using the infrared source of the present invention. In the example, two elongated rectangular infrared sources are fixed back-to-back and radiate infrared lights to both sides. The radiated infrared lights are condensed in one linear region by parabolic mirrors on both sides.

FIG. 46($b$) is a view showing one example of a configuration of the infrared heater using the infrared source of the present invention. In the example, the infrared source of flexible sheet type according to the tenth embodiment is adhered to a surface of a cylindrical lens of a transparent material such as sapphire, well transmitting infrared light, in such a way that infrared lights are radiated to the inner side and are condensed in one linear region. The configuration of FIG. 46($b$) is an application example of the embodiments shown in FIGS. 13 to 16.

FIG. 46($c$) is a view showing one example of a configuration of an infrared heater using the infrared source of the present invention. In the example, the infrared source of flexible sheet type according to the tenth embodiment is adhered to an inner surface of a holding substrate in a cylindrical shape in such a way that infrared lights are radiated to the inner side and are condensed in one linear region.

FIG. 46($d$) is a view showing one example of a configuration of an infrared heater using a conventional infrared source. A linear infrared lamp is fixed at a focus position of a parabolic mirror. Infrared rays are condensed in a linear shape to heat an object at a position where the rays are condensed.

Infrared Light Radiation Control Sheet

If a sheet having a grating radiating infrared lights with a specific wavelength on the surface, such as shown in the tenth embodiment (FIG. 30), is adhered to any objects with finite temperature (not absolute zero temperature), the objects are changed to an infrared source radiating infrared lights with the specific wavelength and specific polarization. Alternatively, radiation spectral distribution of the objects is properly changed so that it can easily be detected or cannot easily be detected by others with infrared lights. For example, if the sheet radiating infrared lights that water can easily absorb is adhered to an inner wall of an oven, the oven can selectively and effectively heat moisture to cook foods. Recently, an infrared camera capable of visually recognizing a pedestrian at night or under weather conditions obstructing a driver's view is installed on a car, etc. If the sheet set to the wavelength at which the sensitivity of the camera becomes high is installed in clothes or shoes and infrared lights are radiated from a human body as a heat source, the car can better recognize the pedestrian, improving safety. Further, when any object is intended to avoid detection from an apparatus tracking infrared lights with s specific wavelength, the sheet radiating infrared lights with a wavelength different from the specific wavelength is covered on the high-temperature portion of the object so that the object can avoid the detection by the apparatus, maintaining a heat emitting function due to radiation.

High-Speed Operating Infrared Array (FIGS. 36 and 37)

As shown in FIGS. 36 and 37, infrared sources are mounted on one chip in a one-dimensional array or a two-dimensional array. In this case, with each infrared source of the array having small heat capacity as a whole, the infrared source array that is of first-response and emits lights of a plurality of wavelengths can be realized. The infrared source having small heat capacity is one according to the eleventh embodiment, for example. If a temperature of the heating element is set to about 300° C., the overall infrared region with wavelengths of several μm or more, can be covered. A thermal time constant of about millisecond to second can be realized so that operating frequency of about $10^{-2}$ to $10^2$ Hz can be obtained.

An analysis system of the systems including the infrared source will be described in detail with an example of an analysis system which measures a concentration of gas.

Specifically, gases which are to be measured include, for example, carbon dioxide, carbon monoxide, sulfur dioxide, so-called NOx such as nitrogen monoxide and nitrogen dioxide and infrared-active molecules consisting of different atoms, such as ammonia, methane, propane and the like.

Figure 55:
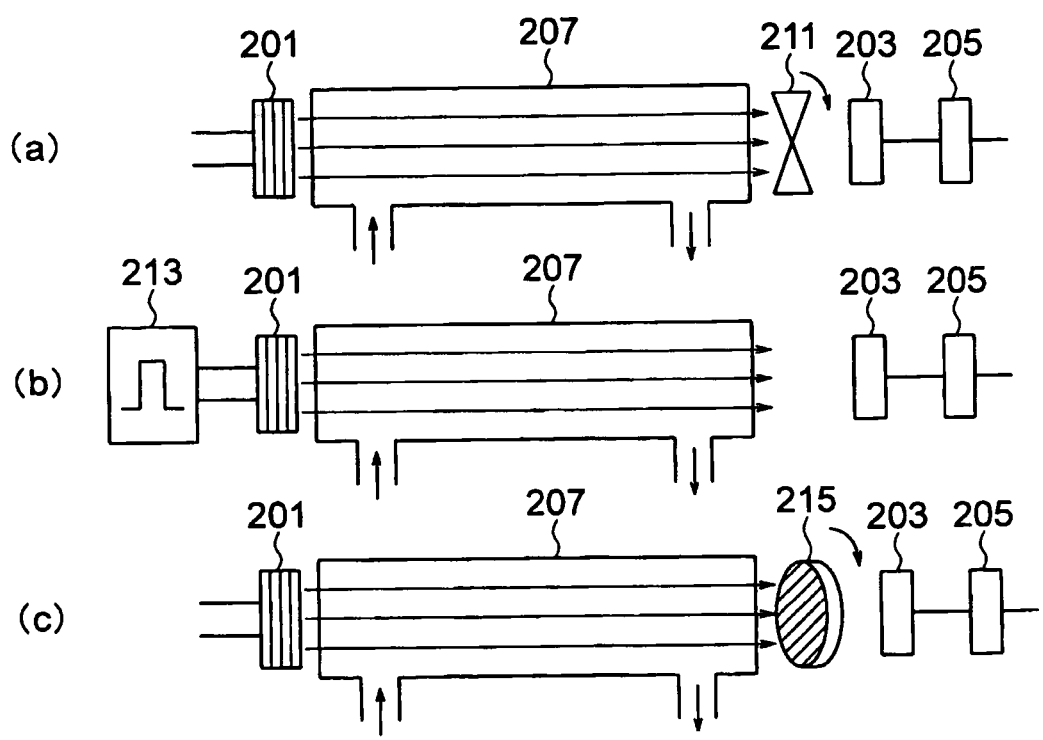
FIG. 55 is a view showing a configuration of an analysis system according to one embodiment of the present invention.

FIGS. 55($a$) to ($c$) are views respectively showing configurations of the analysis systems according to embodiments of the present invention. The analysis systems according to the embodiments include an infrared source 201, an infrared sensor 203, a demodulator 205, and a gas container (cell) 207. The infrared source 201 is, for example, the infrared source 100 shown in FIG. 1 that radiates infrared rays that have polarization planes (polarization plane in an A direction of FIG. 1) orthogonal to the arrangement direction of the gratings and have specific wavelengths determined according to the grating shape. As the infrared sensor 203, a pyroelectric sensor using the property that charges are generated on a surface of dielectric when the surface of dielectric is heated, a bolometer, or a thermopile that is a thermocouple array may be used.

Figure 56:
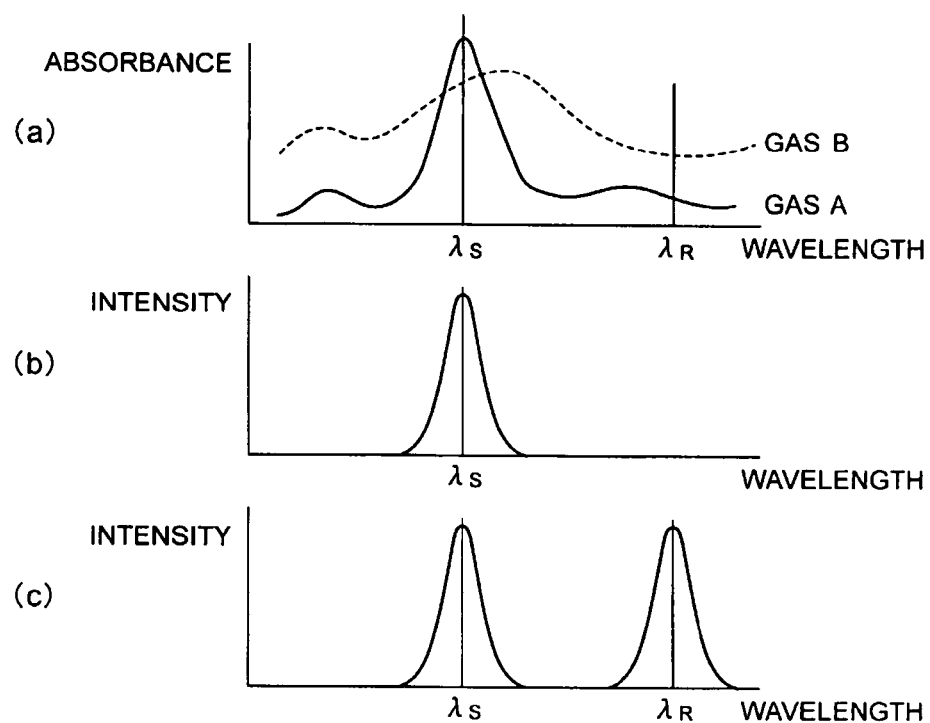
FIG. 56 is a view showing the infrared absorbance of gas to be measured and the radiation intensity of the infrared source.

FIG. 56 is a view showing infrared absorbance (FIG. 56(a)) of the gas to be measured and radiation intensity (FIG. 56(b)) of the infrared source 201.

The specific wavelength radiated from the infrared source 201 is set to be matched with a wavelength (for example, a peak wavelength of absorbance) $\lambda_S$ suitable for measuring a concentration of the object gas A to be measured. Specifically, for example, when the object gas A to be measured is carbon dioxide, the specific wavelength radiated from the infrared source 201 is set to 4.3 μm and when the object gas A to be measured is carbon monoxide, the specific wavelength is set to 4.7 μm.

The infrared source 201 can radiate infrared rays with the specific wavelengths determined according to the characteristics of the object to be measured so that a wavelength selecting element (such as a filter) used in conventional analysis systems is not needed. Further, the infrared source 201 can concentrate energy from the heating element at the specific wavelength so that it has higher energy efficiency, as compared to conventional analysis systems wherein lights besides those at the specific wavelength are discarded by the wavelength selecting element.

The analysis system shown in FIG. 55(a) further includes a chopper 211 for periodically changing intensity of a measurement signal. Infrared rays with the specific wavelengths radiated from the infrared source 201 pass through the gas to be measured in the gas container 207 and their intensity is periodically changed by the chopper 211, and they are detected by the infrared sensor 203. The measurement signal detected by the infrared sensor 203 is demodulated and delivered as an output by the demodulator 205.

The analysis system shown in FIG. 55(b) further includes a power supply 213 that periodically changes power. When the infrared source 100 is used as the infrared source 201, for example, power supplied to the heating element of the infrared source 201 is periodically changed by the power supply 213 so that intensity of infrared rays radiated from the infrared source 201 is changed. Infrared rays with the specific wavelengths radiated from the infrared source 201 pass through the gas to be measured in the gas container 207 and they are detected by the infrared sensor 203. The measurement signal detected by the infrared sensor 203 is demodulated and delivered as an output by the demodulator 205. Since intensity of infrared rays is changed by the power supply 213 that periodically changes power, such a moving portion as a chopper is not necessary, thereby making a configuration simple.

The analysis system shown in FIG. 55(c) includes a polarization element 215 between the infrared source 201 and the infrared sensor 203. The polarization element 215 passes lights having a predetermined polarization plane, alone.

A commercially available wire gird polarization element can be used as a polarization element with 2.5 to 25 μm wavelength band. Wire grid polarization elements reflect polarization component parallel to the wire and transmits polarization component perpendicular thereto. In the analysis system shown in FIG. 55(a), since the infrared source 201 radiates infrared rays with the specific wavelengths, the same polarization element can be used as it is even when a different object is measured with a different wavelength.

In the analysis system shown in FIG. 55(c), the polarization element 215 also serves as a means that periodically changes intensity. The polarization element 215 may be arranged to rotate around the optical axis within a plane perpendicular to the optical axis. When the polarization element 215 is rotated, intensity of the measurement signal is periodically changed.

Figure 57:
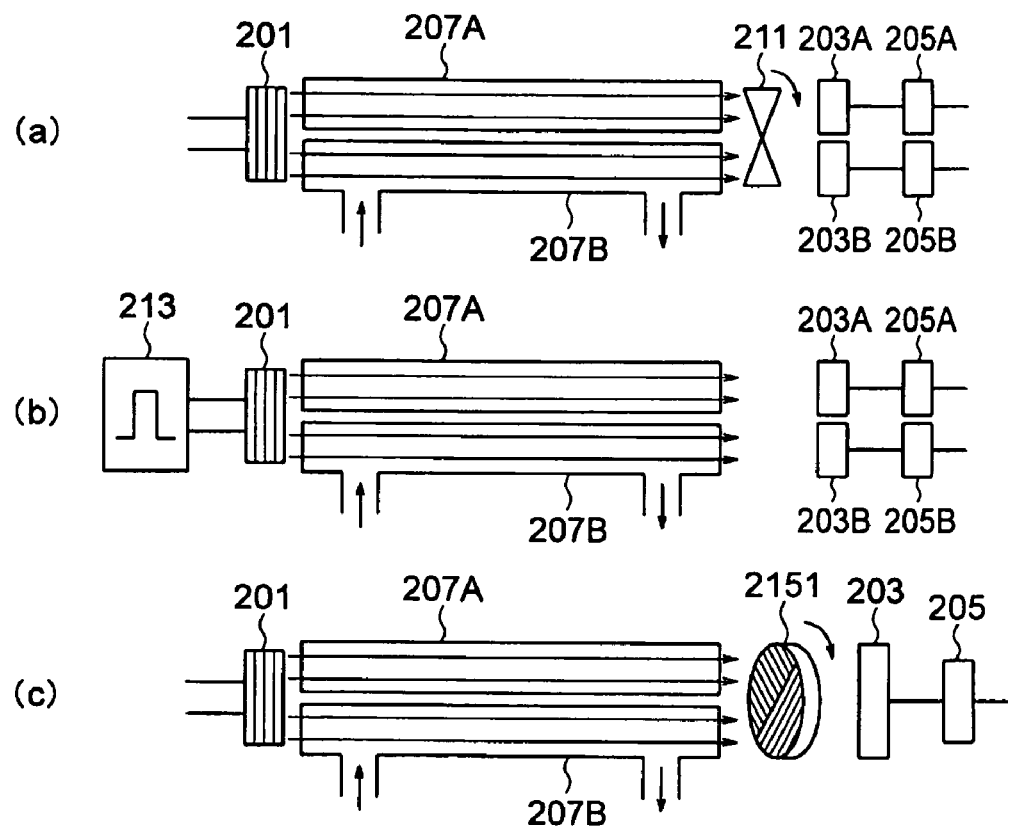
FIG. 57 is a view showing a configuration of an analysis system in a reference sampling manner according to one embodiment of the present invention.

FIGS. 57(a) to (c) are views respectively showing configurations of the analysis systems in a reference sample method according to embodiments of the present invention. The analysis systems according to the embodiments include an infrared source 201, an infrared sensor 203 or infrared sensors 203A and 203B, a demodulator 205 or demodulators 205A and 205B, and gas containers 207A and 207B. The infrared source 201 is, for example, the infrared source 100 shown in FIG. 1 that radiates infrared rays that have polarization planes (polarization plane in an A direction of FIG. 1) orthogonal to the arrangement direction of the gratings and have the specific wavelengths determined according to the grating shape. The gas container 207A includes a reference sample gas and the gas container 207B includes a gas to be measured. Infrared rays with the specific wavelengths are radiated to the reference sample gas and the gas to be measured by the infrared source 201. A concentration of the gas to be measured is obtained by obtaining measurement outputs of the infrared sensor with respect to the reference sample gas and the gas to be measured and comparing the outputs.

The analysis system shown in FIG. 57(a) further includes a chopper 211 for periodically changing intensity of a measurement signal. Infrared rays with the specific wavelengths radiated from the infrared source 201 pass through the reference sample gas in the gas container 207A on the one hand and thorough the gas to be measured in the gas container 207B on the other hand, and their intensities are periodically changed by the chopper 211 and are detected by the infrared sensors 203A and 203B. The measurement signals detected by the infrared sensors 203A and 203B are demodulated and delivered as outputs by the demodulators 205A and 205B, respectively.

The analysis system shown in FIG. 57(b) further includes a power supply 213 periodically changing power for changing intensity of infrared rays radiated from the infrared source 201. When the infrared source 100 is used as the infrared source 201, for example, power supplied to the heating element 107 of the infrared source 100 is periodically changed by the power supply 213 so that intensity of infrared rays radiated from the infrared source 201 is changed. Infrared rays with the specific wavelengths radiated from the infrared source 201 pass through the reference sample gas in the gas container 207A on the one hand and through the gas to be measured in the gas container 207B on the other hand, and then they are detected by the infrared sensors 203A and 203B. Measurement signals detected by the infrared sensors 203A and 203B are demodulated and delivered as outputs by the demodulators 205A and 205B, respectively.

The analysis system shown in FIG. 57(c) further includes a polarization element 2151 between the infrared source 201 and the infrared sensor 203. The polarization element 2151 includes two regions, wherein polarization directions of lights transmitting the two regions are orthogonal to each other.

In the analysis system shown in FIG. 57(c), the polarization element 2151 may be arranged to rotate around the optical axis within a plane perpendicular to the optical axis, for example. The measurement signals and the reference signals can be measured separately by one infrared sensor 203 if the system is so arranged that the output signals from the demodulator 205 are read when the polarization plane of the infrared rays radiated from the infrared source 201 agrees with the polarization plane of light transmitted by the polarization element 2151 while the polarization element 2151 is rotating.

Figure 58:
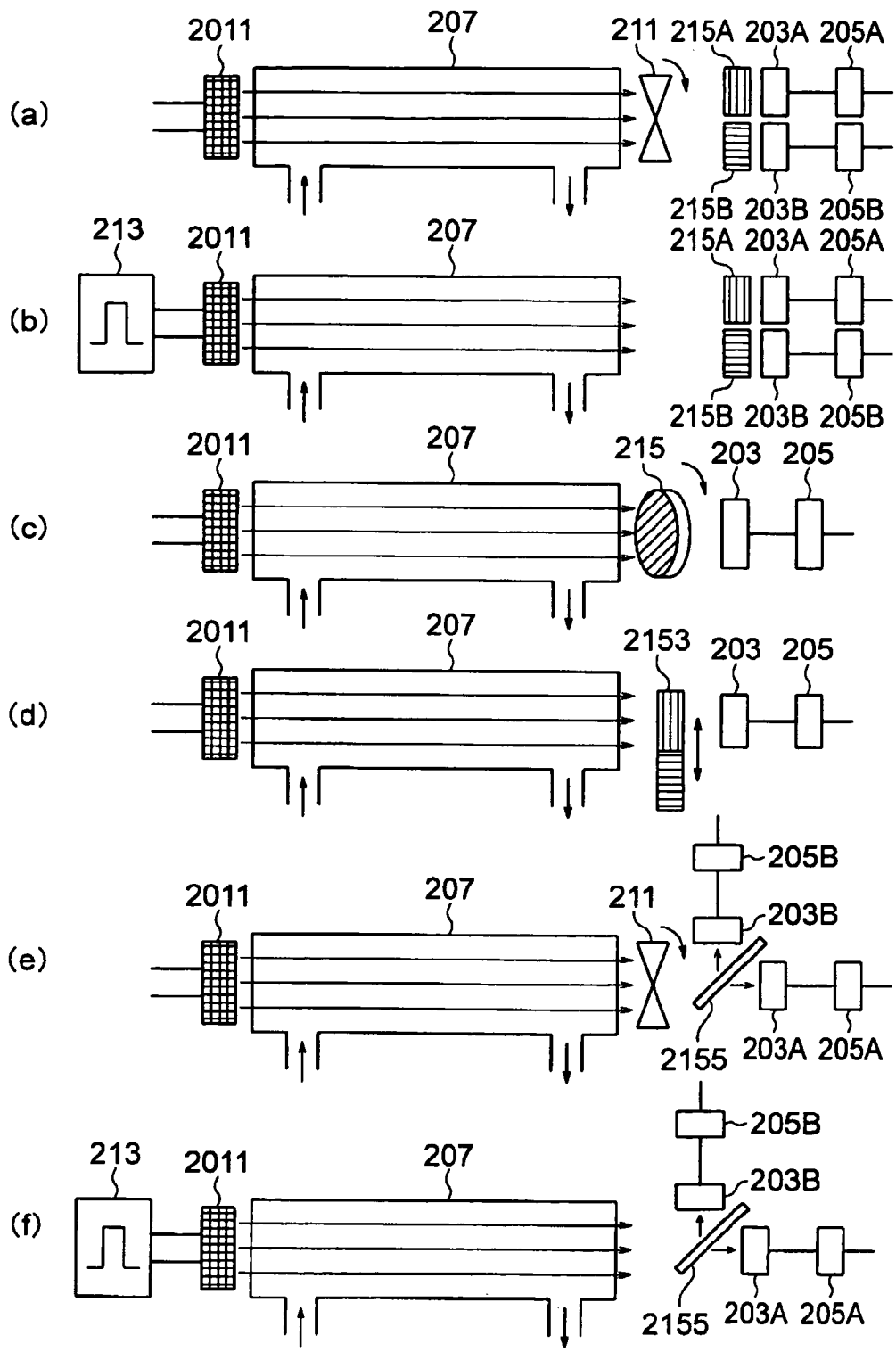
FIG. 58 is a view showing a configuration of the analysis system in a two-wavelength manner according to one embodiment of the present invention.

FIGS. 58(a) to (c) are views respectively showing configurations of the analysis systems in a two-wavelength method according to embodiments of the present invention. The analysis systems according to the embodiments include an infrared source 2011, an infrared sensor 203 or infrared sensors 203A and 203B, a demodulator 205 or demodulators 205A and 205B, and a gas container 207.

The infrared source 2011 is, for example, the infrared source shown in FIG. 19 that has a plurality of gratings in different directions mounted on one-chip heating element. The infrared source radiates infrared rays that have polarization planes (polarization plane in an A direction of FIG. 1) in different directions orthogonal to the arrangement directions of respective gratings and have the specific wavelengths determined according to the grating shape. As one example, the infrared source 2011 includes a first set of gratings arranged in a predetermined direction and a second set of gratings arranged in a direction orthogonal to the predetermined direction on the one-chip heating element. Shapes of the first and second sets of gratings are determined in such a way that the specific wavelengths are set to $\lambda_S$ with large absorbance and $\lambda_R$ with small absorbance in consideration of absorbance of the gas to be measured as shown in FIG. 56(a). Therefore, the infrared source 2011 radiates two kinds of infrared rays having wavelengths $\lambda_S$ and $\lambda_R$, respectively, and polarization planes orthogonal to each other (FIG. 56(c)).

The analysis system shown in FIG. 58(a) further includes a chopper 211 for periodically changing intensity of the measurement signal. Two kinds of infrared rays radiated from the infrared source 2011 pass through a gas to be measured in the gas container 207 and their intensity is periodically changed by the chopper 211. Thereafter, each of the two kinds of infrared rays passes through the polarization element 215A or 215B transmitting lights with polarization planes orthogonal to each other and is then detected by the infrared sensor 203A or 203B, respectively. Measurements signals detected by the infrared sensor 203A and 203B are demodulated and delivered as outputs by the demodulator 205A and 205B, respectively.

As the polarization elements 215A and 215B, the same polarization elements whose arrangement directions are different from each other may be used. Compared to conventional analysis systems in two-wavelength method requiring wavelength selecting elements for two wavelengths, the number of components is reduced.

The analysis system shown in FIG. 58(b) further includes a power supply 213 that periodically changes power for changing intensity of infrared rays radiated from the infrared source 2011. The infrared source 2011 is the infrared source shown in FIG. 19 and power supplied to the one-chip heating element is periodically changed by the power supply 213 so that intensity of infrared rays radiated from the infrared source 2011 is changed. Two kinds of infrared rays radiated from the infrared source 2011 pass through the gas to be measured in the gas container 207, and each of the two kinds of infrared rays passes through the polarization element 215A or 215B transmitting lights with polarization planes orthogonal to each other and is then detected by the infrared sensor 203A or 203B. Measurement signals detected by the infrared sensor 203A and 203B are demodulated and delivered as outputs by the demodulator 205A and 205B, respectively. Intensity of infrared rays radiated from the infrared source 2011 is changed by the power supply 213 that periodically changes power so that a moving portion is not needed, thereby making a configuration simple.

The infrared source 2011 can concentrate energy from the heating element on the specific wavelength. Therefore, a heating value of the heating element in response to the required intensity of infrared rays can be reduced. As a result, a size of the chip can be reduced as described above. Further, since a heat capacity of the heating element can be reduced, output of the power supply 213 that periodically changes power can be reduced and a period of output pulses can be shortened.

The analysis system shown in FIG. 58(c) further includes a polarization element 215 between the infrared source 2011 and the infrared sensor 203.

In the analysis system shown in FIG. 58(c), the polarization element 215 may be so arranged to rotate around the optical axis within a plane perpendicular to the optical axis. An infrared sensor 203 can be used for infrared rays of the wavelength $\lambda_S$ and the infrared rays of the wavelength $\lambda_R$ if the system is so arranged that the output signals from the demodulator 205 are read when the polarization plane of each of the two kinds of infrared rays radiated from the infrared source 2011 agrees with the polarization plane of light transmitted by the polarization element 215 while the polarization element 215 is rotating.

The analysis system shown in FIG. 58(d) includes a polarization element 2153 between the infrared source 2011 and the infrared sensor 203. The polarization element 2153 includes two regions, wherein the polarization directions of light transmitting the two regions are orthogonal to each other. The polarization directions orthogonal to each other correspond to the polarization planes of the two kinds of infrared rays radiated from the infrared source 2011.

In the analysis system shown in FIG. 58(d), a polarization element 2153 is arranged to perform a translational reciprocating motion in the upstream of the infrared sensor 203. As a result, infrared rays of wavelength $\lambda_S$ and infrared rays of wavelength $\lambda_R$ are alternately incident on the infrared sensor.

When such a translational motion as that of the polarization element 2153 of FIG. 58(d) is realized by a mechanism not including a sliding portion, such as a bimorph, reliability of the analysis system is further improved.

The analysis system shown in FIG. 58(e) further includes a chopper 211 for periodically changing intensity of a measurement signal. Two kinds of infrared rays radiated from the infrared source 2011 pass through a gas to be measured in the gas container 207 and their intensity is periodically changed by the chopper 211. Thereafter, each of the two kinds of infrared rays is detected by an infrared sensor 203A or 203B after having passed through a polarization splitter 2155. The measurement signals detected by the infrared sensor 203A and 203B are demodulated and delivered as outputs by the demodulator 205A or 205B, respectively. As the polarization splitter 2155, a wire grid polarization element described above can be used.

The analysis system shown in FIG. 58(f) further includes a power supply 213 that periodically changes power for changing intensity of infrared rays radiated from the infrared source 2011. The infrared source 2011 is the infrared source shown in FIG. 19 and power supplied to the one-chip heating element is periodically changed by the power supply 213 so that intensity of infrared rays radiated from the infrared source 2011 is changed. Two kinds of infrared rays radiated from the infrared source 2011 pass through a gas to be measured in the gas container 207, and each of the two kinds of infrared rays is detected by an infrared sensor 203A or 203B after having passed through s polarization splitter 2155. Measurement signals detected by the infrared sensors 203A and 203B are demodulated and delivered as outputs by demodulators 205A and 205B respectively. Intensity of the infrared rays is changed by the power supply 213 that periodically changes power so that a moving portion is not needed, thereby making the configuration simple.

In the analysis system shown in FIG. 58(f), energy of infrared rays radiated from the heating element is concentrated on infrared rays at a specific wavelength and is radiated from the infrared source 2011. Further, since intensity of infrared rays radiated from the infrared source 2011 is periodically changed without a chopper, infrared rays radiated once are not interrupted and discarded. Further, the two kinds of infrared rays reach the infrared sensors 203A and 203B with minimum loss by the polarization splitter 2155. The analysis system shown in FIG. 58(f) can theoretically use all energy that can be used so that energy efficiency is extremely high.

In the analysis system shown in FIGS. 58(a) to (f), infrared rays with the two kinds of polarization planes radiated from the infrared source are separated by the polarization element. Thus, a small analysis system using two kinds of infrared rays can be obtained. Further, the analysis system robust against noise is obtained by the use of a polarization element.

Figure 59:
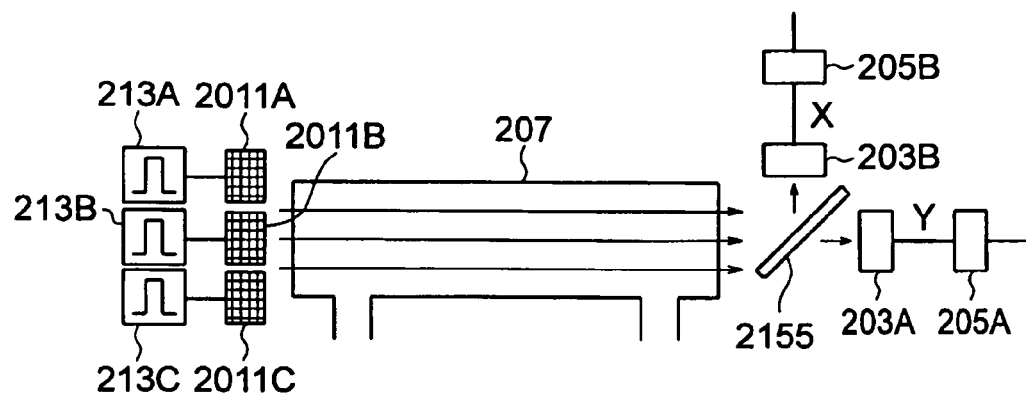
FIG. 59 is a view showing a configuration of a five-component analysis system in a six-wavelength manner according to one embodiment of the present invention.

FIG. 59 is a view showing a configuration of a five-component analysis system in a six-wavelength method according to one embodiment of the present invention. The analysis system according to the embodiment includes infrared sources 2011A, 2011B, and 2011C, infrared sensors 203A and 203B, demodulators 205A and 205B, a gas container 207, power supplies 213A, 213B, and 213C periodically changing power, and a polarization splitter 2155.

The infrared sources 2011A, 2011B, and 2011C are, for example, the infrared source shown in FIG. 19 that has a plurality of gratings in different directions mounted on the one-chip heating element. Each of the infrared sources radiates infrared rays that have polarization planes (polarization plane in an A direction of FIG. 1) in different directions orthogonal to the arrangement directions of respective gratings and have the specific wavelengths determined according to the grating shape. Each of the infrared sources 2011A, 2011B, and 2011C, includes a first set of gratings arranged in a predetermined direction and a second set of gratings arranged in a direction orthogonal to the predetermined direction on the one-chip heating element. The arrangement directions of the first sets of gratings in the three infrared sources are the same and the arrangement directions of the second sets of gratings in the three infrared sources are also the same. The shapes of the first and second sets of gratings in the infrared sources 2011A, 2011B, and 2011C are determined so that the specific wavelengths are characteristic wavelengths of five kinds of object gases to be measured and reference wavelength in consideration of absorbance of gases to be measured as shown in FIG. 56(a). Therefore, each of the infrared sources 2011A, 2011B, and 2011C radiates two kinds of infrared rays that have one of the specific wavelengths and have polarization planes orthogonal to each other.

By changing power supplied to the one-chip heating element by the power supplies 213A, 213B, and 213C periodically changing power, intensity of infrared rays radiated from the infrared sources 2011A, 2011B, and 2011C is changed. Two kinds of infrared rays radiated from each of the infrared sources 2011A, 2011B, and 2011C pass through the gas to be measured in the gas container 207 and each of the two kinds of infrared rays is detected by the infrared sensor 203A or 203B after having passed through the polarization splitter 2155. Measurement signals detected by the infrared sensors 203A and 203B are demodulated and delivered as outputs by the demodulator 205A and 205B, respectively.

Figure 60:
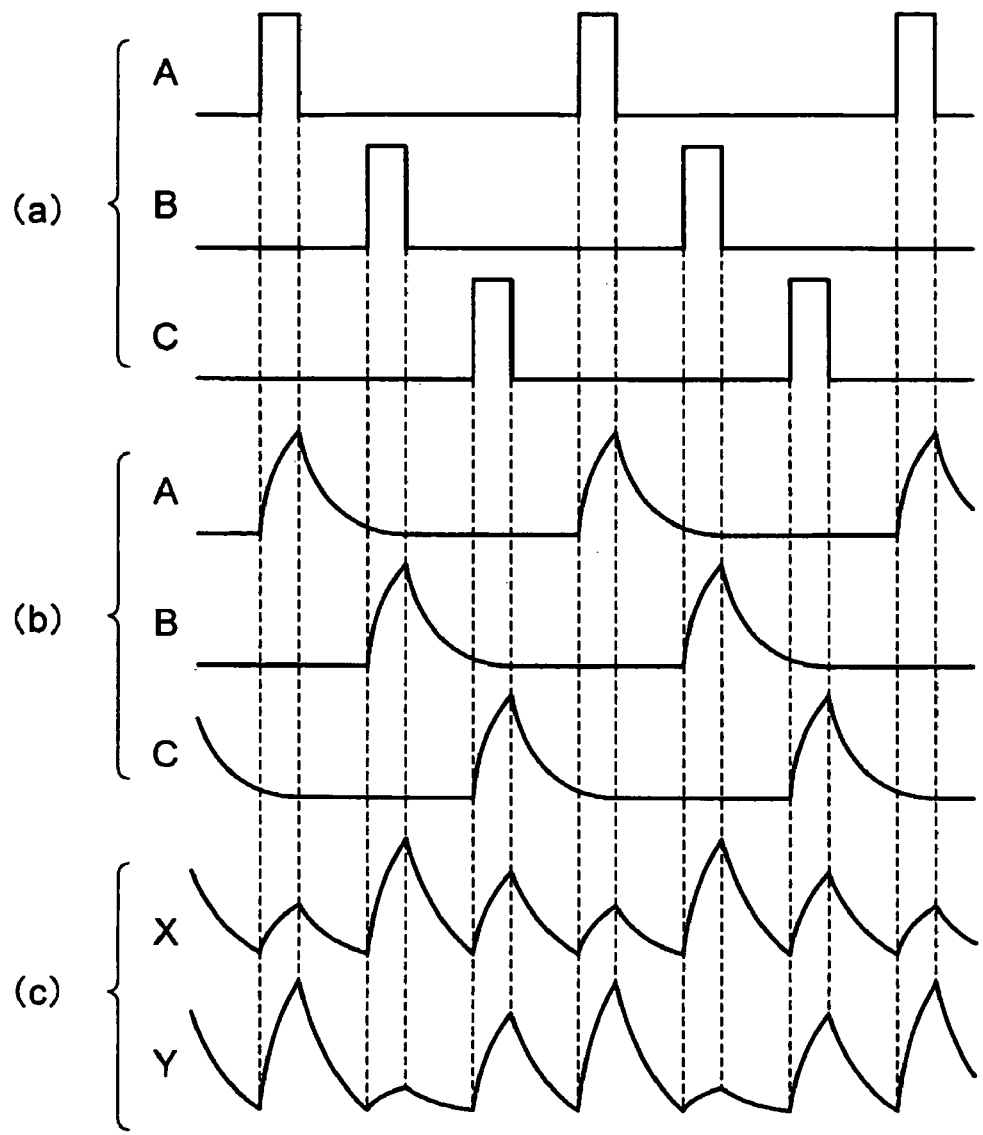
FIG. 60 is a view showing output pulse waveforms of three power supplies that periodically change power, output waveforms of infrared rays radiated from three infrared sources, and output waveforms of two infrared sensors.
Figure 61:
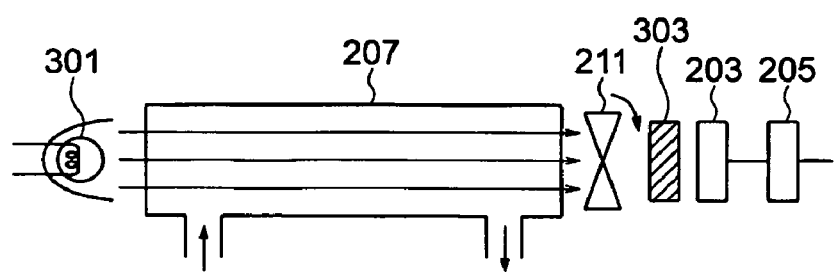
FIG. 61 is a view showing a basic configuration of an analysis system using a non-dispersive infrared absorption method.
Figure 62:
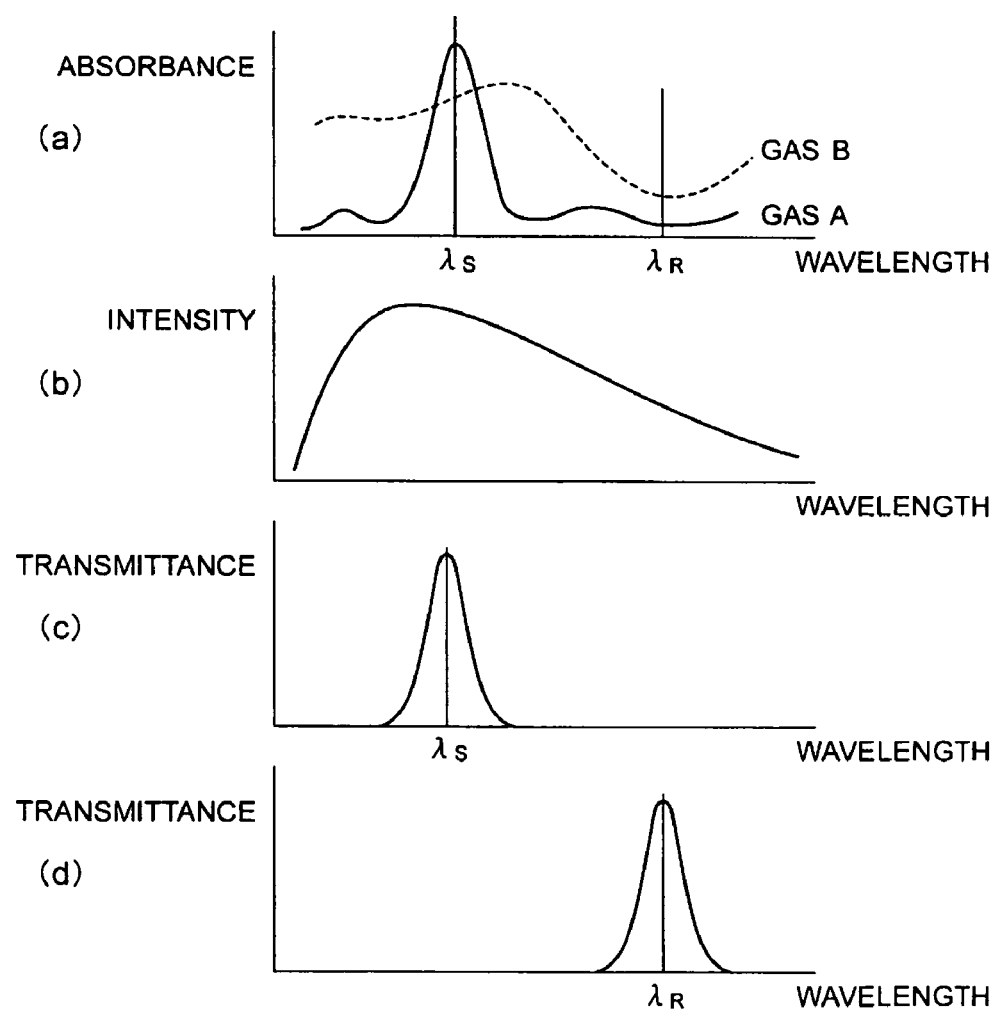
FIG. 62 is a view showing a relation among absorbance of an object to be measured (for example, gas), intensity of a light source, and transmittance of a wavelength selecting element.
Figure 63:
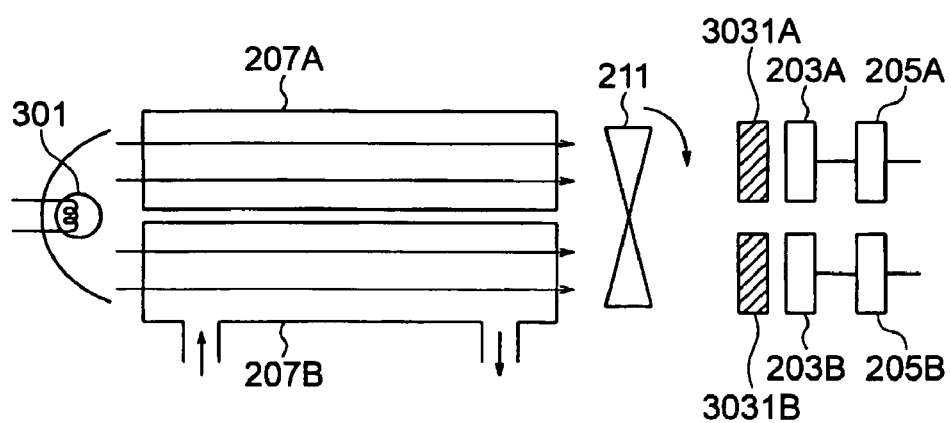
FIG. 63 is a view showing an analysis system using a reference sample.
Figure 64:
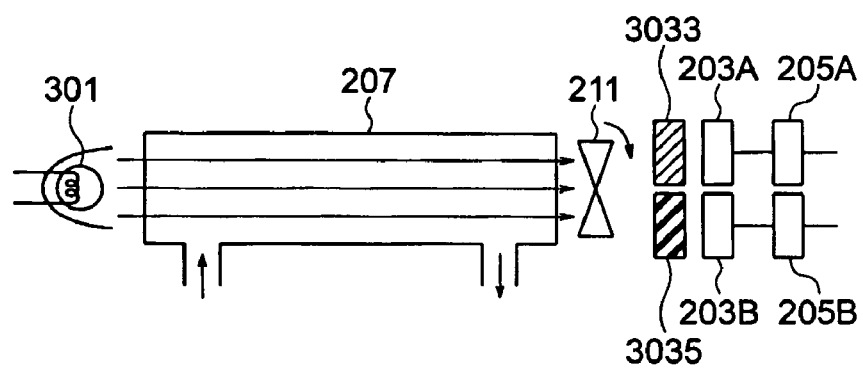
FIG. 64 is a view showing a configuration of the analysis system in the two-wavelength manner.

FIG. 60(a) is a view showing output pulse waveforms of the three power supplies periodically changing power. FIG. 60(b) is a view showing output waveforms of infrared rays radiated from the three infrared sources. FIG. 60(c) is a view showing output waveforms from the two infrared sensors. Each of the infrared sources 2011A, 2011B, and 2011C radiates infrared rays with two kinds of wavelengths with polarization planes orthogonal to each other at the same period. As shown in FIG. 60(a), timings at which the infrared sources 2011A, 2011B, and 2011C radiate infrared rays are shifted from one another over time. As shown in FIG. 60(c), each of the two infrared sensors 203A and 203B detects infrared rays having one of the two kinds of polarization planes and radiated at timings shifted over time from the three the infrared sources 2011A, 2011B, and 2011C.

With the analysis system shown in FIG. 59, when one of six kinds of wavelengths is used as the reference signal, concentrations of five kinds of gases can be measured. When the reference signal is not used, concentrations of six kinds of gases can be measured. Generally, concentrations of gases whose number is a product of the number of infrared sources (in this case, 3) and the number of kinds of the gratings included in each infrared source (in this case, 2) can be measured.

In conventional analysis systems, as the number of gases to be measured is increased, infrared rays to be discarded by wavelength selecting elements (such as filters) are increased, thereby degrading energy efficiency. However, for example, in the analysis system shown in FIG. 59, even when the number of gases to be measured is increased, energy efficiency is not degraded.

Since conventional analysis systems cannot concentrate energy on infrared rays with the specific wavelengths, it is difficult to increase energy efficiency, to reduce heat capacity of the infrared source, or to reduce size. Further, since an infrared source of conventional analysis systems uses, as a radiator, a ceramic-coated one or a ceramic plate into which screen-printed wiring patterns are buried, size cannot be reduced from a standpoint of structure. Thus, in conventional analysis systems, since an infrared source cannot be manufactured in a small size, it is difficult to incorporate a plurality of infrared sources into a system. Further, since heat capacity of an infrared source cannot be reduced, it is difficult to turn on and off the infrared source at a high speed.

On the other hand, the infrared source used in the present invention has a high energy efficiency and can be manufactured by a semiconductor microlithography technology, and therefore heat capacity of each infrared source can be minimally suppressed. Further, it is possible to integrate a plurality of independent infrared sources on one chip. Thus, the analysis system shown in FIG. 59 can be realized.

Also, although FIGS. 55 and 57 to 59 do not show optical systems for infrared rays, the actual analysis system includes optical systems for infrared rays.

In FIGS. 55 and 57 to 59, the measurement cell (such as a container 207) in which the gas to be measured is flowed is separated from surrounding optical elements by window material. Further, it is assumed that infrared rays transmit the measurement cell only once. However, such a configuration is merely a typical one. The present invention can be applied to various configurations used in conventional analysis systems, such as a configuration in which the a grating of a light source or a detection element is exposed in a measurement cell, a configuration in which a light path length is increased by reflecting infrared rays once or plural times using one or plural mirrors, and a configuration in which infrared rays are propagated in a closed state while being reflected in a light path of a waveguide type.

Further, methods including a measurement method in which reflected lights or scattered lights from an object is measured and that is not generally classified as a non-dispersive infrared absorption method, and a special measurement method such as a total reflection method, a high-sensitivity reflection method, a microscopy method, a photoacoustic method, and a method in which ellipsometry is applied, fall into the scope of the present invention, provided that the infrared source of the present invention is used for analysis of materials.

Figure 65:
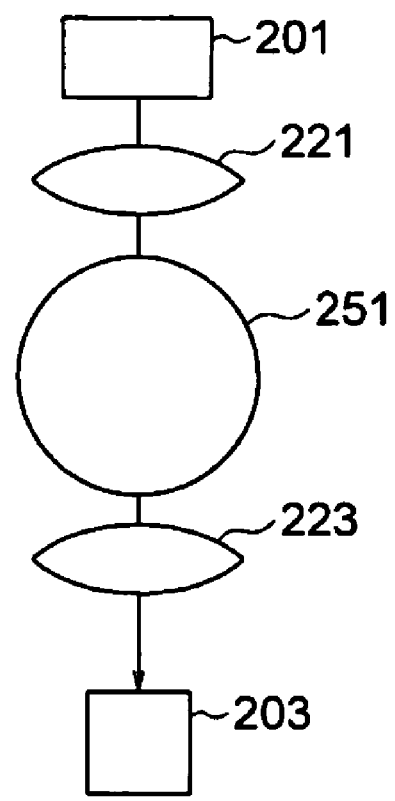
FIG. 65 is a view showing a system configuration of a Brix meter.

FIG. 65 is a view showing a configuration of a Brix meter. The Brix meter includes an infrared source 201, a lens 221, a lens 223, and an infrared sensor 203. The infrared source 201 is, for example, the infrared source 100 shown in FIG. 1 that radiates infrared rays that have polarization planes (polarization plane in an A direction of FIG. 1) orthogonal to the arrangement direction of the grating and have specific wavelengths determined according to the grating shape. Alternatively, the infrared source shown in FIG. 13 or 14 may be used as the infrared source 201. As the infrared sensor 203, a pyroelectric sensor using the property that charges are generated on a surface of dielectric when heating the surface of dielectric or a thermopile that is a thermocouple array may be used.

Infrared rays radiated from the infrared source 201 are collimated by the lens 221, are allowed to pass through the object 251 to be measured such as fruits, and are condensed onto the infrared sensor 203 by the lens 223. Further, for example, a chopper (not shown) may be mounted on the rear of the lens 223 to periodically change intensity of infrared rays.

The Brix meter measures a sugar content of the object to be measured using the property that infrared rays with specific wavelengths are absorbed according to a sugar content of the object to be measured. Although the specific wavelengths of infrared rays vary depending on objects to be measured, they are within a range of 5 to 10 µm. When plurality of specific wavelengths are used, such infrared sources in which infrared sources for the plurality of specific wavelengths are integrated on one chip, as described with reference to FIGS. 58 and 59, may be used.

Figure 66:
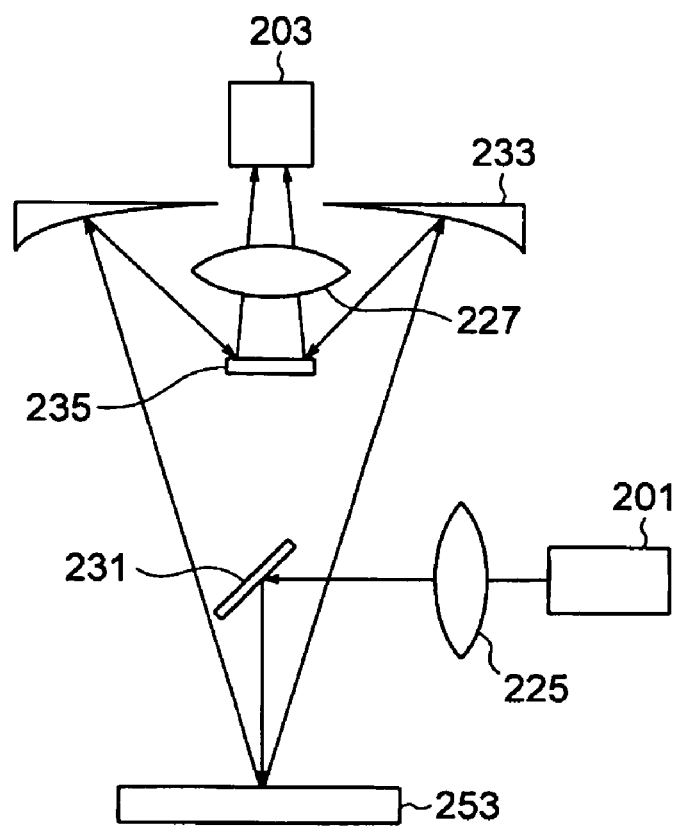
FIG. 66 is a view showing a system configuration of a moisture meter system.

FIG. 66 is a view showing a configuration of a moisture meter system. The moisture meter includes an infrared source 201, lenses 225 and 227, reflecting mirrors 231 and 235, a condensing mirror 233, and an infrared sensor 203. The infrared source 201 is, for example, the infrared source 100 shown in FIG. 1 that radiates infrared rays that have polarization planes (polarization plane in an A direction of FIG. 1) orthogonal to the arrangement direction of the grating and have specific wavelengths determined according to the grating shape. Alternatively, the infrared source shown in FIG. 13 or 14 may be used as the infrared source 201. As the infrared sensor 203, a pyroelectric sensor using the property that charges are generated on a surface of dielectric when heating the surface of dielectric or a thermopile that is a thermocouple array may be used.

Infrared rays radiated from the infrared source 201 are collimated by the lens 225, are reflected by the reflecting mirror 231, reach the objects 253 to be measured, and are reflected by the object 253 to be measured. Reflected lights from the object 253 to be measured are condensed by the condensing mirrors 233 and are reflected by the reflecting mirror 253, and then are condensed onto the infrared sensor 203 by the lens 227. Further, for example, a chopper (not shown) may be mounted on the rear of the lens 227 to periodically change intensity of infrared rays.

The moisture meter measures a moisture content of the object to be measured using the property that infrared rays with specific wavelengths are absorbed according to a moisture content of the object to be measured.

The infrared source of the analysis system according to the present invention concentrates energy on infrared rays with specific wavelengths and emits the infrared rays, and therefore the infrared source has high energy efficiency and can easily be miniaturized. Therefore, the analysis system according to the present invention can use the infrared source miniaturized in a one-chip form or the infrared source in which light sources with a plurality of wavelengths or light sources with a plurality of polarization planes are integrated. Further, since heat capacity of the infrared source can be reduced, in the analysis system according to the present invention, power supplied to the heating element of the infrared source is changed at a short period so that infrared rays can be radiated from the infrared source at a short period.

Hereinafter, a monitor system using the infrared source will be described.

First, wavelengths of the infrared rays used in the monitor system will be described.

For example, it is preferable for monitor systems installed outdoors to use wavelengths of lights scarcely affected by noise due to sunlight, reflected lights of sunlight from objects, and lights radiated by objects.

Figure 72:
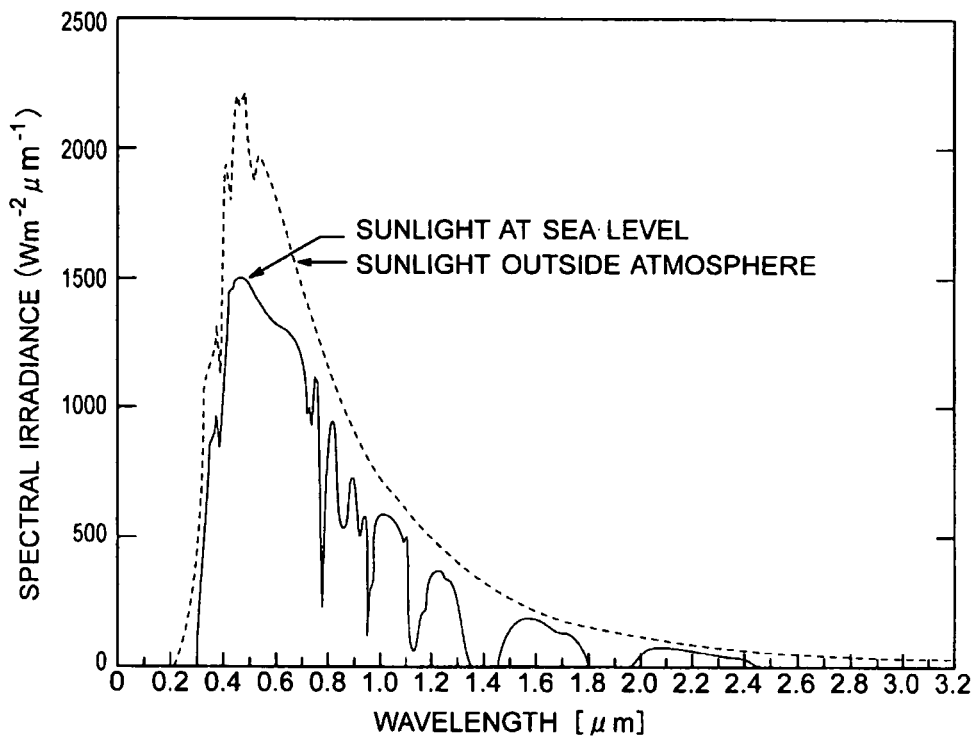
FIG. 72 is a view showing spectral component of sunlight on the surface of the earth.

FIG. 72 is a view showing spectral component of sunlight on the surface of the earth. The horizontal axis represents wavelength, wherein a unit is µm. The vertical axis represents spectral irradiance, wherein a unit is expressed by the following Formula 24.

$$W \cdot m^{-2} \mu m^{-1} \qquad \text{[Formula 24]}$$

A wavelength of sunlight at a sea level is less than 2.5 µm.

Figure 73:
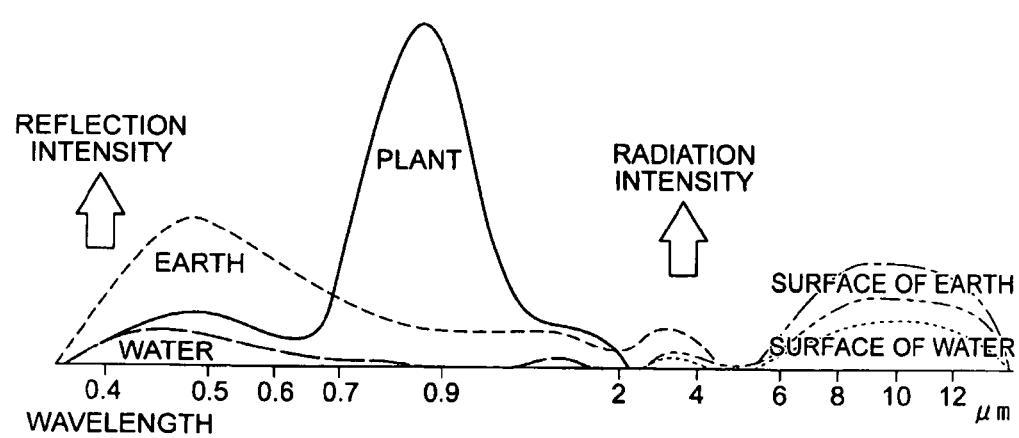
FIG. 73 is a view showing reflection characteristics and radiation characteristics on the surface of the earth.

FIG. 73 is a view showing reflection characteristics and radiation characteristics on the surface of the earth. A horizontal axis represents wavelength, wherein a unit is µm. A vertical axis represents relative value of reflection intensity and radiation intensity. Values of reflection intensity and radiation intensity are relatively low in a range from 2.5 µm to 6.0 µm.

Accordingly, as lights not affected by noise due to sunlight, reflected lights of sunlight from objects, and radiant lights from the objects, it is preferable to use lights with wavelengths in a range from 2.5 µm to 6.0 µm.

When specific wavelengths are set to 2.5 µm, 4.0 µm, and 6.0 µm, respectively, infrared intensity ratios of the infrared source obtained according to the methods shown in FIGS. 3 to 5 are shown in FIGS. 52 to 54 as described above.

Figure 67:
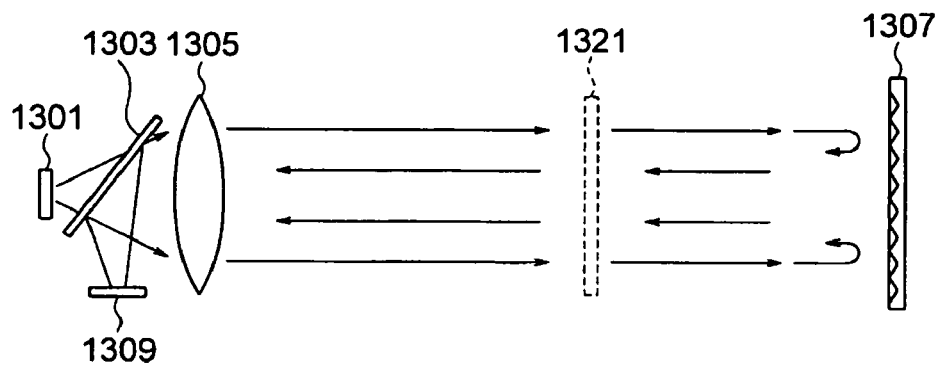
FIG. 67 is a view showing a configuration of a monitor system according to one embodiment of the present invention.

FIG. 67 is a view showing a configuration of a monitor system according to one embodiment of the present invention. The monitor system according to the present embodiment includes an infrared source 1201, lenses 1203 and 1207, a polarization filter 1205, and an infrared sensor 1209.

Infrared rays radiated from the infrared source 1201 are collimated toward the infrared sensor 207 by the lens 1203. When there is no object 1221 to be monitored, the radiated infrared rays pass through the polarization filter 1205, are condensed by the lens 1207, reach the infrared sensor 1209, and are then detected by the infrared sensor 1209. When there is an object 1221 to be monitored, the radiated infrared rays are absorbed or reflected by the object 1221 to be monitored so that they do not reach the infrared sensor 1209. Thereby, the presence or absence of the object 1221 to be monitored can be monitored.

As the infrared source 1201, infrared sources in which infrared rays are diverged by a lens as shown in FIG. 14 or 16, may be used. Also, as the infrared source 1201, the infrared source condensing the infrared rays and then diffusing them by the lens as shown in FIG. 13 or 15 may be used.

If the specific wavelengths of the infrared source 1201 are in a range from 2.5 µm to 6.0 µm, it is scarcely affected by noise due to sunlight. Further, since the infrared source 1201 radiates infrared rays having predetermined polarization planes alone, an influence of noise due to sunlight can be further reduced when the polarization filter 1205 is provided to allow infrared rays having the predetermined polarization planes alone to pass through.

Figure 68:
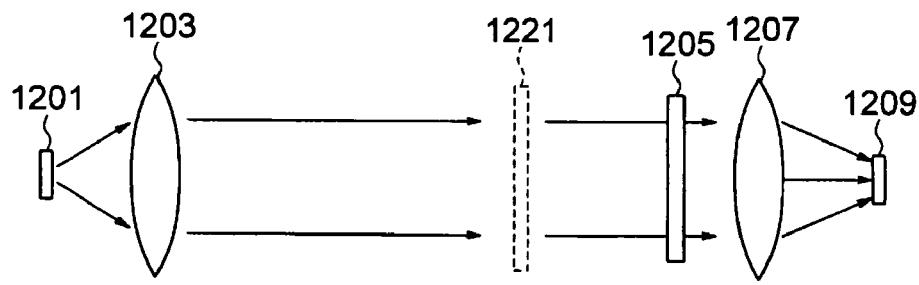
FIG. 68 is a view showing a configuration of a monitor system according to another embodiment of the present invention.

FIG. 68 is a view showing a configuration of a monitor system according to another embodiment of the present invention. The monitor system according to the present embodiment includes an infrared source 1301, a polarization beam splitter 1303, a lens 1305, a corner cube reflector 1307, and an infrared sensor 1309.

Infrared rays radiated from the infrared source 1301 pass through the polarization beam splitter 1303 and are collimated toward the corner cube reflector 1307 by the lens 1305. When an object 1321 to be monitored is absent, radiated infrared rays are reflected by the corner cube reflector 1307, are condensed by the lens 1305, are reflected by the polarization beam splitter 1303, reach the infrared sensor 1309, and are then detected by the infrared sensor 1309. The reason why the infrared rays are reflected by the polarization beam splitter 1303 is that the polarization plane direction has been changed by 90° on reflection at the corner cube reflector 1307. When the object 1321 to be monitored is present, radiated infrared rays are absorbed or reflected by the object 1321 to be monitored so that they do not reach the infrared sensor 1309. Thereby, the presence or absence of the object 1321 to be monitored can be monitored.

As the infrared source 1301, an infrared source, in which infrared rays are diverged by a lens as shown in FIG. 14 or 16 may be used. Alternatively, as the infrared source 1301, an infrared source in which infrared rays are condensed and then diverged by a lens as shown in FIG. 13 or 15 may be used.

If the specific wavelengths of the infrared source 1201 are in a range from 2.5 µm to 6.0 µm, it is scarcely affected by noise due to sunlight. Further, since the infrared source 1301 radiates infrared rays having predetermined polarization planes alone, an influence of noise due to sunlight can be further reduced when the polarization beam splitter 1303 is provided to allow infrared rays having the predetermined polarization planes alone to pass through and to reflect infrared rays having polarization planes orthogonal to the predetermined polarization planes.

Figure 69:
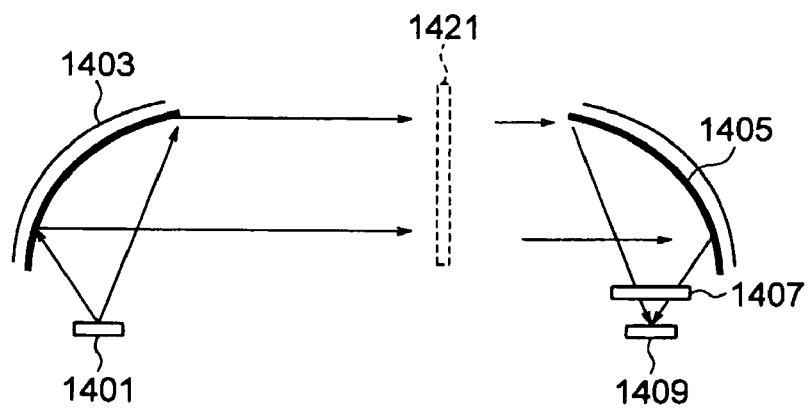
FIG. 69 is a view showing a configuration of a monitor system according to another embodiment of the present invention.

FIG. 69 is a view showing a configuration of a monitor system according to another embodiment of the present invention. The monitor system according to the present embodiment includes an infrared source 1401, parabolic reflectors 1403 and 1405, a polarization filter 1407, and an infrared sensor 1409.

Infrared rays radiated from the infrared source 1401 are collimated toward the parabolic reflector 1405 by the parabolic reflector 1403. When an object 1421 to be monitored is absent, the radiated infrared rays are condensed by the parabolic reflector 1405, pass through the polarization filter 1407, reach the infrared sensor 1409, and are then detected by the infrared sensor 1409. When the object 1421 to be monitored is present, the radiated infrared rays are absorbed or reflected by the object 1421 to be monitored so that they do not reach the infrared sensor 1409. Thereby, the presence or absence of the object 1421 to be monitored can be monitored.

As the infrared source 1401, an infrared source in which infrared rays are diverged by a lens as shown in FIG. 14 or 16 may be used. Alternatively, as the infrared source 1401, an infrared source in which infrared rays are condensed and then diverged by a lens as shown in FIG. 13 or 15 may be used.

If the specific wavelengths of the infrared source 1401 are in a range from 2.5 µm to 6.0 µm, it is scarcely affected by noise due to sunlight. Further, since the infrared source 1401 radiates infrared rays having predetermined polarization planes alone, an influence of noise due to sunlight can be further reduced when the polarization filter 1407 is provided to allow infrared rays having the predetermined polarization planes alone to pass through.

Figure 70:
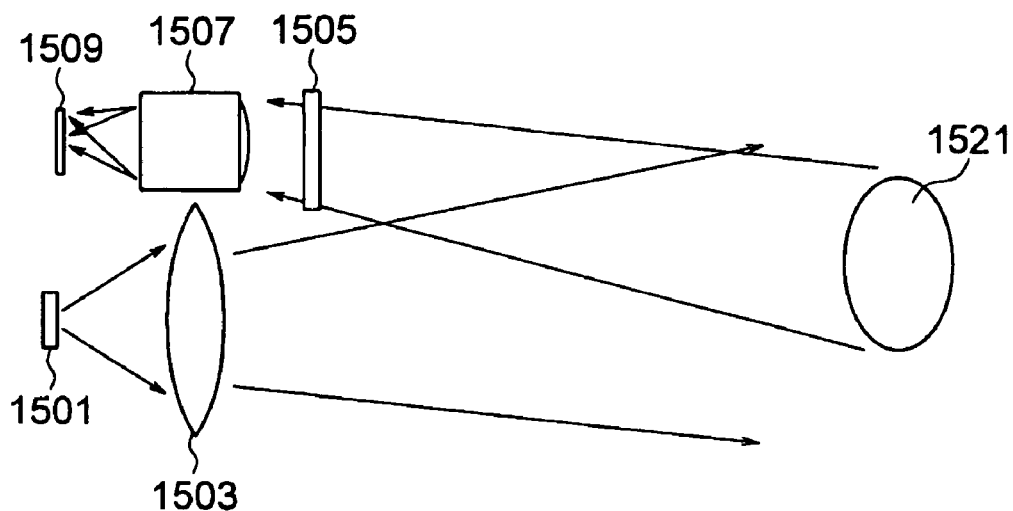
FIG. 70 is a view showing a configuration of a monitor system according to another embodiment of the present invention.

FIG. 70 is a view showing a configuration of a monitor system according to another embodiment of the present invention. The monitor system according to the present embodiment includes an infrared source 1501, a lens 1503, a polarization filter 1505, an image pickup lens 1507, and an array-type infrared sensor 1509.

Infrared rays radiated from the infrared source 1501 pass through the lens 1503 and are radiated to an object 1521 to be monitored. The infrared rays reflected at the object 1521 to be monitored and its surroundings pass thorough the polarization filter 1505 and the image pickup lens 1507 and reach the infrared sensor 1509 so that an image is formed on the array-type infrared sensor 1509. A state of the object 1521 to be monitored and its surroundings can be monitored by the image.

As the infrared source 1501, an infrared source in which infrared rays are diverged by a lens as shown in FIG. 14 or 16 may be used. Alternatively, as the infrared source 1501, an infrared source in which infrared rays are condensed and then diverged by a lens as shown in FIG. 13 or 15 may be used.

If the specific wavelengths of the infrared source 1501 are in a range from 2.5 µm to 6.0 µm, it is scarcely affected by noise due to sunlight. Further, since the infrared source 1501 radiates infrared rays having predetermined polarization planes alone, an influence of noise due to sunlight can be further reduced when the polarization filter 1505 is provided to allow infrared rays having the predetermined polarization planes alone to pass through.

In the aforementioned embodiments, lenses are manufactured by silicon, germanium, etc.

In the aforementioned embodiments, as infrared sensor, a pyroelectric sensor using the property that charges are generated on a surface of dielectric when heating the surface of dielectric, a heat-type infrared sensor such as the thermopile that is a thermocouple array, or a quantum-type infrared sensor such as a PbSe photoconductive element may be used.

Figure 71:
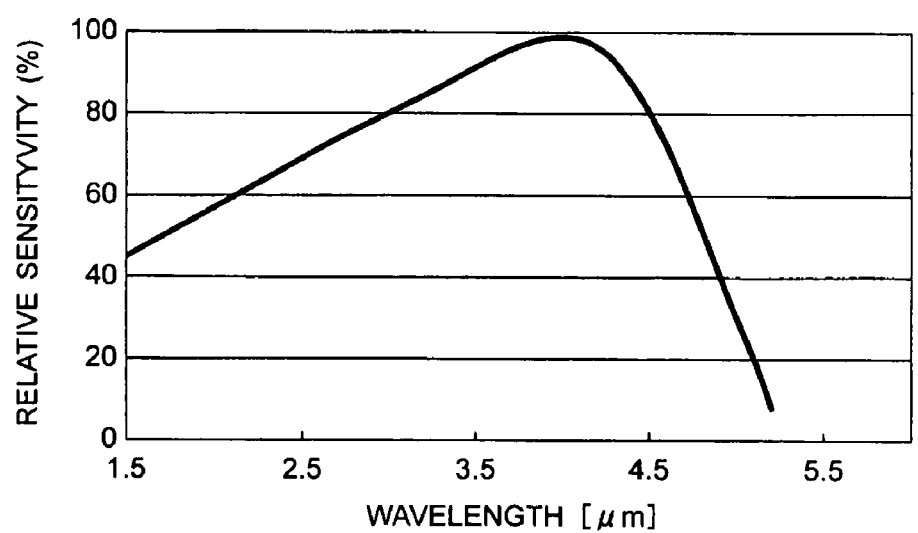
FIG. 71 is a view showing relative sensitivity with respect to a wavelength of a PbSe photoconductive element.

FIG. 71 is a view showing relative sensitivity with respect to wavelength of a PbSe photoconductive element. Since relative sensitivity of the PbSe photoconductive element has a peak near a wavelength of 4 µm, it is suitable for an infrared sensor of the monitor system with a wavelength band (2.5 to 6 µm) in which noise of sunlight can be prevented.

In the aforementioned embodiments, as a polarization filter or a polarization beam splitter, commercially available wire grid polarization elements may be used.

In the infrared source according to one embodiment of the present invention, wherein when the predetermined grating period is P, a width of the portions functioning as positive dielectric substance in the predetermined direction is T, a grating depth is D, and the specific wavelength is λ, the following Formula 25 is satisfied:

$$0 < P \leq 2.0\lambda$$

$$T \leq 0.5P \quad \text{[Formula 25]}$$

and P, T, and D are determined in such a way that a wavelength indicating peak of intensity of infrared rays radiated from the infrared source matches the specific wavelength.

According to the present embodiment, the specific wavelength can be set to a desired wavelength by adjusting grating period P, grating width T, and grating depth D.

In the infrared source according to another embodiment of the present invention, when the predetermined grating period is P and, a grating width at an upper surface of the portions functioning as positive dielectric substance in the predetermined direction is T, a grating depth is D, boundary planes between the portions functioning as positive dielectric substance and the portions functioning as negative dielectric substance, are at an angle with respect to a plane of the grating is θ, and the specific wavelength is λ, the following Formula 26 is satisfied:

$$0 < P \leq 2.0\lambda$$

$$T \leq 0.5P$$

$$0 < \theta < \pi \quad \text{[Formula 26]}$$

and P, T, D, and θ are determined in such a way that a wavelength indicating peak of intensity of infrared rays radiated from the infrared source agrees with the specific wavelength.

According to the present embodiment, the specific wavelength can be set to a desired wavelength by adjusting grating period P, grating width T, grating depth D, and angle θ of boundary planes between the portions functioning as positive dielectric substance and the portions functioning as negative dielectric substance, with respect to a plane of the grating.

In the infrared source according to another embodiment of the present invention, the portions functioning as negative dielectric substance are made of a negative dielectric material.

According to the present embodiment, the infrared source can be easily manufactured with reduced number of manufacturing processes.

In the infrared source according to another embodiment of the present invention, surfaces alone of the portions functioning as negative dielectric substance are made of a negative dielectric material.

According to the present embodiment, a high precision infrared source can be easily manufactured.

In the infrared source according to another embodiment of the present invention, the portions functioning as negative dielectric substance are the portions functioning as negative dielectric substance are made of plural kinds of negative dielectric materials.

According to the present embodiment, the number of parameters for adjusting the specific wavelength is increased to facilitate designing and manufacturing.

In the infrared source according to another embodiment of the present invention, the portions functioning as positive dielectric substance are made of plural kinds of positive dielectric materials.

According to the present embodiment, the number of parameters for adjusting the specific wavelength is increased to facilitate designing and manufacturing.

In the infrared source according to another embodiment of the present invention, the portions functioning as negative dielectric substance also serve as the heating element.

According to the present embodiment, a compact infrared source with a simple structure can be obtained.

In the infrared source according to another embodiment of the present invention, portions of the heating element other than the portion corresponding to the grating are coated with metal.

According to the present embodiment, since infrared rays are not radiated to the portions other than the portion corresponding to the grating, an infrared source with high energy efficiency can be obtained.

The infrared source according to another embodiment of the present invention includes a plurality of gratings, each corresponding to one of specific wavelengths.

According to the present embodiment, a compact infrared source with a simple structure that radiates infrared rays with a plurality of specific wavelengths can be obtained.

The infrared source according to another embodiment of the present invention includes at least two kinds of gratings arranged in different directions.

According to the present embodiment, a compact infrared source with a simple structure that radiates infrared rays with a specific wavelength, polarized in at least two kinds of different polarization planes can be obtained.

In the infrared source according to another embodiment of the present invention, a shape of the grating is changed along the predetermined direction to change the specific wavelength.

According to the present embodiment, a compact infrared source with a simple structure that radiates infrared rays with a predetermined wavelength band can be obtained.

In the infrared source according to another embodiment of the present invention, the grating is arranged on a surface of a lens.

According to the present embodiment, an infrared source that condenses or diverges radiated infrared light can be obtained.

The infrared source according to another embodiment of the present invention is formed as a flexible sheet.

According to the present embodiment, an infrared source that can be widely used for a heater or the like can be obtained.

The substrate according to the present invention includes the infrared source according to the present invention.

According to the present invention, a compact substrate that radiates infrared rays with the specific wavelength can be obtained.

In the substrate according to one embodiment of the present invention, the infrared source is arranged on a thermally insulated film structure.

According to the present embodiment, an infrared source with small heat capacity which can operate at a high speed operable can be obtained.

The substrate according to one embodiment of the present invention includes a plurality of infrared sources.

According to the present embodiment, a substrate capable of radiating plural kinds of infrared rays can be obtained.

The substrate according to one embodiment of the present invention includes a plurality of heating elements that can be controlled independently.

According to the present embodiment, a substrate capable of independently controlling radiation of the plural kinds of infrared rays can be obtained.

The method of manufacturing the infrared source according to the present invention is a method of manufacturing an infrared source including a heating element and a grating in which portions functioning as positive dielectric substance and portions functioning as negative dielectric substance are alternately formed at a predetermined period in a predetermined direction. In the infrared source radiation energy from the heating element is concentrated on infrared rays having a specific wavelength determined by a shape of the grating and having a polarization plane orthogonal to the arrangement direction of the grating, for radiation. The method includes forming a mold for the grating from plastic and forming a film of negative dielectric material on surfaces of the mold to form the portions functioning as negative dielectric substance.

According to the present invention, since the portions functioning as negative dielectric substance are formed by forming a film of negative dielectric material on surfaces of the mold of plastic, the grating of the infrared source can be formed at high precision.

The analysis system according to one embodiment of the present invention includes the infrared source according to the present invention and an infrared sensor capable of detecting the infrared rays with the specific wavelength. The infrared source radiates infrared rays with the specific wavelength to an object and the infrared rays with the specific wavelength are detected so to analyze properties of the object.

With the analysis system according to the present embodiment, energy from the infrared source can be concentrated on infrared rays with the specific wavelength, and therefore energy efficiency is increased and the infrared source and the analysis system can be made compact. Further, since infrared rays with the specific wavelength can be radiated by the infrared source, a wavelength selecting element is not needed, and therefore a structure of the analysis system can be simplified.

The analysis system according to another embodiment of the present invention includes at least one polarization element between the infrared source and the infrared sensor, wherein the polarization element is arranged to allow lights with polarization planes in predetermined directions alone to transmit or reflect.

According to the present embodiment, the infrared source radiates infrared rays with the polarization planes orthogonal to the arrangement direction of the grating. When the polarization element is arranged to allow lights with the polarization planes alone to transmit or reflect, the analysis system robust against noise can be obtained.

In the analysis system according to another embodiment of the present invention, intensity of infrared rays having the specific wavelength and the polarization planes in the predetermined directions that pass through or are reflected by the polarization element are periodically changed.

According to the present embodiment, the infrared rays with periodically changing intensity are detected by the infrared sensor and outputs of the infrared sensor are demodulated. So, an analysis system robust against noise can be obtained.

In the analysis system according to another embodiment of the present invention, the polarization element is arranged to rotate.

According to the present embodiment, an analysis system robust against noise can be obtained using a simple structure in which the polarization element is rotated.

In the analysis system according to another embodiment of the present invention, the polarization element is arranged to perform a reciprocating motion.

According to the present embodiment, an analysis system with a high tolerance to noise can be obtained by a simple structure in which the polarization element performs a reciprocating motion. When a mechanism not including a sliding portion, such as a bimorph, is employed for the reciprocating motion, reliability of the analysis system is further improved.

In the analysis system according to another embodiment of the present invention, a power supply for supplying power to the heating element is provided and the power supplied to the heating element is periodically changed to periodically change intensity of infrared rays radiated from the infrared source.

According to the present embodiment, an analysis system robust against noise can be obtained without a moving portion for periodically changing intensity of infrared rays. Further, since energy efficiency of the infrared source is high, a heat capacity of the infrared source can be reduced and a period for changing intensity of infrared rays can be shortened.

In the analysis system according to another embodiment of the present invention, the infrared source includes a heating element and a plurality of gratings. Each of the plurality of gratings is a grating in which positive dielectric substance portions and negative dielectric substance portions are alternately formed at a predetermined period in a predetermined direction. Radiation energy from the heating element is concentrated on infrared rays having a plurality of specific wavelengths determined by shapes of the plurality of gratings and having polarization planes orthogonal to arrangement directions of the plurality of gratings.

According to the present embodiment, the infrared source radiates infrared rays with the plurality of specific wavelengths so that a compact analysis system with high energy efficiency that uses infrared rays with the plurality of specific wavelengths can be obtained.

In the analysis system according to another embodiment of the present invention, the infrared source includes a heating element and a plurality of gratings arranged in different directions. Each of the plurality of gratings is a grating in which positive dielectric substance portions and negative dielectric substance portions are alternately formed at a predetermined period in a predetermined direction. Radiation energy from the heating element is concentrated on infrared rays having a plurality of specific wavelengths determined by shapes of the plurality of gratings and having polarization planes orthogonal to arrangement directions of the plurality of gratings.

According to the present embodiment, the infrared source radiates infrared rays having the plurality of polarization planes. For example, when infrared rays with different wavelengths are arranged to have different polarization planes, infrared rays with different wavelengths can be advantageously separated using the polarization planes.

The analysis system according to another embodiment of the present invention includes a plurality of infrared sources and a power supply for supplying power to each of heating elements of the plurality of infrared sources. The system is arranged in such a way that power is supplied to each of the heating element of the plurality of infrared sources at points of time shifted form one another and therefore each of the plurality of infrared sources radiates infrared rays at the points of time shifted form one another.

According to the present embodiment, a plurality of kinds of infrared rays radiated from the plurality of infrared sources may be processed in a time division manner. Further, energy efficiency of the infrared source is high so that a heat capacity of the infrared source can be reduced and a period of the time division can be shortened, improving data processing speed.

The monitor system according to one embodiment of the present invention includes the infrared source according to the present invention and an infrared sensor capable of detecting infrared rays with the specific wavelength. The infrared source radiates infrared rays with the specific wavelength and the infrared sensor detects the infrared rays with the specific wavelength so that a state around the infrared source can be monitored.

The monitor system according to the present embodiment can use rays with strong intensity at a desired specific wavelength for monitoring with high precision.

In the monitor system according to the present invention, the specific wavelength is in a range from 2.5 µm to 6.0 µm.

The monitor system according to the present embodiment uses lights with a wavelength in a range from 2.5 µm to 6.0 µm so that it is scarcely affected by noise due to sunlight, reflected light of sunlight from objects, and lights radiated by objects.

The monitor system according to another embodiment of the present invention is arranged in such a way that the specific wavelength agrees with a wavelength where sensitivity of the infrared sensor is at peak.

The monitor system according to the present embodiment can perform monitoring with high precision because the specific wavelength agrees with a wavelength where sensitivity of the infrared sensor is at peak.

In the monitor system according to another embodiment of the present invention, the grating depth is changed along the predetermined direction in such a way that the specific wavelength is changed along the predetermined direction.

The monitor system according to the present embodiment can use infrared rays in a desired wavelength band.

In the monitor system according to another embodiment of the present invention, the grating is arranged on a surface of a lens.

According to the present embodiment, a compact monitor system can be obtained because infrared lights are condensed or diverged by the infrared source.

The monitor system according to another embodiment of the present invention includes at least one polarization element in a path along which infrared rays travels from the infrared source to the infrared sensor. The polarization element is arranged to allow lights with polarization planes in a predetermined direction alone to pass through.

According to the present embodiment, the polarization element allows infrared rays with the predetermined polarization plane alone among the infrared rays radiated from the infrared source, and therefore an influence of noise is reduced and monitoring can be performed with high reliability.

The invention claimed is:

1. An infrared source comprising:
a heating element; and
a grating in which portions functioning as positive dielectric substance and portions functioning as negative dielectric substance are alternately formed at a predetermined period in a predetermined direction in such a way that waveguides are arranged in the predetermined direction, each waveguide having an open end and being enclosed with the portions functioning as the negative dielectric substance except for the open end,
wherein the grating receives radiation energy from the heating element and radiates infrared rays having a specific wavelength determined by a shape of the waveguides and having a polarization plane orthogonal to the arrangement direction of the grating, for radiation.

2. The infrared source according to claim 1, wherein when the predetermined grating period is P, a width at an upper surface of the portions functioning as positive dielectric substance in the predetermined direction is T, a grating depth is D, and the specific wavelength is λ, the following Formula 1 is satisfied:

$0 < P \leq 2.0\lambda$ $T \leq 0.5P$ [Formula 1]

and P, T, and D are determined in such a way that a wavelength indicating peak of intensity of infrared rays radiated from the infrared source matches the specific wavelength.

3. The infrared source according to claim 1, wherein when the predetermined grating period is P and, a grating width at an upper surface of the portions functioning as positive dielectric substance in the predetermined direction is T, a grating depth is D, boundary planes between the portions functioning as positive dielectric substance and the portions functioning as negative dielectric substance, are at an angle with respect to a plane of the grating is θ, and the specific wavelength is λ, the following Formula 2 is satisfied:

$0 < P \leq 2.0\lambda$ $T \leq 0.5P$ $0 < \theta < \pi$ [Formula 2]

and P, T, D, and θ are determined in such a way that a wavelength indicating peak of intensity of infrared rays radiated from the infrared source agrees with the specific wavelength.

4. The infrared source according to claim 1, wherein surfaces alone of the portions functioning as negative dielectric substance are made of a negative dielectric material.

5. The infrared source according to claim 1, wherein the portions functioning as negative dielectric substance, the portions functioning as positive dielectric substance or both of them are made of plural kinds of materials.

6. The infrared source according to claim 1, comprising a plurality of gratings each of which is defined in claim 1.

7. The infrared source according to claim 6, the plurality of gratings radiate infrared rays at two or more wavelengths.

8. The infrared source according to claim 6, the plurality of gratings are arranged in two or more directions.

9. The infrared source according to claim 6, wherein the plurality of gratings comprise a plural kinds of gratings and a ratio of area of each of the plural kinds of gratings is adjusted in such away that radiation intensity from each of the plural kinds of gratings is set to a desired ratio.

10. The infrared source according to claim 1, wherein a shape of the grating is changed along the predetermined direction to change the specific wavelength.

11. The infrared source according to claim 1, which is formed as a flexible sheet.

12. An infrared source apparatus comprising:
a plurality of infrared sources each of which is defined in claim 1; and
a power supply for supplying power to each heating element of the plurality of infrared sources,
wherein the apparatus is arranged in such away that timings at which power is supplied to each heating element of the plurality of infrared sources are shifted from one another over time so that each of the plurality of infrared sources radiates infrared rays at timings shifted from one another over time.

13. An infrared source apparatus comprising:
a plurality of infrared sources each of which is defined in claim 1; and
a power supply for supplying power to each heating element of the plurality of infrared sources,
wherein the apparatus is arranged in such away that each of the plurality of infrared sources radiates infrared rays at a wavelength different from one another.

14. An infrared source apparatus wherein a plurality of infrared sources each of which is defined in claim 1 are arranged on a semiconductor chip.

15. The infrared source apparatus according to claim 14 wherein the plurality of infrared sources can be divided into two or more groups by specific wavelength, arrangement direction or area of the gratings thereof.

16. A analysis system comprising the infrared source according to claim 1.

17. A monitor system comprising the infrared source according to claim 1.

18. A method of manufacturing an infrared source comprising a heating element and a grating in which portions functioning as positive dielectric substance and portions functioning as negative dielectric substance are alternately formed at a predetermined period in a predetermined direction, wherein the grating receives radiation energy from the heating element and radiates infrared rays having a specific wavelength determined by a shape of the grating and having a polarization plane orthogonal to the arrangement direction of the grating, for radiation, the method comprising:
- forming a mold for the grating having projections from plastic; and
- forming a film of negative dielectric material on surfaces of the mold to form the portions functioning as negative dielectric substance, wherein the projections of the grating covered with the film of negative dielectric material function as negative dielectric substance and air in gaps between the projections functions as positive dielectric substance.

19. A method of manufacturing an infrared source comprising a heating element and a grating in which portions functioning as positive dielectric substance and portions functioning as negative dielectric substance are alternately formed at a predetermined period in a predetermined direction, wherein radiation from the heating element forms infrared rays having a specific wavelength determined by a shape of the grating and having a polarization plane orthogonal to the arrangement direction of the grating, for radiation, the method comprising:
- forming on a substrate the portions functioning as positive dielectric substance of the grating;
- imbedding a material of the portions functioning as negative dielectric substance into the portions functioning as positive dielectric substance so as to cover surfaces of the portions functioning as positive dielectric substance;
- connecting the heating element the surface of the portions functioning as negative dielectric substance, the surface being opposite the substrate; and
- removing the substrate.

20. The method according to claim 19 wherein adjustments are made in such a way that sides of the rating, forming boundaries between the portions functioning as positive dielectric substance and the portions functioning as negative dielectric substance are at a predetermined angle with respect to the plane of the grating.

* * * * *

UNITED STATES PATENT AND TRADEMARK OFFICE
CERTIFICATE OF CORRECTION

PATENT NO.         : 8,017,923 B2
APPLICATION NO.    : 12/084571
DATED              : September 13, 2011
INVENTOR(S)        : Yasuaki Inoue et al.

It is certified that error appears in the above-identified patent and that said Letters Patent is hereby corrected as shown below:

Title page item (73) Assignee, should read Nalux Co., Ltd, Osaka (JP)
                                           and
                                           National Institute for Materials Science, Tsukuba-shi,
                                         Ibaraki, Japan Signed and Sealed this
Twenty-eighth Day of August, 2012

David J. Kappos
*Director of the United States Patent and Trademark Office*